United States Patent
Ezumi et al.

(10) Patent No.: US 6,674,550 B1
(45) Date of Patent: *Jan. 6, 2004

(54) FACSIMILE APPARATUS

(75) Inventors: Yosuke Ezumi, Takasaki (JP); Toshio Kenmochi, Fujisawa (JP); Hisashi Toyoda, Yokohama (JP); Takeshi Tsukamoto, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/882,031

(22) Filed: Jun. 25, 1997

Related U.S. Application Data

(63) Continuation-in-part of application No. 08/847,241, filed on May 1, 1997, now Pat. No. 5,815,288, which is a continuation-in-part of application No. 08/647,286, filed on May 9, 1996, now abandoned, which is a continuation of application No. 08/150,802, filed on Nov. 12, 1993, now abandoned, said application No. 08/847,241, is a continuation of application No. 08/091,600, filed on Jul. 15, 1993, now abandoned.

(30) Foreign Application Priority Data

Jul. 17, 1992 (JP) ............................................. 4-190945
Nov. 12, 1992 (JP) ............................................. 4-302541

(51) Int. Cl.[7] ................................................. H04N 1/32
(52) U.S. Cl. ..................... 358/442; 358/406; 358/468; 379/100.01
(58) Field of Search ................................. 358/400, 442, 358/468, 441, 406, 407, 434; 379/93.32, 93.33, 93.34, 100

(56) References Cited

U.S. PATENT DOCUMENTS

| | | | |
|---|---|---|---|
| 4,215,343 A | 7/1980 | Ejiri et al. ................... 340/711 |
| 4,236,248 A | 11/1980 | Teramura et al. ............ 375/121 |
| 4,694,490 A | 9/1987 | Harvey et al. ............... 358/142 |
| 4,891,836 A | 1/1990 | Takahashi .................... 379/100 |
| 4,932,048 A | 6/1990 | Kenmochi et al. ............. 379/67 |
| 4,964,154 A | 10/1990 | Shimotono ................... 358/442 |
| 4,991,200 A | 2/1991 | Lin ............................. 358/442 |
| 5,041,917 A | 8/1991 | Koshiishi ..................... 358/434 |
| 5,199,071 A | 3/1993 | Abe et al. ...................... 379/98 |
| 5,200,991 A | 4/1993 | Motoyanagi ................. 379/100 |
| 5,255,312 A | 10/1993 | Koshiishi ..................... 358/442 |
| 5,282,054 A * | 1/1994 | Oana et al. ................... 358/434 |
| 5,297,196 A * | 3/1994 | Yamada et al. ................ 379/99 |
| 5,351,134 A | 9/1994 | Yaguchi et al. .............. 358/405 |
| 5,379,121 A | 1/1995 | Yamada et al. ............... 358/400 |
| 5,448,374 A | 9/1995 | Yokoyama et al. .......... 358/400 |
| 5,487,106 A | 1/1996 | Kenmochi et al. ........... 379/100 |
| 5,537,220 A | 7/1996 | Ezumi et al. ................. 358/442 |
| 5,557,662 A | 9/1996 | Kenmochi et al. ........... 379/100 |
| 5,673,117 A | 9/1997 | Ezumi et al. ................. 358/400 |
| 5,706,101 A | 1/1998 | Yokoyama et al. .......... 358/400 |
| 5,748,327 A | 5/1998 | Toyoda et al. ............... 358/296 |
| 5,825,505 A | 10/1998 | Toyoda et al. ............... 358/400 |

FOREIGN PATENT DOCUMENTS

| | | |
|---|---|---|
| JP | 2-100524 | 4/1990 |
| JP | 4-355537 | 12/1992 |

OTHER PUBLICATIONS

Robert Cower, Mastering Windows 3.1 Special Edition, Sybex Inc., Chapter 10 p. 325, 1992.*

* cited by examiner

Primary Examiner—Mark Wallerson
(74) Attorney, Agent, or Firm—Fitzpatrick, Cella, Harper & Scinto

(57) ABSTRACT

In a facsimile apparatus which communicates data through a communication line, a transmission level can be changed manually or in accordance with a type of the communication line or a type of an external unit as discriminated.

24 Claims, 54 Drawing Sheets

FACSIMILE APPARATUS

The present application is a continuation in part of U.S. patent application Ser. No. 08/847,241 filed on May 1, 1997, now U.S. Pat. No. 5,815,288 which is a continuation of U.S. patent application Ser. No. 08/091,600 filed on Jul. 15, 1993, now abandoned, and is also a continuation in part of U.S. patent application Ser. No. 08/647,286 filed on May 9, 1996, now abandoned, which is a continuation of U.S. patent application Ser. No. 08/150,802 filed on Nov. 12, 1993, now abandoned.

BACKGROUND OF THE INVENTION

1. Field of the Invention

The present invention relates to a facsimile apparatus to which a plurality of types of communication lines are connectable.

2. Related Background Art

There has been a facsimile apparatus to which a plurality of types of lines are connectable.

Since a conventional facsimile apparatus of this type requires detectors identical in number to the lines to be connected, its size and cost increase.

Also, in the conventional facsimile apparatus, even when a line is selectively used, a data transmission rate at a start of communication is set to the maximum, so that even for a line under poor communication condition, it is tried to conduct communication at the maximum rate and fall-back is repeated, whereby it takes much time to determine a transmission rate.

Further, in the conventional facsimile apparatus, since only the lines in which a change in signal level is small are used, an equalizer of a modem is always set to an automatic adjustment mode even when any line is selected. So, when a line in which a change in signal level is great is used, the equalizer cannot comply to the change in signal level and a communication error occurs accordingly.

SUMMARY OF THE INVENTION

An object of the present invention is to improve a facsimile apparatus.

Another object of the present invention is to simplify a structure for detecting a type of a line connected to a facsimile apparatus to which a plurality of types of lines are connectable.

A still another object of the present invention is to provide a facsimile apparatus to which a plurality of types of lines are connectable and in which a communication rate can be determined according to a type of the line connected thereto.

A still another object of the present invention is to provide a facsimile apparatus to which a plurality of types of lines are connectable and in which no error occurs in an equalizer of a modem.

DETAILED DESCRIPTION OF THE PREFERRED EMBODIMENTS

<First Embodiment>

Figure 1:
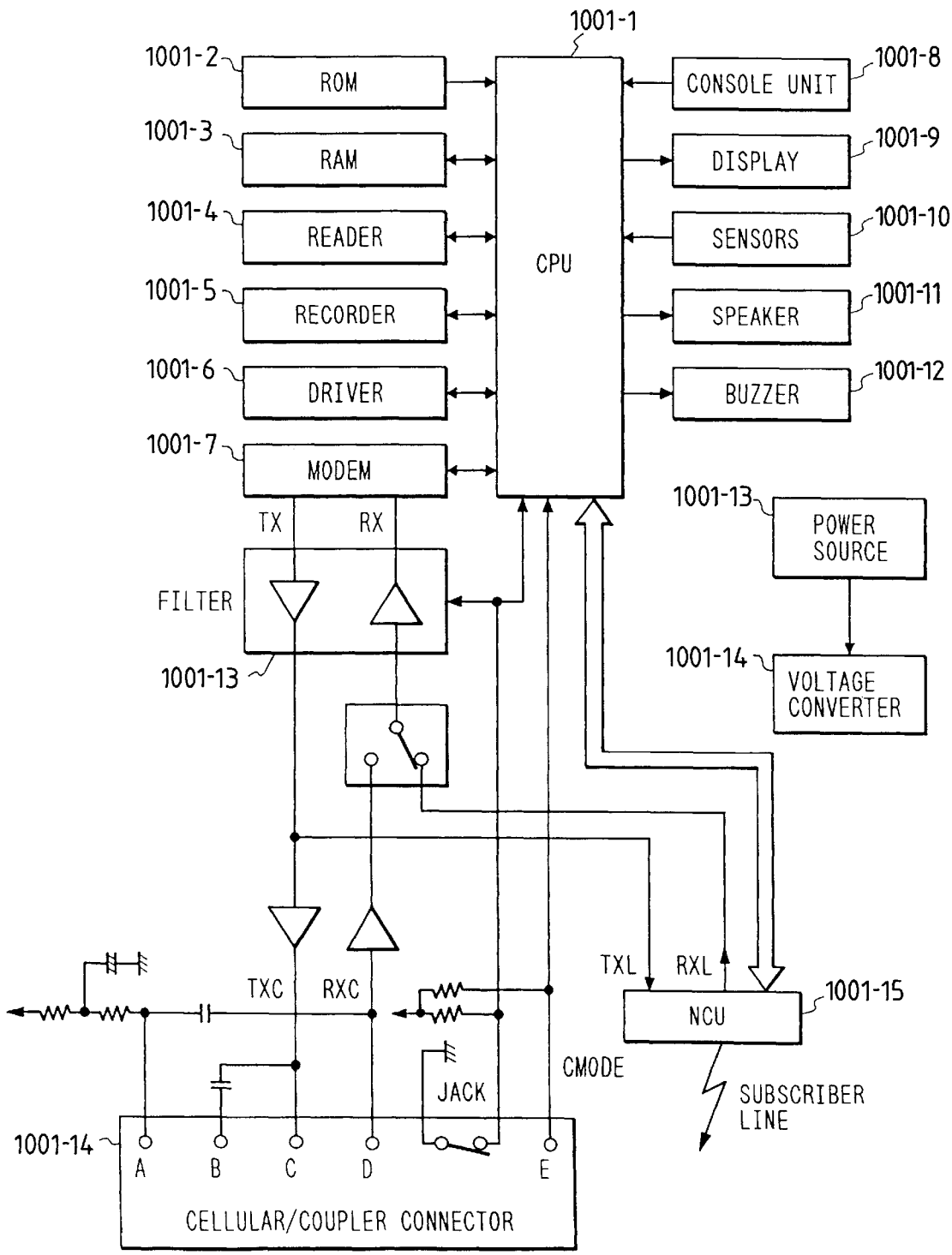
FIG. 1 shows a block diagram of a configuration of a main unit of a portable facsimile apparatus in accordance with a first embodiment of the present invention.

FIGS. 1, 2, 3, 4, 5A, 5B, 6, 7, 8, 9A, 9B, 9C, 10, 11A, 11B and 11C best show features of the present invention. FIG. 1 shows a block diagram of a main unit of the present invention. CPU 1001-1 controls the entire facsimile apparatus, that is, a RAM 1001-3, a reader 1001-4, a recorder 1001-5, a driver 1001-6, a modem 1001-7, a console unit 1001-8, a display 1001-9, a sensor 1001-10, a speaker 1001-11, a buzzer 1001-12, a filter 1001-13, a cellular/coupler connector 1001-14 and an NCU 1001-15, under control of a program stored in a ROM 1001-2.

Those units are explained below.

The RAM 1001-3 stores binary image data read by the reader 1001-4 or binary data to be recorded by the recorder 1001-5, stores a signal modulated by the modem 1001-7, and stores binary data outputted from a subscriber line through the NCU 1001-15. The RAM 1001-3 is further used to demodulate an analog waveform inputted from the subscriber line through the NCU 1001-15 and the modem 1001-7 and stores the resulting binary data.

The reader 1001-4 comprises a DMA controller, a CCD or a close contact type image sensor (CS), a TTL IC and a binary circuit. It binarizes the data read by using the CCD or the CS under the control of the CPU 1001-1 and sends the binary data to the RAM 1001-3 sequentially.

The recorder 1001-5 comprises a DMA controller, a B4/A4 size terminal head and a TTL IC. It reads the record data stored in the RAM 1001-3 under the control of the CPU 1001-1 and prints it out as a hard copy.

The driver 1001-6 comprises a stepping motor for driving feed and eject rollers of the reader 1001-4 and the recorder 1001-5, a gear for transmitting a driving force of the motor, and a driver circuit for controlling the motor.

The modem 1001-7 comprises G3, G2, G1 and old FM modems and a clock generators connected to the modems. If modulates transmission data stored in the ram 1001-3 under the control of the CPU 1001-1 and conducts communication by an analog signal from the subscriber line or the cellular/coupler connector 1001-14 through the NCU 1001-15.

The modem 1001-7 further receives the analog signal from the subscriber line or from the cellular/coupler connector 1001-14 and the NCU 1001-15, and demodulates and binarizes it and stores the binary data in the RAM 1001-3.

The console unit 1001-8 comprises a start key for transmission and reception, a mode key for designating an operation mode such as fine mode and standard mode in the transmitted image, a copy key for a copy operation, an economy key for designating an energy saving mode in recording and printing when a battery power supply is used, and a stop key for stopping the operation.

The CPU 1001-1 detects the depression of those keys and controls the respective units in accordance with the depression status.

The display 1001-9 displays an operation status such as a communication status, a power supply status and the fine and standard modes. It comprises an LCD or LED's.

The sensor 1001-10 comprises a record sheet width sensor, a record sheet presence/absence sensor, a document sheet width sensor and a document sheet presence/absence sensor. It detects the status of the document sheet and the record sheet under the control of the CPU 1001-1.

The speaker 1001-11 comprises a speaker and a speaker driver. It monitors a voice signal and a communication signal under the control of the CPU.

The buzzer 1001-12 comprises a buzzer and a buzzer driver. It generates an alarm sound and a key touch sound under the control of the CPU.

The filter 1001-13 is a low-pass filter which comprises an operational amplifier.

The cellular/coupler control unit 1001-14 comprises a connector with a switch and it is an analog signal interface for connecting a mobile communication terminal and an acoustic coupler.

Signals are:

Cellular TX signal (C): a transmission signal supplied from the main unit to the mobile terminal;

Cellular RX signal (D): a reception signal supplied from the mobile terminal to the main unit;

Coupler TX signal (A): a transmission signal from the main body to the acoustic coupler;

Coupler RX signal (B): a reception signal from the acoustic coupler to the main unit;

JACK signal indicates to the CPU whether a plug is connected or not by a switch of the cellular/coupler connector.

Figure 2:
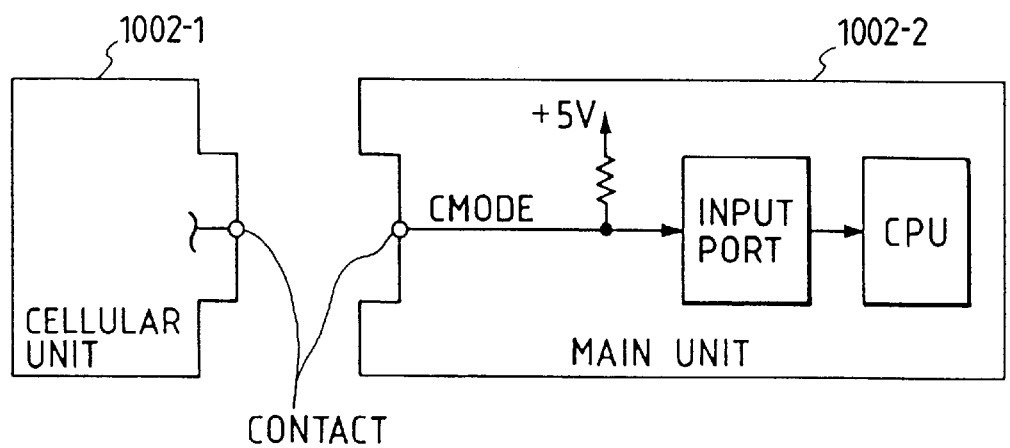
FIG. 2 shows a CMODE signal when the facsimile apparatus is connected to a mobile terminal.

CMODE signal is high when the cellular is connected by the cellular/coupler connector as shown in FIG. 2.

Figure 3:
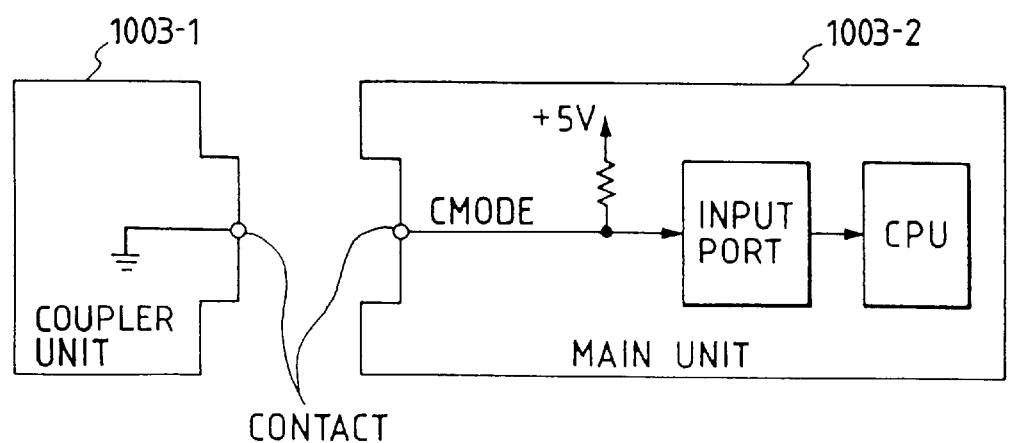
FIG. 3 shows the CMODE signal when the facsimile apparatus is connected to an acoustic coupler.
Figure 4:
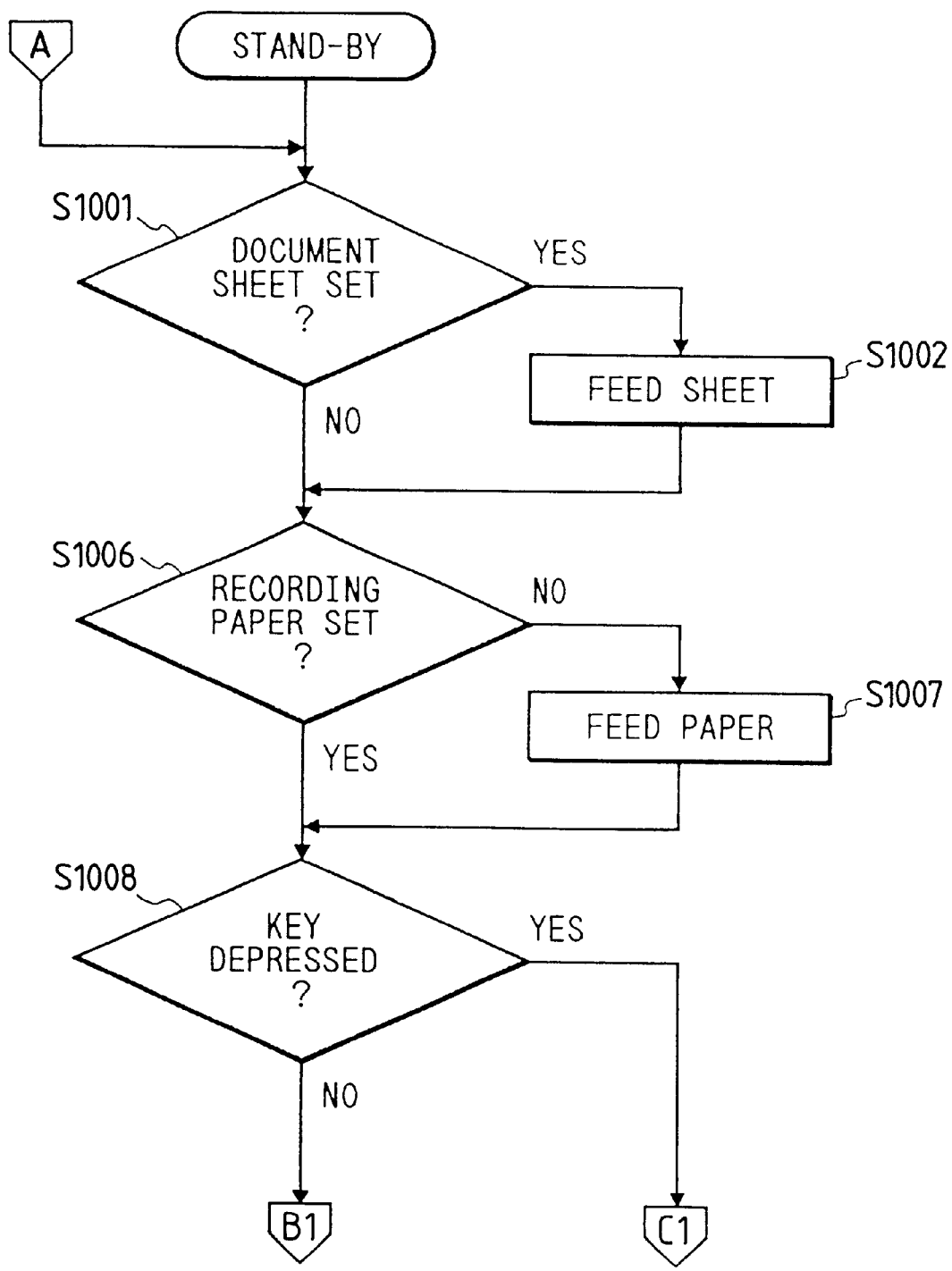
FIG. 4 shows a flow chart of a facsimile operation in the first embodiment.
Figures 5, 5A:
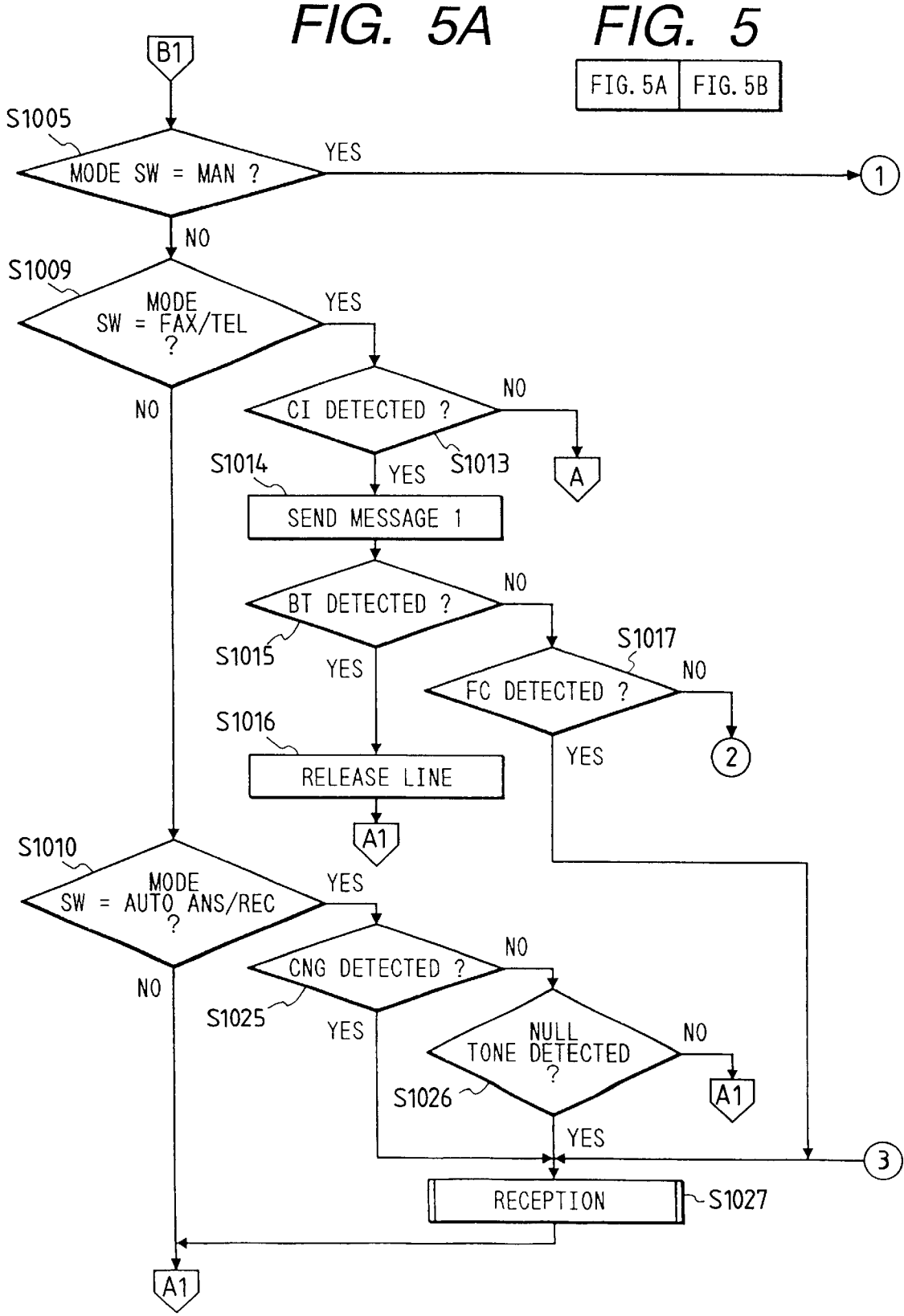
FIG. 5 is comprised of FIGS. 5A and 5B showing operation in the first embodiment.
Figure 5B:
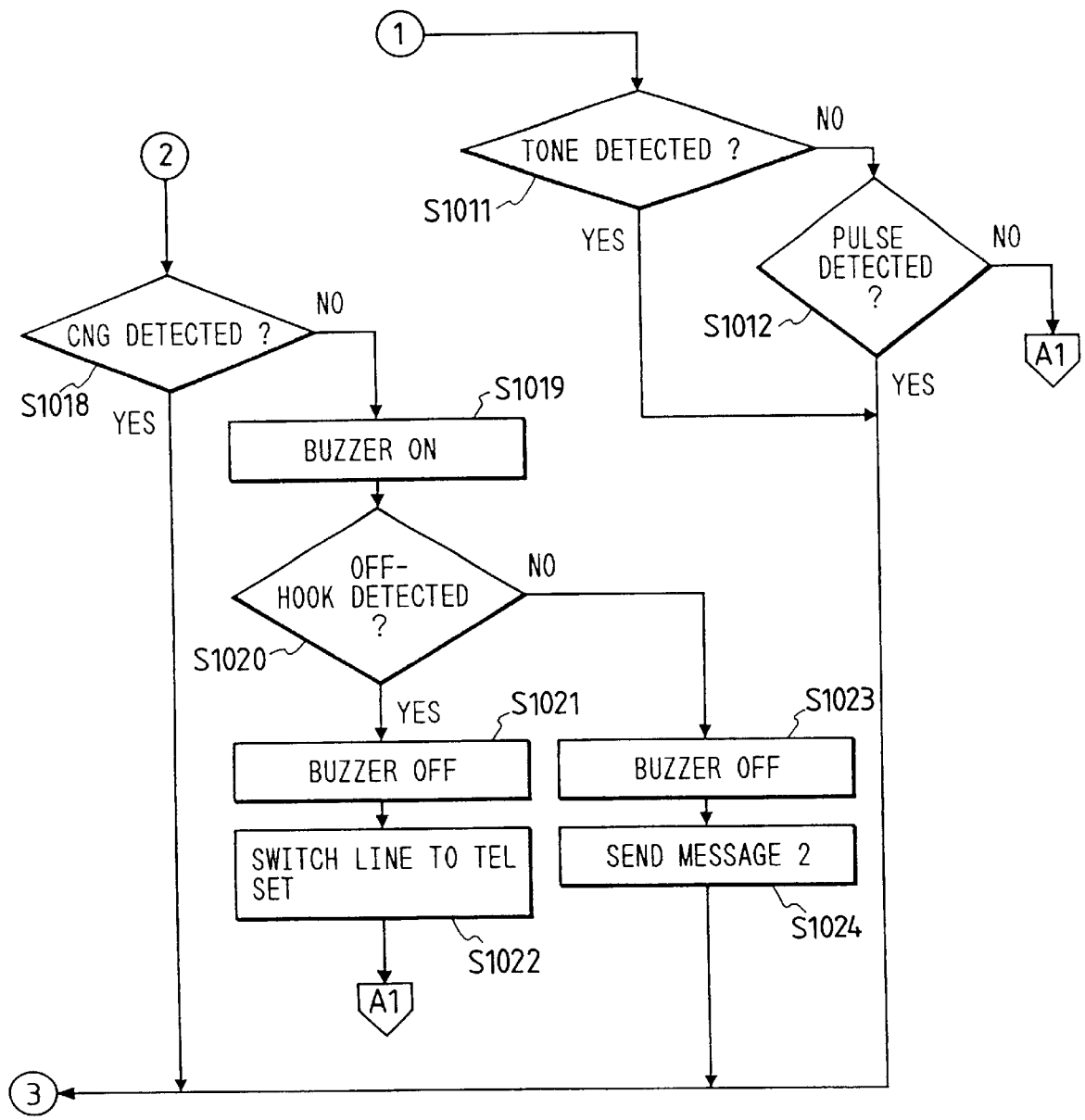

CMODE signal is low when the coupler is connected by the cellular/coupler connector as shown in FIG. 3.

GND for those signals.

Whether a plug is inserted in the jack terminal or not is indicated by the JACK signal to the CPU, and the transmission level is changed in accordance with the communication mode such as the cellular connection mode, the coupler connection mode or the subscriber line connection mode, and the reception signal is selected depending on the cellular connection mode, the coupler connection mode or the subscriber line connection mode.

The communication speed is set to 4800 bps in the cellular/coupler connection mode and 9600 bps in the subscriber line connection mode.

By sending the CMODE signal of the cellular/coupler connection to the CPU, whether it is the mobile terminal or the acoustic coupler can be determined and the transmission level which fits thereto is sent out and the reception level which fits thereto is selected.

An NCU 1001-15 captures the subscriber line by a line capture relay by the DC capture, the 2/4 wire conversion and the control by the CPU 1001-1.

A power supply 1001-16 supplies powers to the respective units. It supplies a DC voltage of +12 volts by one of three configurations shown in FIGS. 11A to 11C.

Figure 11A:
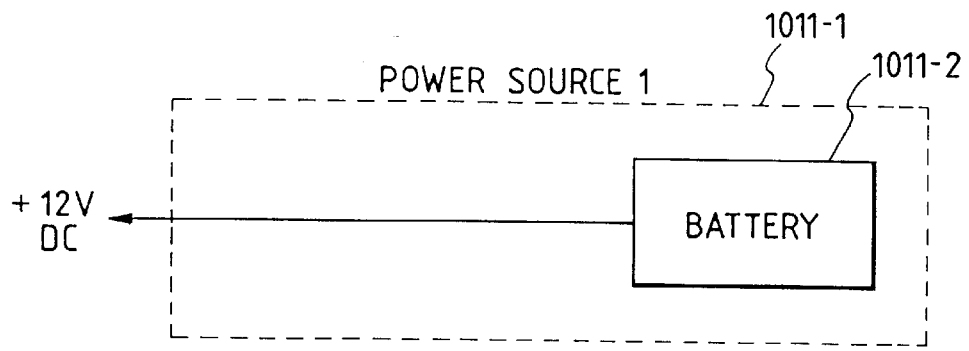
FIGS. 11A, 11B and 11C show block diagrams of a configuration of a power supply.

A power supply 1011-1 shown in FIG. 11A comprises a battery 1011-2 of DC +12 volts and supplies a voltage of DC +12 volts to the respective unit of the main unit.

Figure 11B:
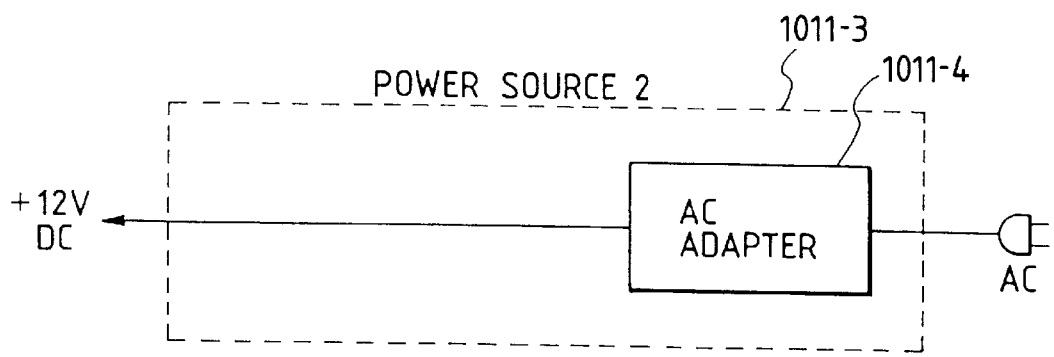

A power supply 1011-3 shown in FIG. 11B comprises an AC adaptor 1011-4 for converting an AC power input to DC +12 volts. It supplies powers of DC +12 volts to the respective units of the main unit.

Figure 11C:
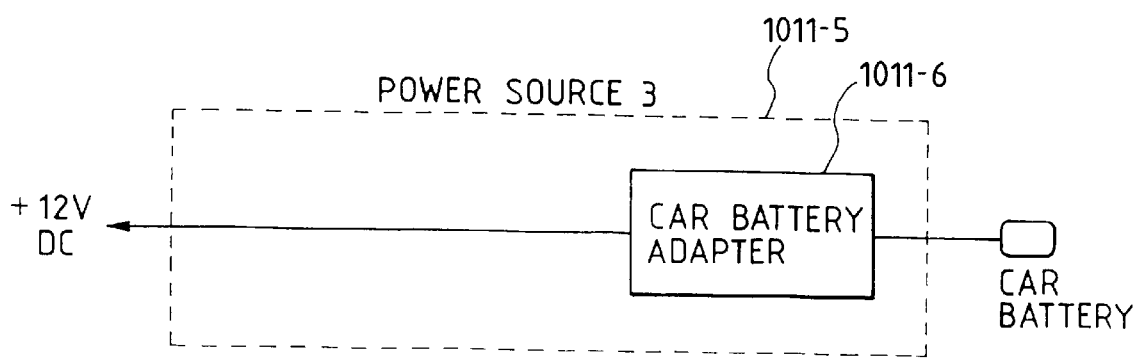

A power supply 1011-5 shown in FIG. 11C comprises a car battery adaptor 1011-6 which converts a DC power from a car mounted battery. It supplies powers of DC +12 volts to the respective units of the main body.

A voltage converter 1001-17 comprises a series regulator, a switching regulator and a DC/DC converter. It converts the DC +12 volts supplied from the power supply 1001-14 to DC +5 volts.

FIG. 2 shows a block diagram when the main unit of the present invention is connected to the mobile terminal. When the mobile terminal 1002-1 is connected the portable facsimile 1002-2, the CMODE signal is open in the cellular unit so that the signal applied to the CPU 1001-1 of the main unit is high.

FIG. 3 shows a block diagram when the main unit of the present invention is connected to the acoustic coupler. When the acoustic coupler 1003-1 is connected to the portable facsimile 1003-2, the CMODE signal is connected to GND in the coupler so that the signal applied to the CPU 1001-1 is low.

An operation in the above configuration is explained with reference to flow charts of FIGS. 4, 5A, 5B and 6. This product is stored in ROM 1001-2 as a program for CPU 1001-1.

After the power-on, a standby mode is started. In a step S1001, the loading of a document sheet is determined by checking the presence or absence of the document sheet. If the document sheet has been loaded, the document sheet is fed in a step S1002 and the process proceeds to a step S1006.

If the document sheet has not been loaded, the process proceeds to the step S1006.

In the step S1006, the loading of a record sheet is determined by checking the presence or absence of the record sheet, and if the record sheet has been set, the record sheet is fed in a step S1007 and the process proceeds to a step S1008.

If the record sheet has not been set, the process proceeds to the step S1008.

In the step S1008, whether any key of the console unit 1001-8 has been depressed or not is determined, and if it has been depressed, a key operation of a flow C1 is started.

If none of the keys has been depressed, a flow B1 is started. Whether the mode switch is in a manual mode or not is determined in a step S1005, and if it is in the manual mode, a tone signal or a pulse signal sent to switch from the telephone set to the facsimile apparatus is detected in steps S1011 and S1012. The tone signal is detected by a modem and the pulse signal is detected by the CPU by the OFF-HOOK signal of the NCU.

If none of the signals is detected, the process returns to the stand-by status, and if any signal is detected, a CML relay of the NCU is switched from the externally connected telephone to the facsimile apparatus through the contact by the CML signal from the CPU of the main unit, and the process proceeds to the reception mode of the step S1027.

In the step S1005, if the mode switch is not in the manual mode, whether the mode switch is in a FAX/TEL automatic switching mode or not is determined in a step S1009, and if it is in the FAX/TEL automatic switching mode, a CI signal is detected by a CI signal from a CI detector of the NCU by the CPU in a step S1013. If the CI signal is not detected, the process returns to the stand-by status, and if it is detected, a voice message 1 "Now calling. Please wait for a while." is sent from the modem 1001-7 through TX of the NCU in a step S1014, and in a step S1015, a busy tone signal BT is detected by the modem of the main unit. When the BT signal is detected, the line is released in a step S1016 and the process returns to the stand-by status. If it is not detected, a CNG signal at 1100 Hz is detected or an FC signal is detected. If any of the signals is detected, the reception mode of the step S1027 is started, and if none of the signals is detected, a buzzer sound is generated in a step S1019 to inform that the destination is a telephone set.

After the buzzer sound has been generated, an OFF-HOOK signal is detected to determine whether the handset has been hooked off or not in a step S1020. If it is detected, the buzzer sound is stopped in a step S1021, and in a step S1022, the line is switched to a subtelephone and the process returns to the stand-by mode.

If the OFF-HOOK signal is not detected, the buzzer sound is stopped in a step S1023 and, in a step S1024, a voice message 2 "Called but no one was around there. If you are on a facsimile apparatus, please send." from the modem 1001-7 and the reception mode of the step S1027 is started.

In the step S1009, if the mode switch is not in the FAX/TEL automatic switching mode, whether the mode switch is in an automatic responding and recording telephone connection mode or not is determined in a step S1010, and if it is not, the process returns to the stand-by mode. If it is in the automatic responding and answering telephone connection mode, the CNG signal is detected in a step S1025. If it is detected, the process returns to the reception mode of the step S1027.

If the CNG signal is not detected, whether the destination is soundless or not is determined in a step S1026 and if it is soundless, the reception mode of the step S1027 is started. If it is not soundless, the process returns to the stand-by status.

An operation flow C1 is now explained.

In a step S1040, whether a copy key has been depressed or not is determined, and if it has been depressed, a copy mode is started in a step S1046.

If the copy key has not been depressed, whether a start key has been depressed or not is determined in a step S1041.

Figure 7:
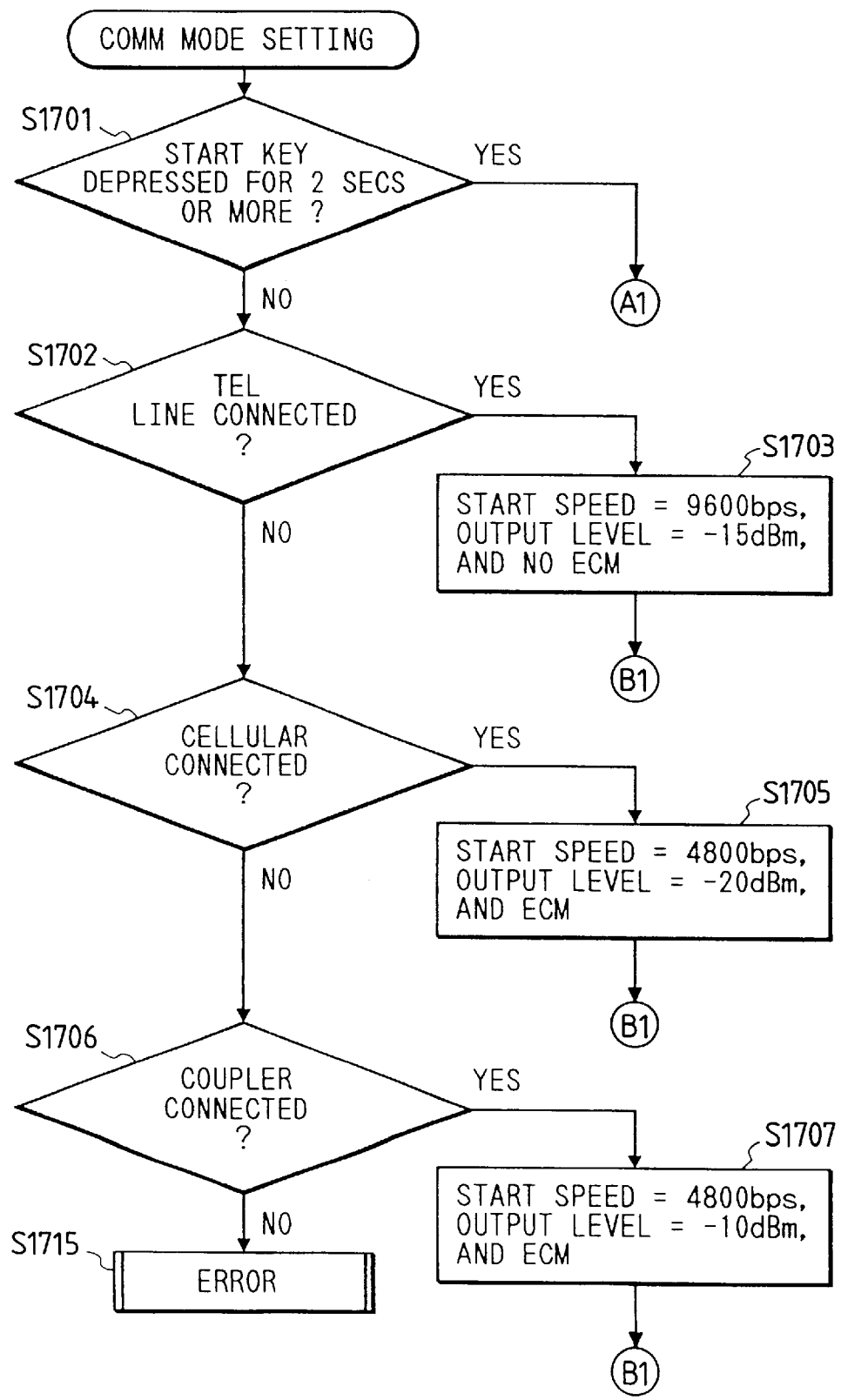
FIG. 7 shows a flow chart of a communication mode set operation in the first embodiment.
Figure 8:
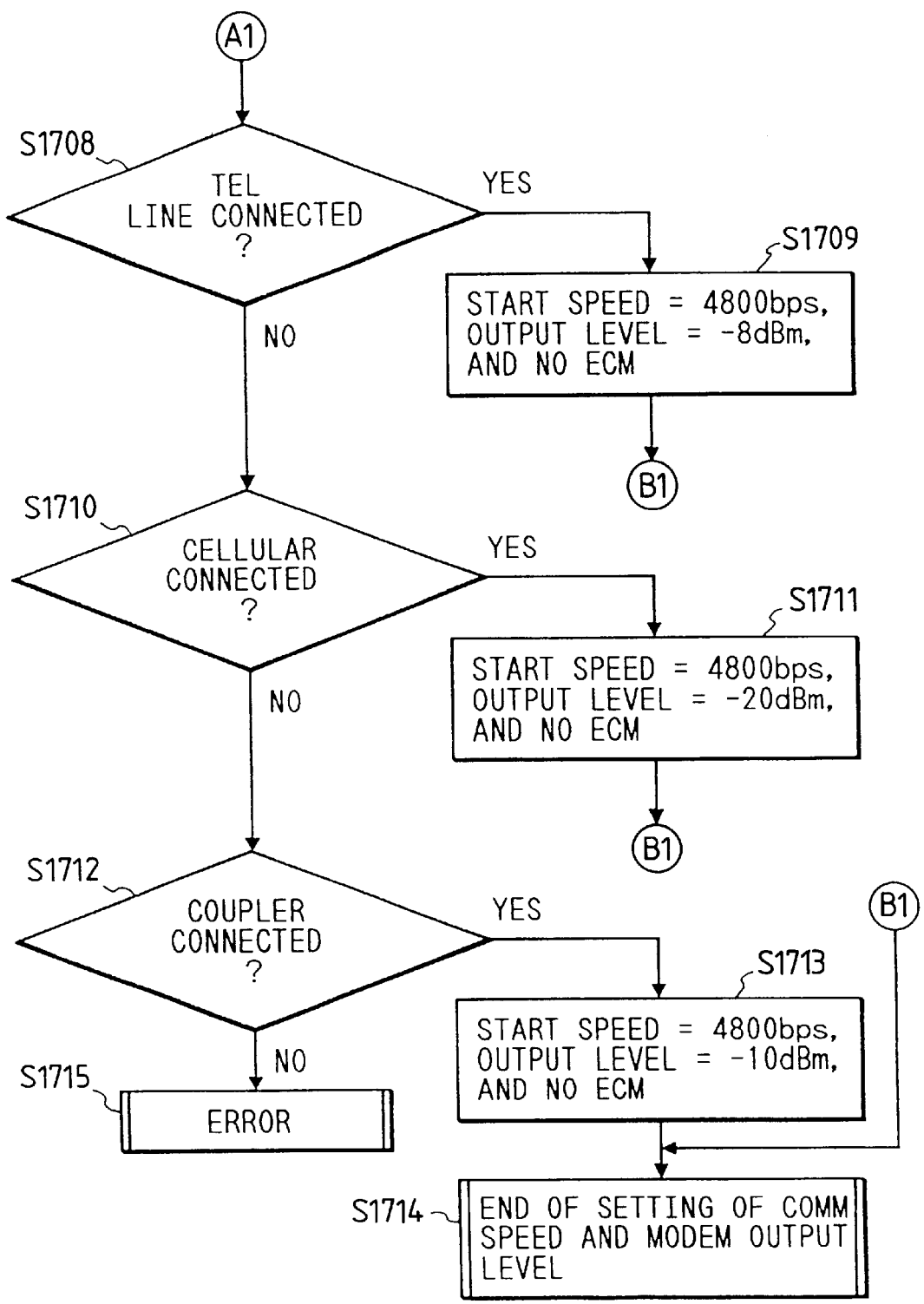
FIG. 8 shows a flow chart of a communication mode set operation in the first embodiment.

If the start key has been depressed, a communication mode which will be explained in detail hereinlater with reference to FIGS. 7 and 8 is set, and in a step S1047, the presence or absence of a transmission document sheet is determined. If the document sheet is present, the same operation as that of the prior art facsimile manual transmission is conducted in a step S1049.

If the document sheet is not present, the reception mode is started in a step S1048.

In the step S1041, if the start key has not been depressed, whether a transmission mode key has been depressed or not is determined in a step S1042, and if it has been depressed, the transmission mode is set to either fine or standard in a step S1050.

If the transmission mode key has not been depressed, whether an economy key has been depressed or not is determined in a step S1043. If it has been depressed, an economy mode in which intermittent printing is conducted is set in a step S1051.

If the economy key has not been depressed, whether a reception mode key has been depressed or not is determined in a step S1044. If it has been depressed, the reception mode is set to one of a manual mode, a FAX/TEL switching mode and an automatic responding and recording telephone connection mode in a step S1052 and the selected mode is displayed by the LED on the display.

If the reception mode key has not been depressed, whether a stop key has been depressed or not is determined in a step S1045. If it has been depressed, the operation is immediately stopped in a step S1053 and the process returns to the stand-by status.

If the stop key has not been depressed, that is, if none of the keys has been depressed, the process returns to the stand-by status.

An operation in setting the communication mode in the present embodiment is now explained with reference to a flow chart of FIG. 7.

Figure 6:
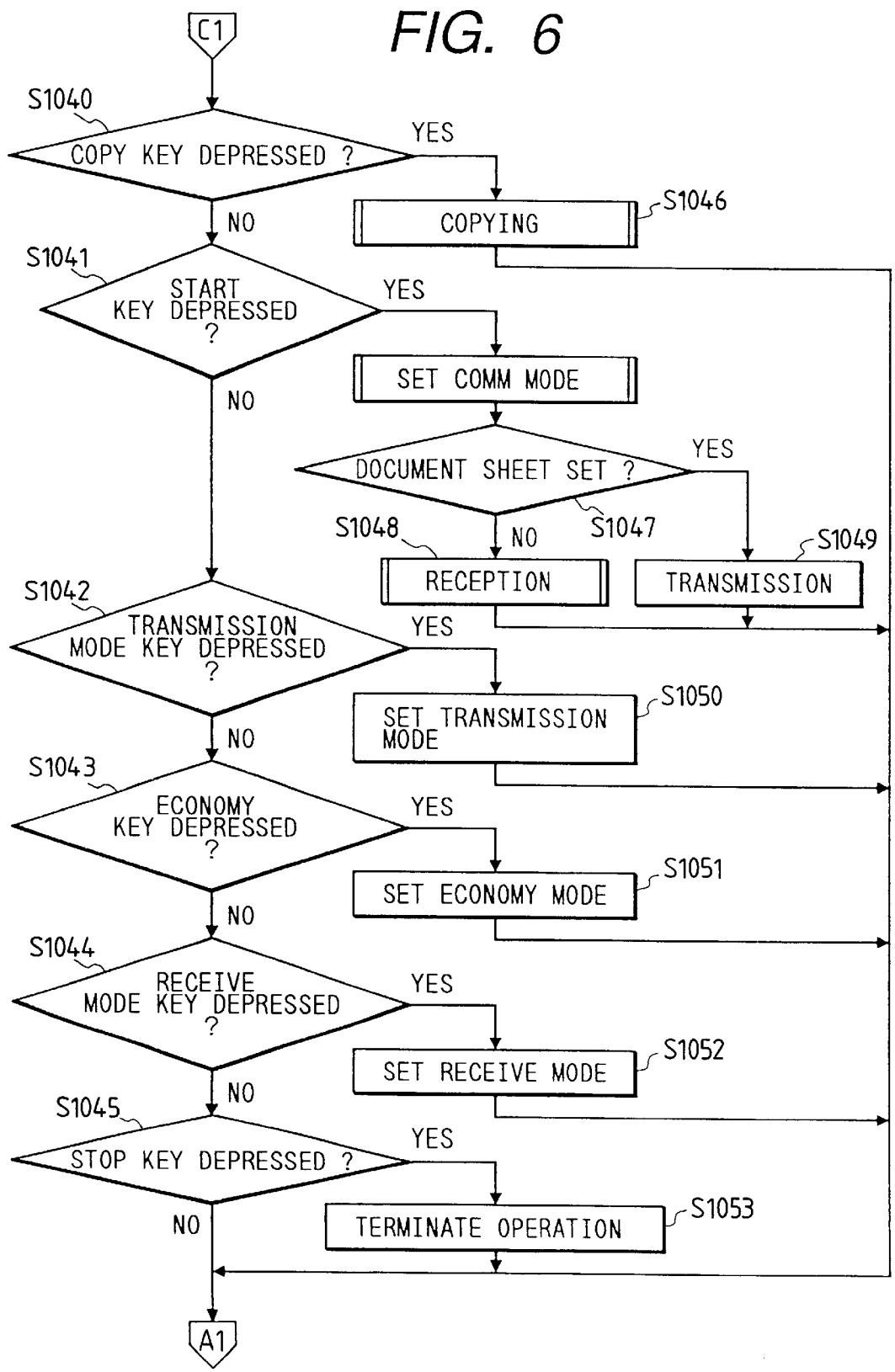
FIG. 6 shows a flow chart of a facsimile operation in the first embodiment.

If the start key has been depressed in the step S1041 of the flow chart of FIG. 6, the communication mode is set before the transmission and the reception.

If the start key is depressed continuously for longer than two seconds in a step S1701, a signal to inform it to an operator from the buzzer is outputted two seconds after the start of the depression.

When the start key is not depressed for two seconds:

If the telephone line is connected to the modular jack (JACK=low) in a step S1702, a communication start speed is set to 9600 bps and the modem transmission level is set to −15 dBm in a step S1703, without ECM.

If the cellular phone connection cable is connected to the main unit (JACK=high, CMODE=high) in a step S1704, the communication start speed is set to 4800 bps and the modem transmission level is set to −20 dBm in a step S1705, with ECM.

If the acoustic coupler is connected to the main unit (JACK=high, CMODE=low) in a step S1706, the communication start speed is set to 4800 bps and the modem transmission level is set to −10 dBm in a step S1707, with ECM.

When the start key is depressed for longer than two seconds:

If the telephone line is connected to the modular jack in a step S1708, the communication start speed is set to 9600 bps and the modem transmission level is set to −8 dBm in a step S1709, without ECM.

If the cellular phone connection cable is connected to the main unit in a step S1710, the communication start speed is set to 4800 bps and the modem transmission level is set to −20 dBm in a step S1711, without ECM.

If the acoustic coupler is connected to the main unit in a step S1712, the communication start speed is set to 4800 bps and the modem transmission level is set to −10 dBm in a step S1713, without ECM. The process is terminated in a step S1714.

If none of the lines is connected, an error is displayed in a step S1714 and the process returns to the stand-by status.

Figure 9A:
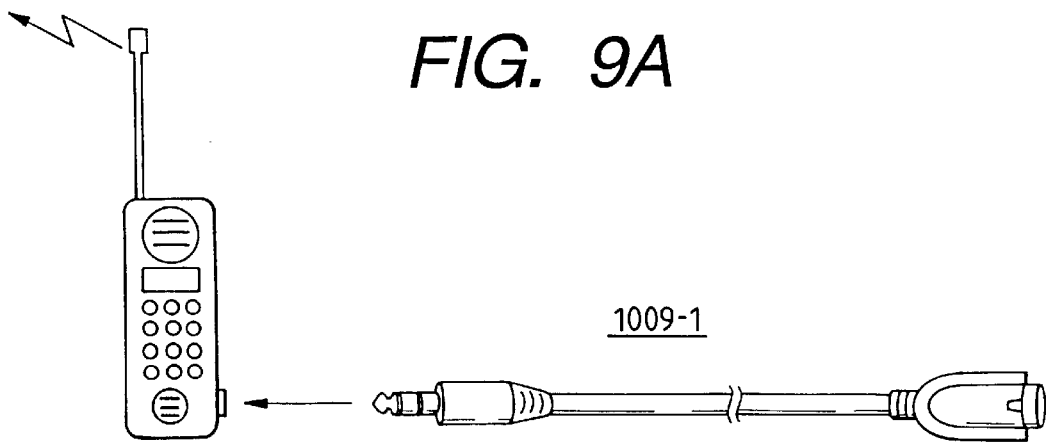
FIGS. 9A, 9B and 9C show outer views when the embodiment is connected to a mobile terminal or an acoustic coupler.
Figure 9B:
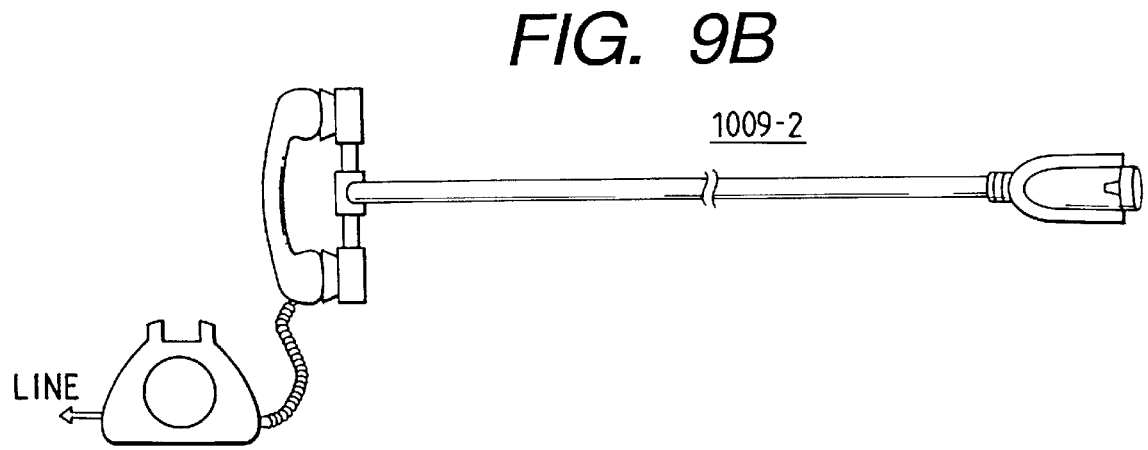
Figure 9C:
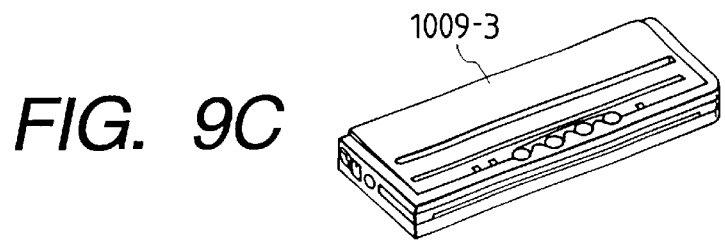

FIGS. 9A to 9C show an outer view of the present invention. FIG. 9C shows the main unit of the portable facsimile apparatus which is configured as shown in the block diagram of FIG. 1.

FIG. 9A shows a view when the mobile terminal is connected to the main unit of the portable facsimile apparatus and it is configured as shown by the block diagram of FIG. 2.

FIG. 9B shows a view when the acoustic coupler is connected to the main unit of the portable facsimile apparatus and it is configured as shown by the block diagram of FIG. 3.

Figure 10:
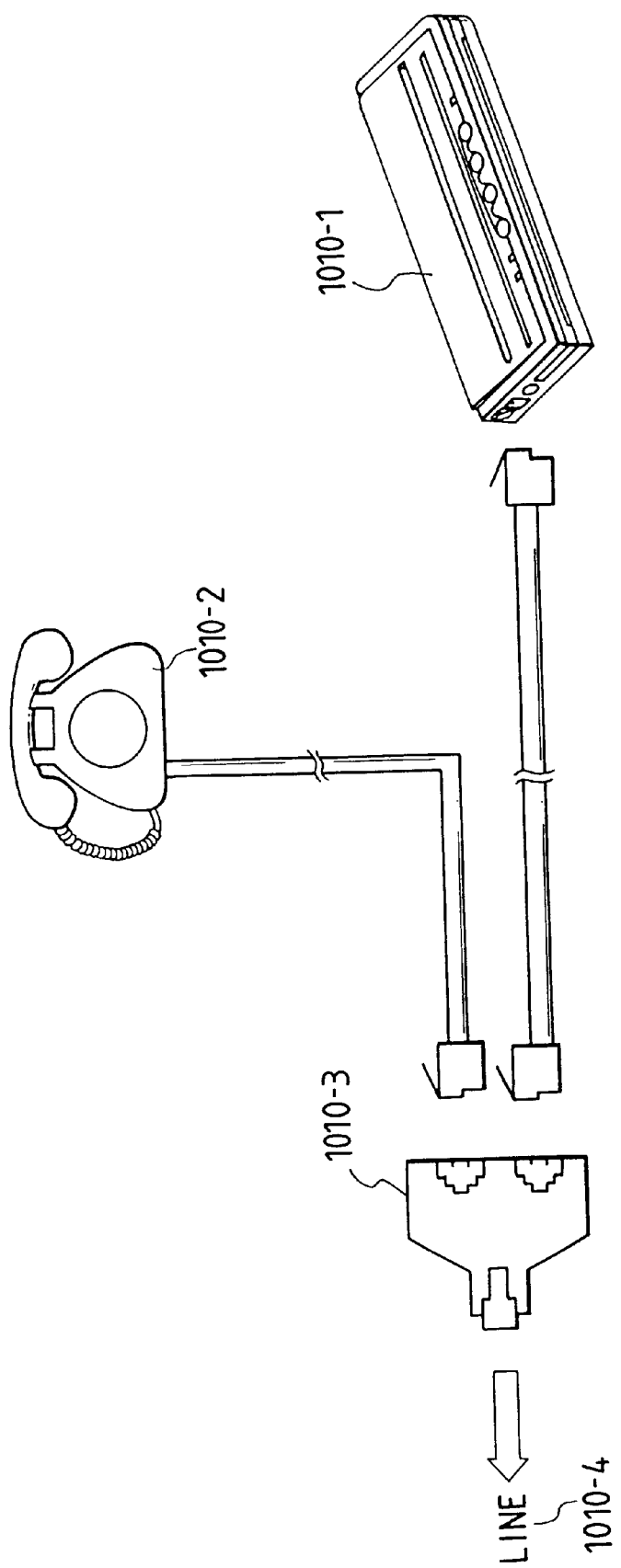
FIG. 10 shows an outer view when the embodiment is connected to a subscriber line.

FIG. 10 shows an outer views of the present invention. It shows a view when the subscriber line S1010-4 is connected to the portable facsimile main unit 1010-1. The portable facsimile apparatus 1010-1 is connected to the sub-telephone set 1010-2 by using a parallel connector 1010-3.

<Second Embodiment>

Figure 12:
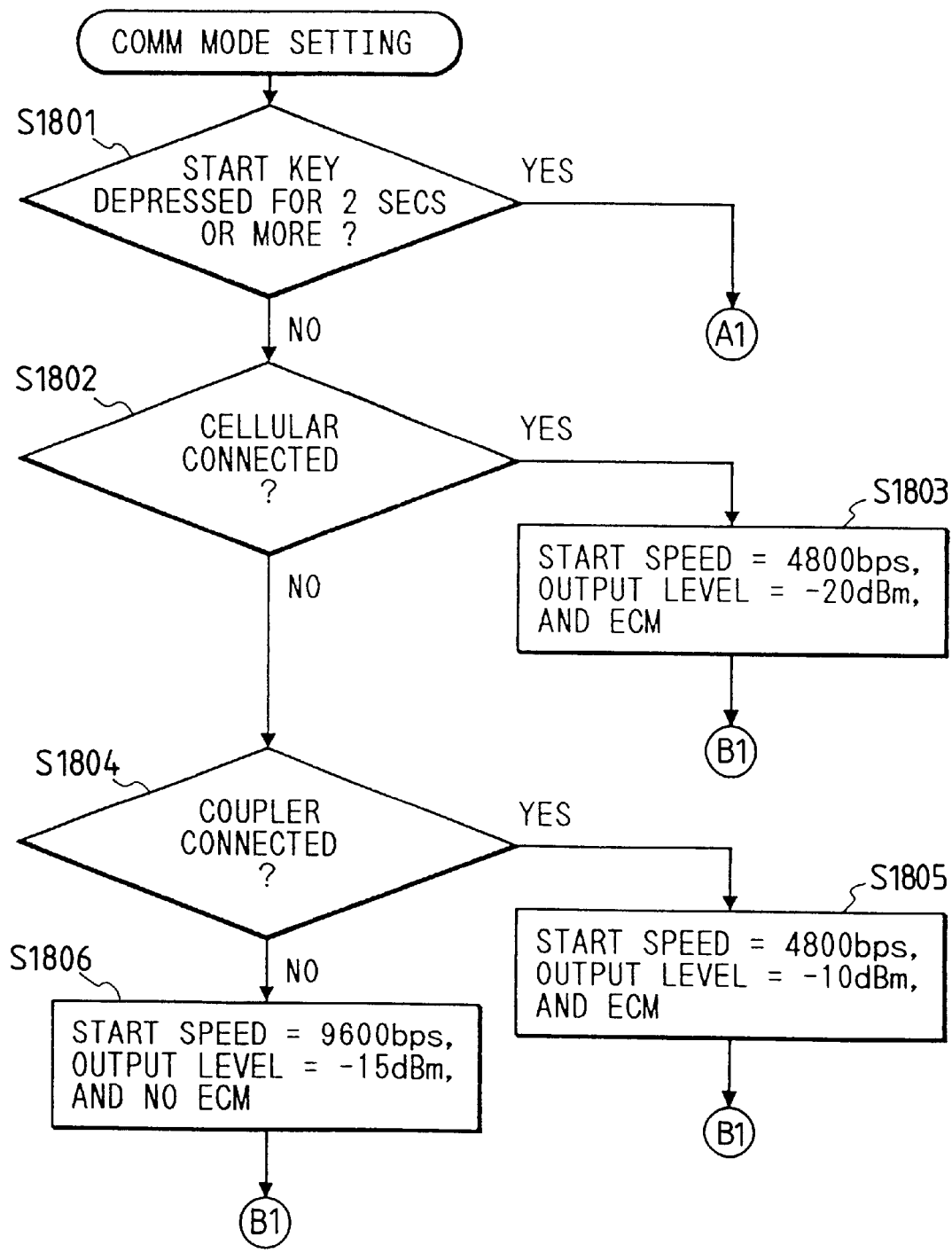
FIG. 12 shows a flow chart of the communication mode set operation in a second embodiment.
Figure 13:
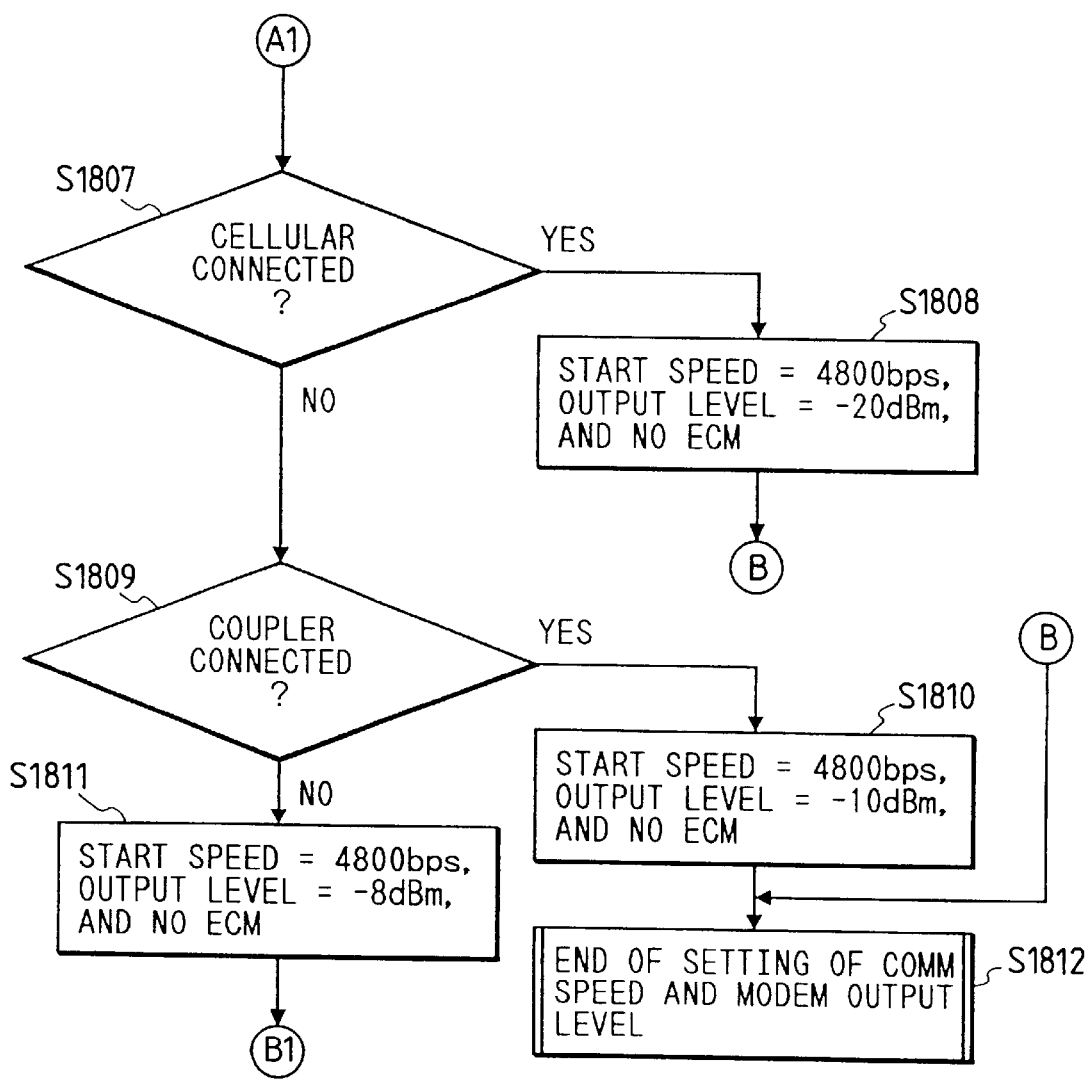
FIG. 13 shows a flow chart of the communication mode set operation in the second embodiment.

An operation is setting the communication mode in the second embodiment is now explained with reference to FIGS. 12 and 13.

If the start key has been depressed in the step S1041 of the flow chart of FIG. 6, the communication mode is set before the transmission and the reception.

In a step S1801, if the start key is depressed continuously for longer than two seconds, a signal to inform it from the buzzer of the main unit to an operator is outputted two seconds after the start of the depression.

When the start key is not depressed for two seconds:

If the cellular phone connection cable is connected to the main unit in a step S1802, the communication start speed is set to 4800 dBm and the modem transmission level is set to −20 dBm in a step S1803, with ECM.

If the acoustic coupler is connected to the main unit in a step S1804, the communication start speed is set to 4800 bps and the modem transmission level is set to −10 dBm in a step S1805, with ECM.

If none of them is connected, it is assumed that the telephone line is connected to the modular jack and the communication start speed is set to 9600 bps and the modem transmission level is set to −15 dBm in a step S1806, without ECM.

When the start key is depressed for longer than two seconds:

If the cellular phone connection cable is connected to the main unit in a step S1807, the communication start speed is set to 4800 bps and the modem transmission level is set to −20 dBm in a step S1808, without ECM.

If the acoustic coupler is connected to the main unit in a step S1809, the communication start speed is set to 4800 bps and the modem transmission level is set to −10 dBm in a step S1810, without ECM.

If none of them is connected, it is assumed that the telephone line is connected to the modular jack and the communication start speed is set to 9600 bps and the modem transmission level is set to −8 dBm in a step S1811, without ECM.

Then, in a step S1812, this process is terminated.

As described above, the transmission level is changed when the start key is depressed continuously for longer than two seconds so that the communication is attained even if the portable facsimile apparatus is connected to the line remote from the station.

<Third Embodiment>

An embodiment according to the present invention will be described in detail with reference to the accompanying drawings.

Figure 14:
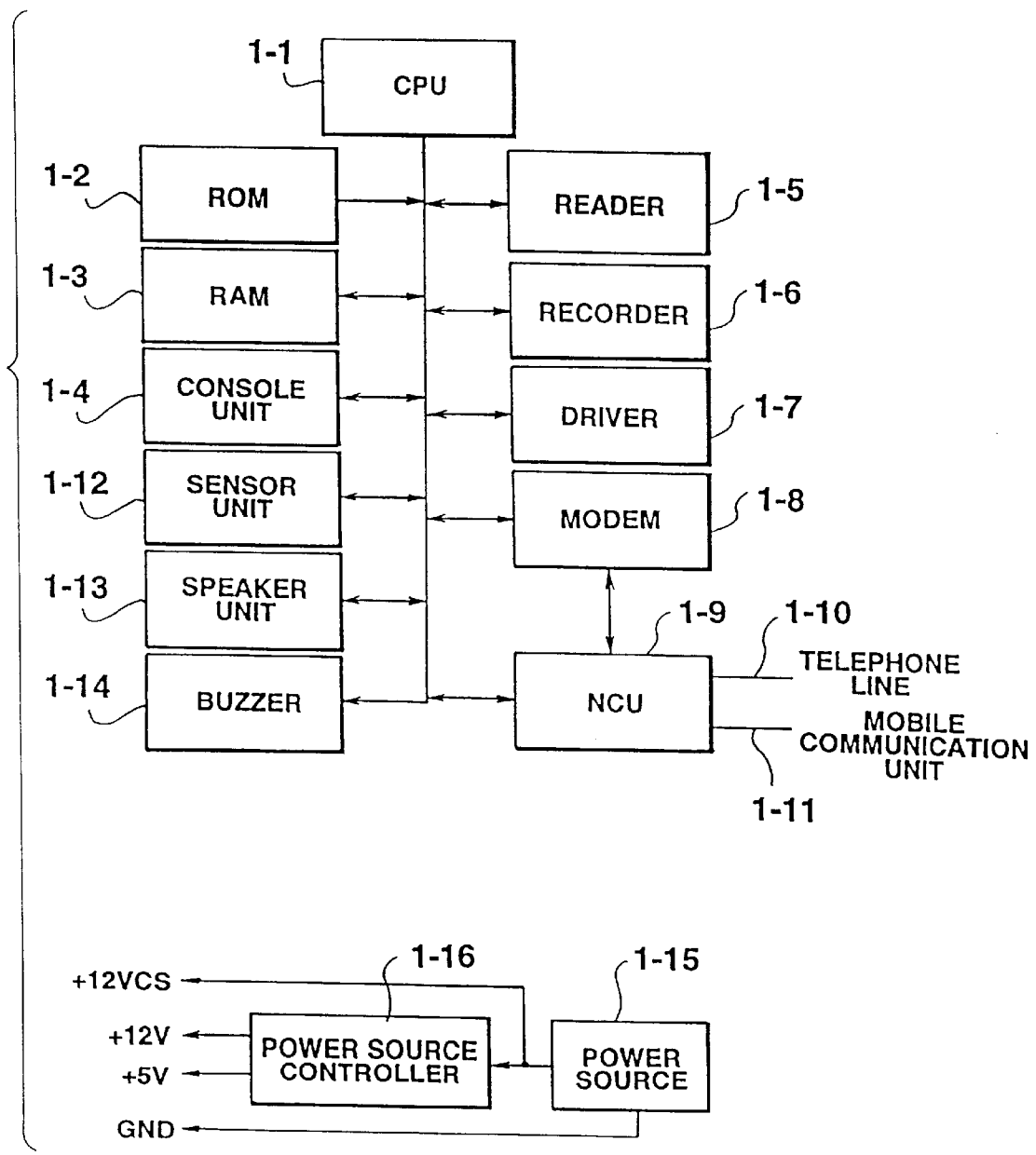
FIG. 14 is a block diagram showing the arrangement of a main body of a portable facsimile apparatus according to a third embodiment of the present invention.

FIG. 14 is a block diagram showing the arrangement of a main body according to this embodiment.

Referring to FIG. 14, a CPU 1-1 controls the overall operation of the portable facsimile apparatus according to programs stored in ROM 1-2, i.e., the function of controlling RAM 1-3, console unit 1-4, reader 1-5, recorder 1-6, driver 1-7, modem 1-8, NCU 1-9, telephone line 1-10, mobile communication unit 1-11, sensor unit 1-12, speaker unit 1-13, buzzer 1-14, power source 1-15, and power source controller 1-16.

RAM 1-3 stores binary image data read by reader 1-5, binary image data to be recorded by the recorder 1-6, and binary data to be modulated by modem 1-8 and transmitted through NCU 1-9 to telephone line 1-10. A signal received through the telephone line 1-10 is demodulated by modem 1-8 through NCU 1-9, and the demodulated binary data is stored in RAM 1-3.

Console unit 1-4 includes a transmission/reception start key, a mode key for designating an image quality mode, such as fine or standard, of the image to be transmitted, a copy key for performing a copying operation, an economy key for designating an energy-saving mode in recording/printing by use of a battery, and a stop key for stopping the operation of the main body. The CPU 1-1 detects the states of each of the console unit keys and controls the respective components in accordance with the states of each of the keys.

Reader 1-5 includes a DMA controller, a CCD or contact image sensor (CS), a TTLIC, a binarizing circuit, etc. The reader 1-5 causes the CCD or CS to convert the read data into binary data, under the control of CPU 1-1 and sequentially sends the binary data to RAM 1-3.

Recorder 1-6 includes a DMA controller, a B4/A4 size thermal head, a TTLIC, etc. The reader 1-6 reads out the recorded data from RAM 1-3 under the control of CPU 1-1 and prints out the recorded data as a hard copy.

Driver 1-7 includes a stepping motor for driving feed/discharge rollers in reader 1-5 and recorder 1-6, gears for transmitting the driving force of the motor, a driver circuit for controlling the motor, etc.

Modem 1-8 includes any suitable modem, such as G3, G2, G1 and old FM modems, a clock generator connected to the modems, etc. The modem 1-8 modulates the transmission data stored in RAM 1-3 under the control of CPU 1-1 and outputs the modulated data to telephone line 1-10 or mobile communication unit 1-11 through NCU 1-9. In addition, modem 1-8 receives an analog signal from telephone line 1-10 or mobile communication unit 1-11 through NCU 1-9, demodulates the analog signal, and stores it in RAM 1-3. The modem 1-8 has a power-saving mode, which waves on the consumption of electric power and is operated by the CPU 1-1. In the power-saving mode, the electric power consumption can be decreased to $\frac{1}{100}$ of the normal consumption. However, when the power-saving mode is utilized, the facsimile apparatus can not perform image transmission or image reception.

NCU 1-9 comprises a DC loop circuit, a 2-to-4 wire converter, a receiving circuit, a signal detecting circuit, a line switching circuit, etc. The NCU 1-9 connects telephone line 1-10 or mobile communication unit 1-11 to modem 1-8.

The mobile communication unit 1-11 is defined as a radio communication unit, such as a portable telephone or a mobile telephone, and the mobile communication line is defined as a line used for the portable telephone and the mobile telephone.

Sensor unit 1-12 includes a recording paper width sensor, a recording paper presence sensor, a recording paper end-mark sensor, an original sheet width sensor, and an original sheet presence sensor. The sensor unit 1-12 detects the states of the original sheet and the recording paper under the control of CPU 1-1.

Speaker unit 1-13 includes a speaker and a speaker driver, and is turned on/off in accordance with the control of CPU 1-1. The speaker unit 1-13 outputs sounds of plural kinds of signals which are received through telephone line 1-10, and outputs sounds of key-touch, voice signals, and communication signals from the mobile communication unit 1-11.

Buzzer 1-14 includes a buzzer and a buzzer driver and generates a warning tone in accordance with the control of CPU 1-1.

Figure 16A:
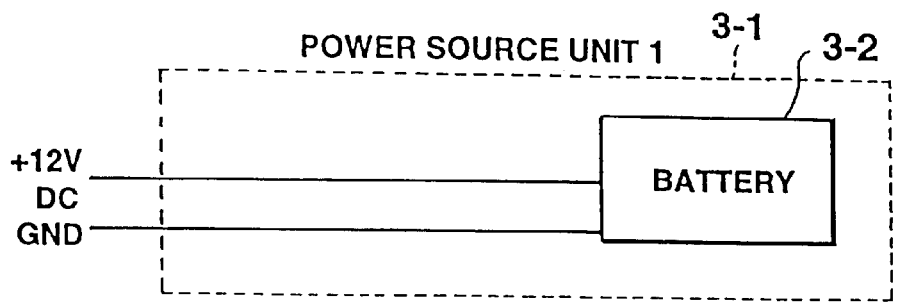
FIGS. 16A, 16B and 16C are block diagrams showing the arrangements of a power source of the main body.
Figure 16B:
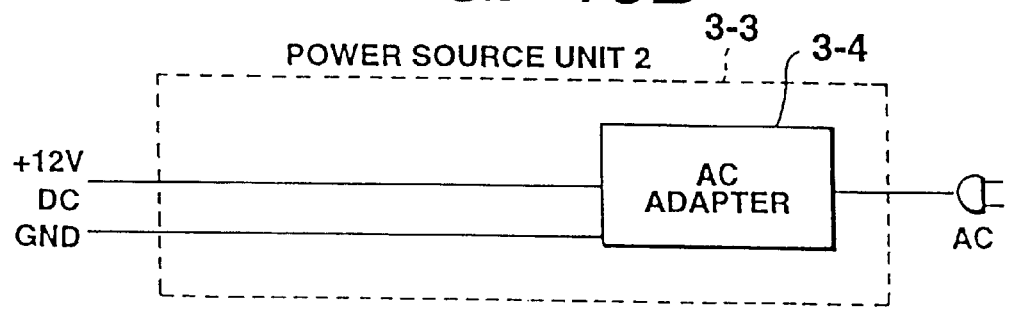
Figure 16C:
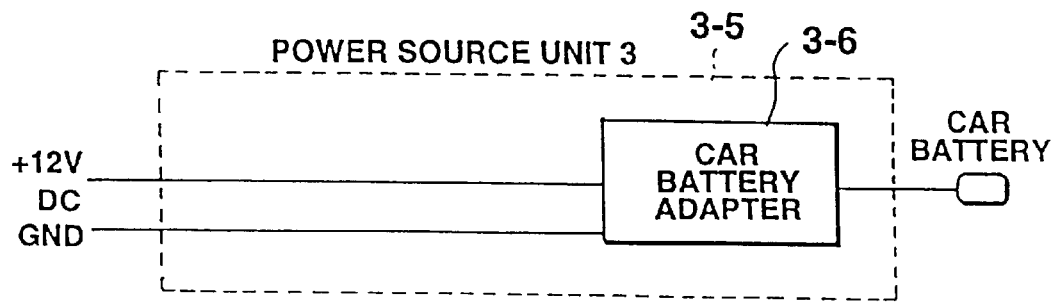

Power source 1-15 supplies power to the main body of the facsimile apparatus. The power source 1-15 supplies a DC voltage of +12 V and a GND by means of a battery, an AC power source, or a car battery (as shown in FIGS. 16A–16C).

Power source controller 1-16 includes a series regulator, a switching-regulator, a DC/DC convertor, a photovoltaic cell, and a MOSFET. The power source controller 1-16 converts the DC voltage of +12 V from power source 1-15 into a DC voltage of +5 V, and outputs the voltage of +5 V. The power source controller 1-16 is controlled by CPU 1-1. In an output sequence of the power source 1-15 and the power source controller 1-16, the DC voltage of +12 VCS is generated, then the DC voltage of +5 V is generated, and then the DC voltage of +12 V is generated. The voltage of +12 V can be turned on/off in accordance with the control of CPU 1-1.

Figure 15A:
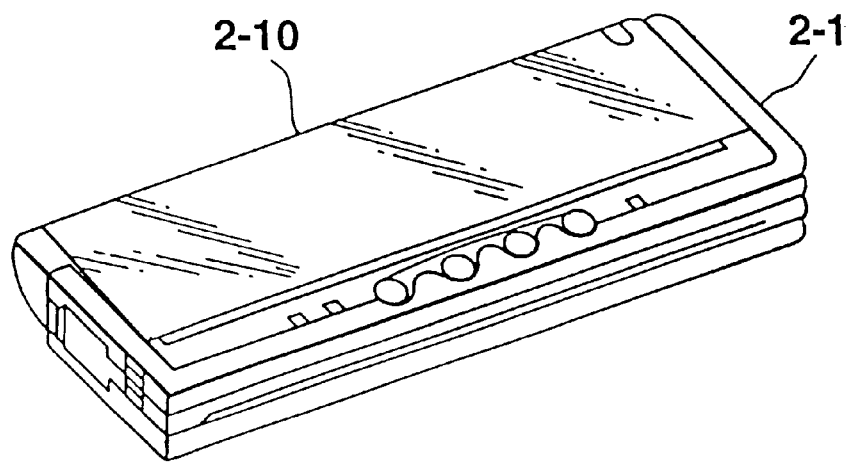
FIGS. 15A and 15B are perspective views of the portable facsimile apparatus according to the third embodiment.
Figure 15B:
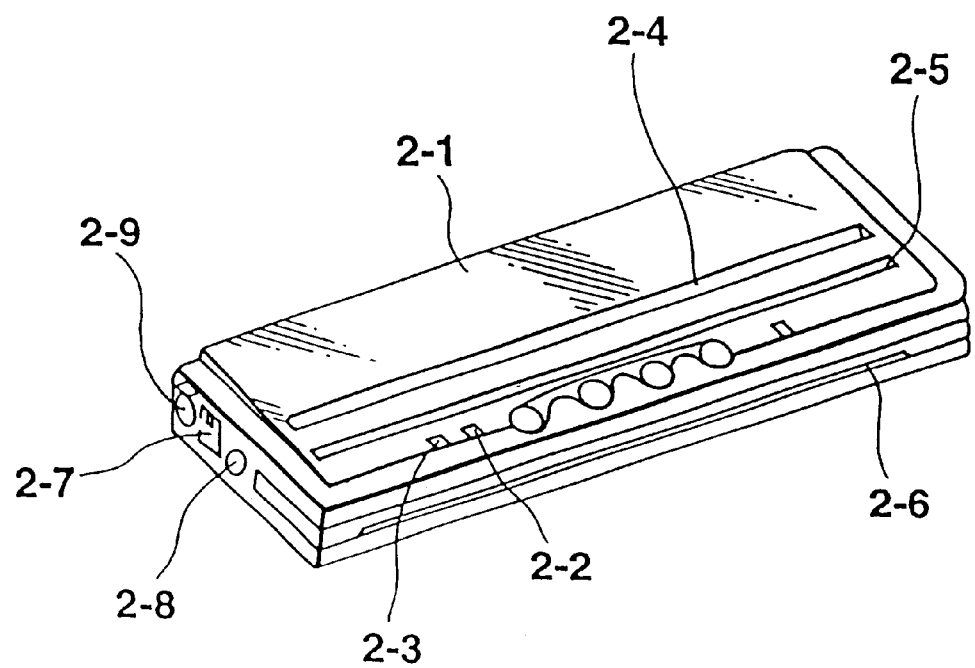

FIGS. 15A and 15B are outline views of the facsimile apparatus. Numeral 2-1 denotes the main body of the facsimile apparatus. Numeral 2-2 denotes the console unit, and numeral 2-3 denotes a display unit. Numeral 2-4 denotes a recording paper inserting unit which enables manual setting of recording paper, and numeral 2-5 denotes an original sheet inserting unit which enables manual setting of an original sheet. The original sheet inserting unit 2-5 is also used as a recorded paper discharging unit for discharging the recorded paper.

Numeral 2-6 denotes an original sheet discharging unit for discharging read original sheets. Numeral 2-7 denotes a connector for connecting the main body of the facsimile apparatus to telephone line 1-10, and numeral 2-8 denotes a connector for connecting the main body to the mobile communication unit 1-11.

Numeral 2-9 denotes a power switch for supplying the power to the main body. Numeral 2-10 denotes a holder which holds a roll of paper. FIG. 15A shows a condition wherein the holder 2-10 is attached to main body 2-1.

FIGS. 16A to 16C are block diagrams showing the structure of power source 1-15. In FIG. 16A, power source 1-15 consists of a battery 3-2 of a DC voltage of +12 V.

In FIG. 16B, power source 1-15 consists of an AC adapter 3-4 which converts the AC power source into a DC voltage of +12 V. In FIG. 16C, power source 1-15 consists of a car battery adapter 3-6 which converts a DC power from the car battery into a stabilized DC voltage of +12 V.

Figure 17:
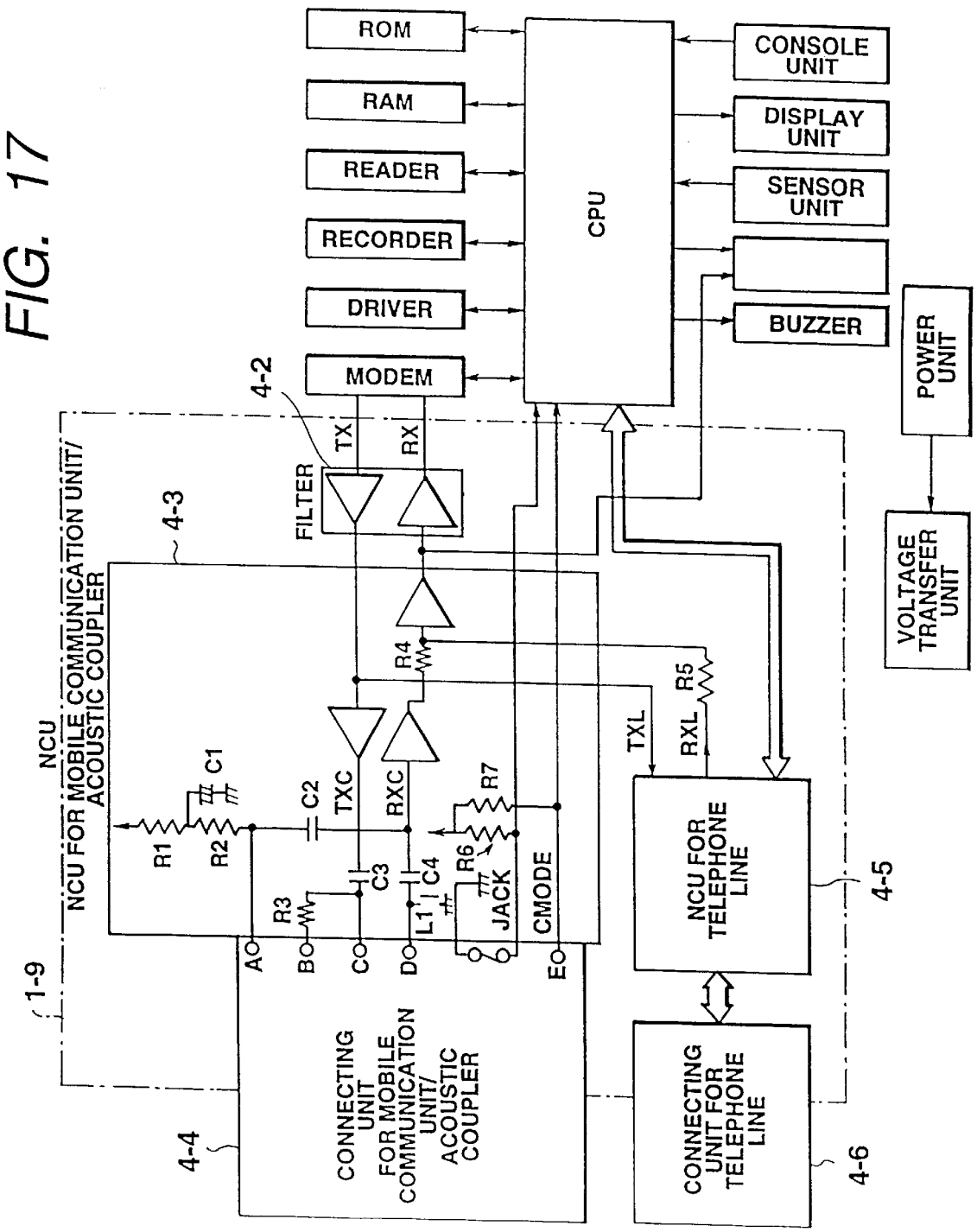
FIG. 17 is a detailed block diagram showing the arrangement of NCU 1001-15.

FIG. 17 is a block diagram showing a detailed structure of the NCU 1-9. The NCU 1-9 consists of a filter unit 4-2, an NCU 4-3 for a mobile telephone/acoustic coupler, a connector unit 4-4 for a 20 mobile telephone/acoustic coupler, an NCU 4-5 for a telephone line, and a connector unit 4-6 for a telephone line.

Filter unit 4-2 is a low-pass filter which includes OP amplifiers and other components. The NCU 4-3 for a mobile telephone/acoustic coupler is composed of OP amplifiers, resistors, condensers, inductors, etc. A signal to be transmitted is amplified by filter unit 4-2, is adjusted to a signal level corresponding to mobile communication unit 1-11 or to the acoustic coupler by the NCU 4-3, and then is output as a transmission signal TXC. A receiving signal from the mobile communication unit 1-11 is amplified by an OP amplifier of the NCU 4-3 through inductors and condensers, and is then sent to the filter unit 4-2 through an adder circuit. The signal from the condenser microphone of the acoustic coupler is amplified by an OP amplifier through condensers, and is then supplied to filter unit 4-2 through the adder circuit. The NCU 4-3 includes power source which supplies a power to the condenser microphone of the acoustic coupler. The NCU 4-3 supplies both the receiving signal RXC from the mobile communication unit/acoustic coupler, and the receiving signal RXC from the telephone line, to the filter unit 4-2 through the adder circuit. The structure of NCU 4-3 may be modified so as to supply power selectively by using an analog switch, a relay, etc.

Connector unit 4-4 is a connector having a switch, and serves as an interface for the mobile communication unit and the acoustic coupler. Terminal C supplies a transmitting signal TX from the modem 1-8 to the mobile communication unit 1-11. Terminal D supplies the receiving signal from the mobile communication unit 1-11 to the modem 1-8. Terminal A supplies the transmitting signal from the modem 1-8 to the acoustic coupler. Terminal B supplies the receiving signal from the acoustic coupler to the modem 1-8.

Figure 18:
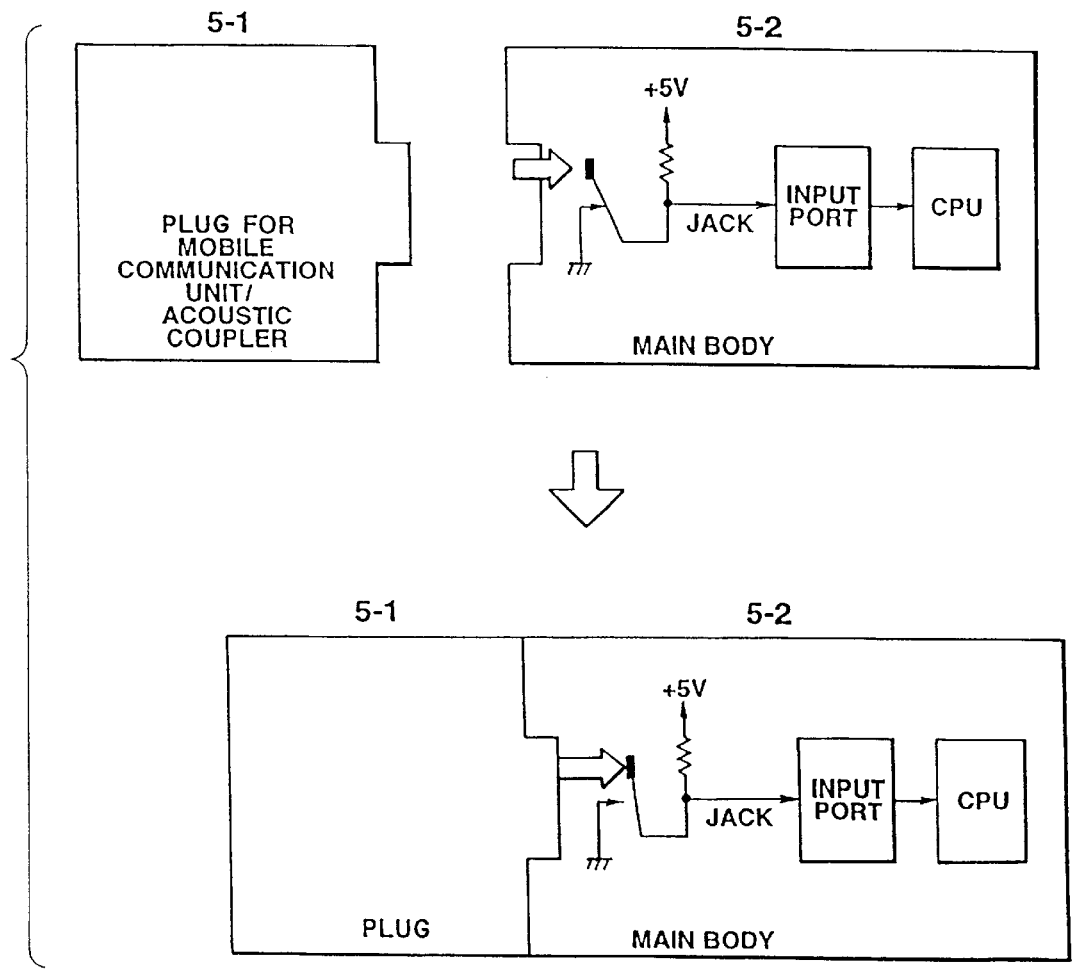
FIG. 18 is a view showing a condition of the signal JACK.

A signal JACK indicates whether a plug of the mobile communication unit 1-11 or the acoustic coupler is connected into the connector unit 4-4. The signal JACK is applied to CPU 1-1. FIG. 18 is a view showing a condition of the signal JACK. When the plug 5-1 of the mobile communication unit 1-11, or the acoustic coupler, is connected into the connector unit 4-4 of the main body 5-2, a switch in the connector unit 4-4 is turned off by the plug and the signal JACK is then switched from a LOW level to a HIGH level.

Figure 19:
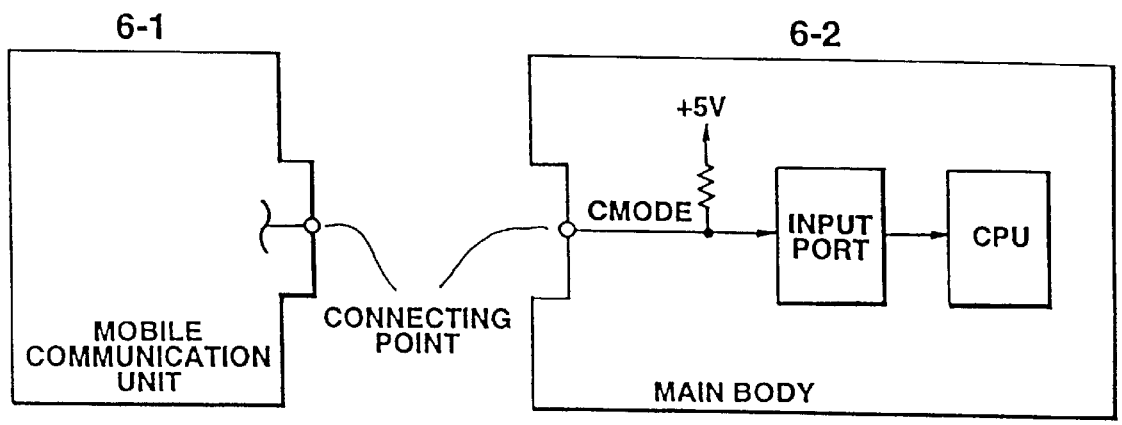
FIG. 19 and FIG. 20 are views showing a condition of the signal CMODE.
Figure 20:
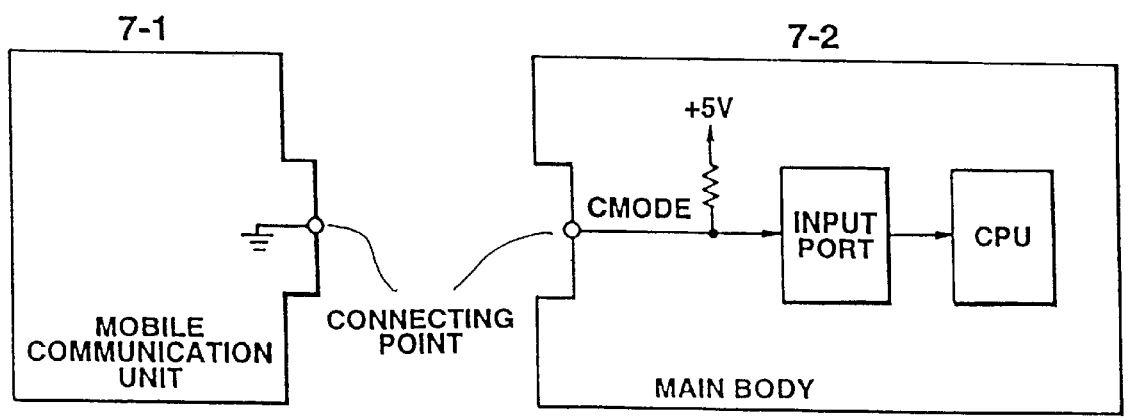

A signal CMODE (see FIG. 17) indicates whether the mobile communication unit 1-11 or the acoustic coupler is connected to the connector unit 4-4. In the case where the mobile communication unit 1-11 is connected to the connector unit 4-4 of the main body 6-2, the signal CMODE is at a HIGH level as shown in FIG. 19. On the other hand, when the acoustic coupler is connected into the connector unit 4-4 of the main body 7-2, the signal CMODE is at a LOW level as shown in FIG. 20.

The connector unit 4-4 includes a GND for the signal JACK.

By using the above-described signals, the portable facsimile apparatus checks whether any plug (the mobile communication unit or the acoustic coupler) is inserted into the connector unit 4-4 or not. The CPU then changes the level of a transmitted signal and the speed of the signal in accordance with the signal JACK.

In a case where the plug of the mobile communication unit or the acoustic coupler is inserted into the connector unit 4-4, CPU 1-1 sets a communication speed of 4800 bps. On the other hand, in a case where the telephone line is connected to the connector unit 4-6, CPU 1-1 sets the communication speed of 9600 bps (bits per second). The portable facsimile apparatus selects either the receiving signal from the connector unit 4-4 or the receiving signal from the connector unit 4-6, and switches the level of monitoring communication signals in accordance with the signal JACK.

Further, in accordance with the signal CMODE, the CPU 1-1 discriminates whether the mobile communication unit or the acoustic coupler is connected to the connector unit 4-4, and then sets the transmitting level and the receiving level at adequate values corresponding to the mobile communication unit and the acoustic coupler.

The NCU 4-5 for the telephone line includes the DC loop circuit and the 2 to 4 wire converter and sizes the telephone line in accordance with the control of the CPU 1-1.

The connector unit 4-6 is a jack unit for connecting a telephone line to this facsimile apparatus.

Figure 21:
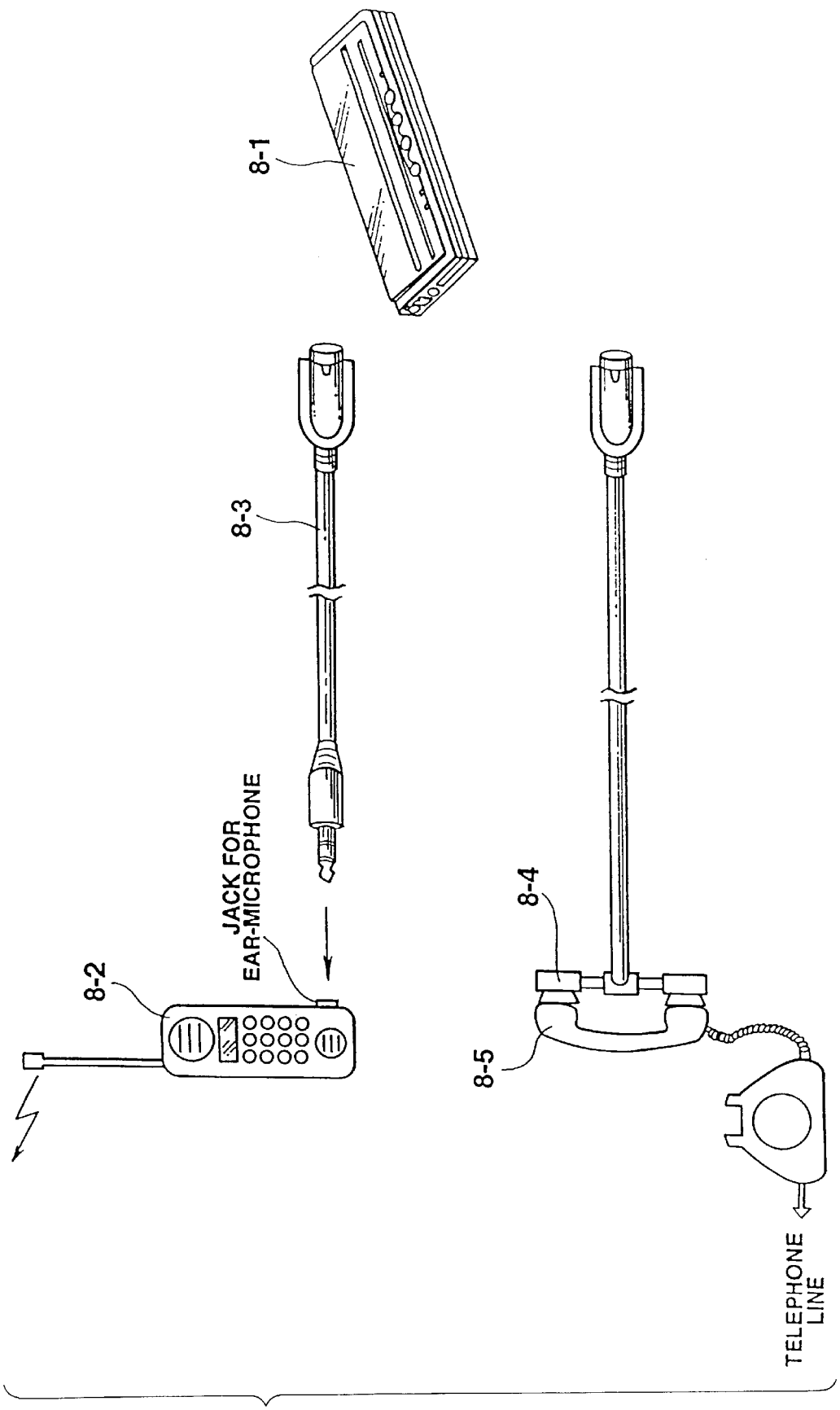
FIG. 21 is a view showing a connection condition between the main body and communication links.

FIG. 21 is a view showing a condition in which the main body 8-1 of the portable facsimile apparatus is connected to the mobile communication unit 8-2 through a cable 8-3. As shown in FIG. 19, when the mobile communication unit is connected to the main body, the signal CMODE goes to the HIGH level.

FIG. 21 also shows a condition in which the main body 8-1 is connected to the acoustic coupler 8-4 and a telephone 8-5. As shown in FIG. 20, when the acoustic coupler 8-4 is connected to the main body, the signal CMODE goes to the LOW level.

Figure 22:
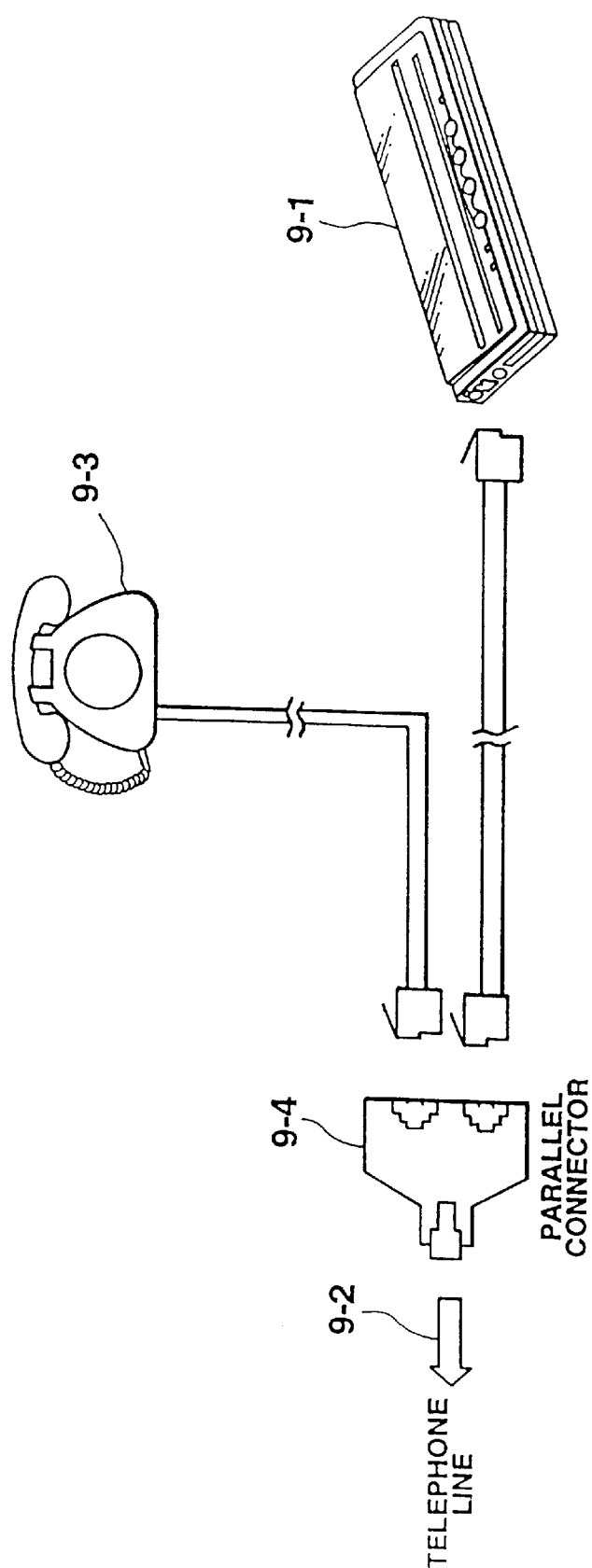
FIG. 22 is a view showing a connecting condition of the main body, a telephone and a communication line through a parallel connector.

FIG. 22 shows a condition in which the main body of the portable facsimile apparatus is connected to the telephone line 9-2 and a telephone 9-3 through a parallel connector 9-4.

The operation of the portable facsimile apparatus will now be described as follows. The control programs which are performed by CPU 1-1 have been stored in ROM 1-2.

Figure 23:
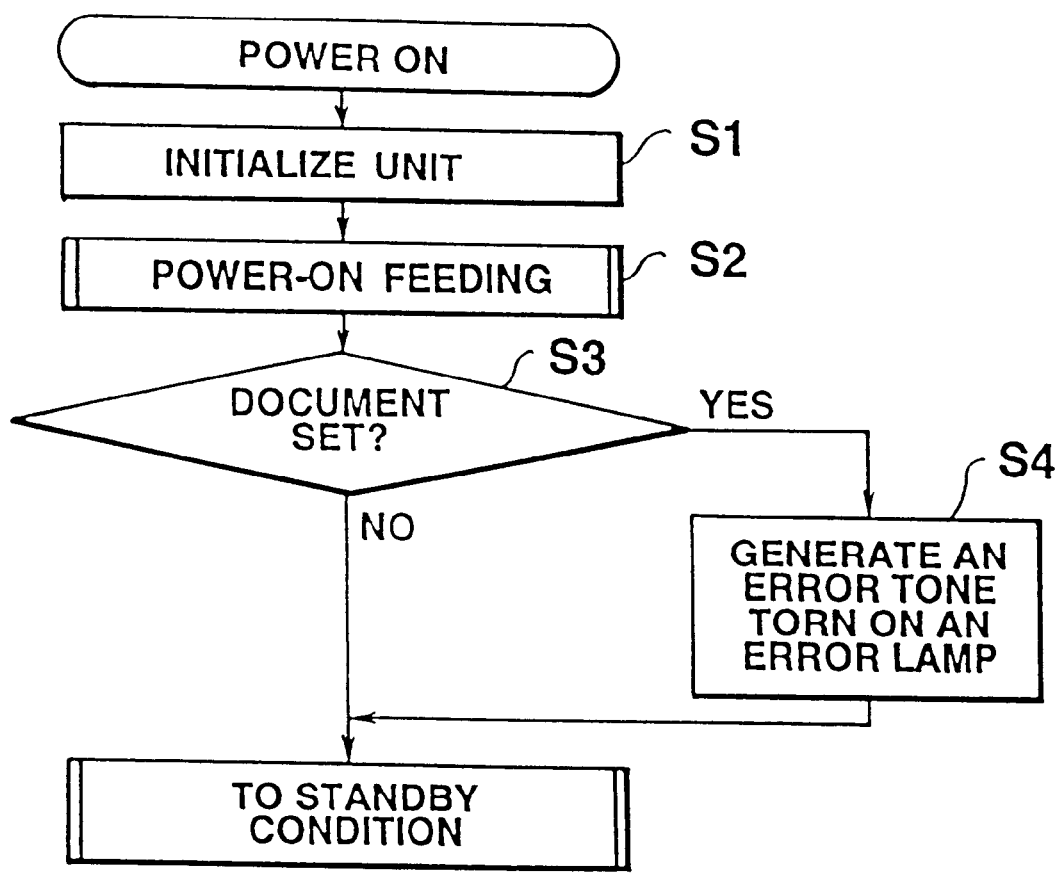
FIG. 23 is a flow chart showing a power-on operation.

When power is supplied to the portable facsimile apparatus, in step S1 of FIG. 23 CPU 1-1 initializes each unit described above in the system of the portable facsimile apparatus. In step S2, CPU 1-1 performs a feeding operation when power is turned on. In the feeding operation, CPU 1-1 switches a pendulum, which is in a switching unit of a driver, from a recording sheet side to an original sheet side, by means of rotating a motor in the driver. The portable facsimile apparatus uses the driving power of the motor to transfer either an original document or a recording sheet by switching the pendulum setting. The feeding operation will be described in detail below. In step S3, CPU 1-1 discriminates whether an original document is set in reader 1-5 when the power is turned on. In a case where an original document is present, in step S4 CPU 1-1 turns on an error lamp and generates an alarm to inform an operator of it and then shifts to a standby mode, shown in FIG. 24.

Figure 24:
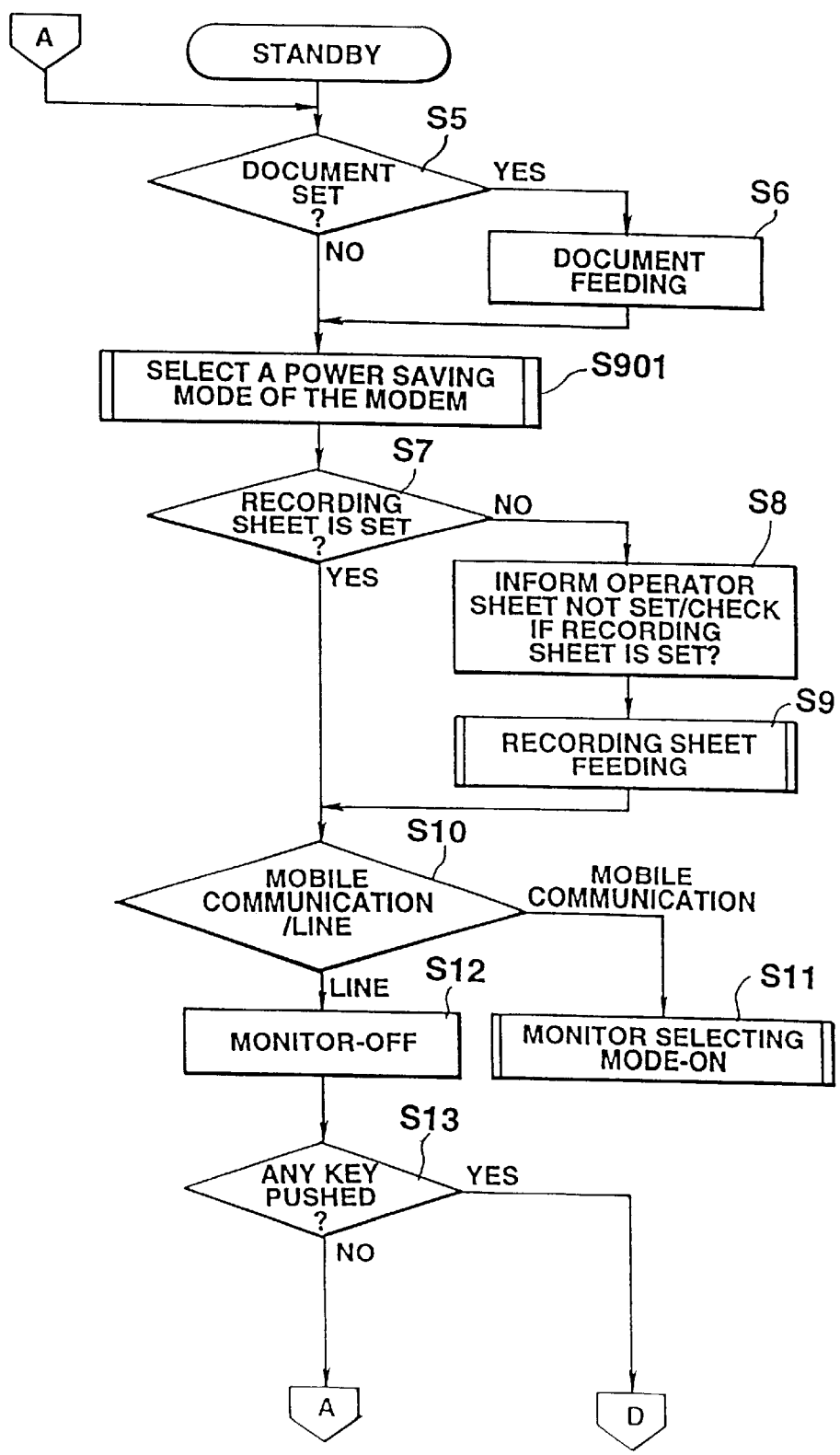
FIG. 24 and FIG. 25 together form a flow chart showing a standby operation.

In step S5 of FIG. 24, the CPU 1-1 discriminates whether an original document has been set in reader 1-5. In the case where an original document is present, CPU 1-1 feeds the original document to a reading position in the reader 1-5 in step S6. In step S901, CPU 1-1 sets the modem 1-8 into the power-saving mode. In step S7, the CPU 1-1 discriminates whether a recording sheet has been set in the recorder 1-6. In a case where no recording sheet has been set, CPU 1-1 performs an operation of indicating that no recording sheet has been set, and again checks whether a recording sheet is set in step S8. If a recording sheet has been set, in step S9 the CPU 1-1 performs the operation of feeding the recording sheet. Then, in step S10, the CPU 1-1 discriminates whether a line connected to the main body is the mobile communication unit 1-11 or the telephone line 1-10. In a case where the connected line is the mobile communication unit 1-11, in step S11 the CPU 1-1 performs an operation (FIG. 31) of setting a monitor mode which outputs a communication signal from the speaker unit 1-13. On the other hand, in a case where the connected line is the telephone line 1-10, in step S12 the CPU 1-1 sets the monitor mode to off.

Figure 25:
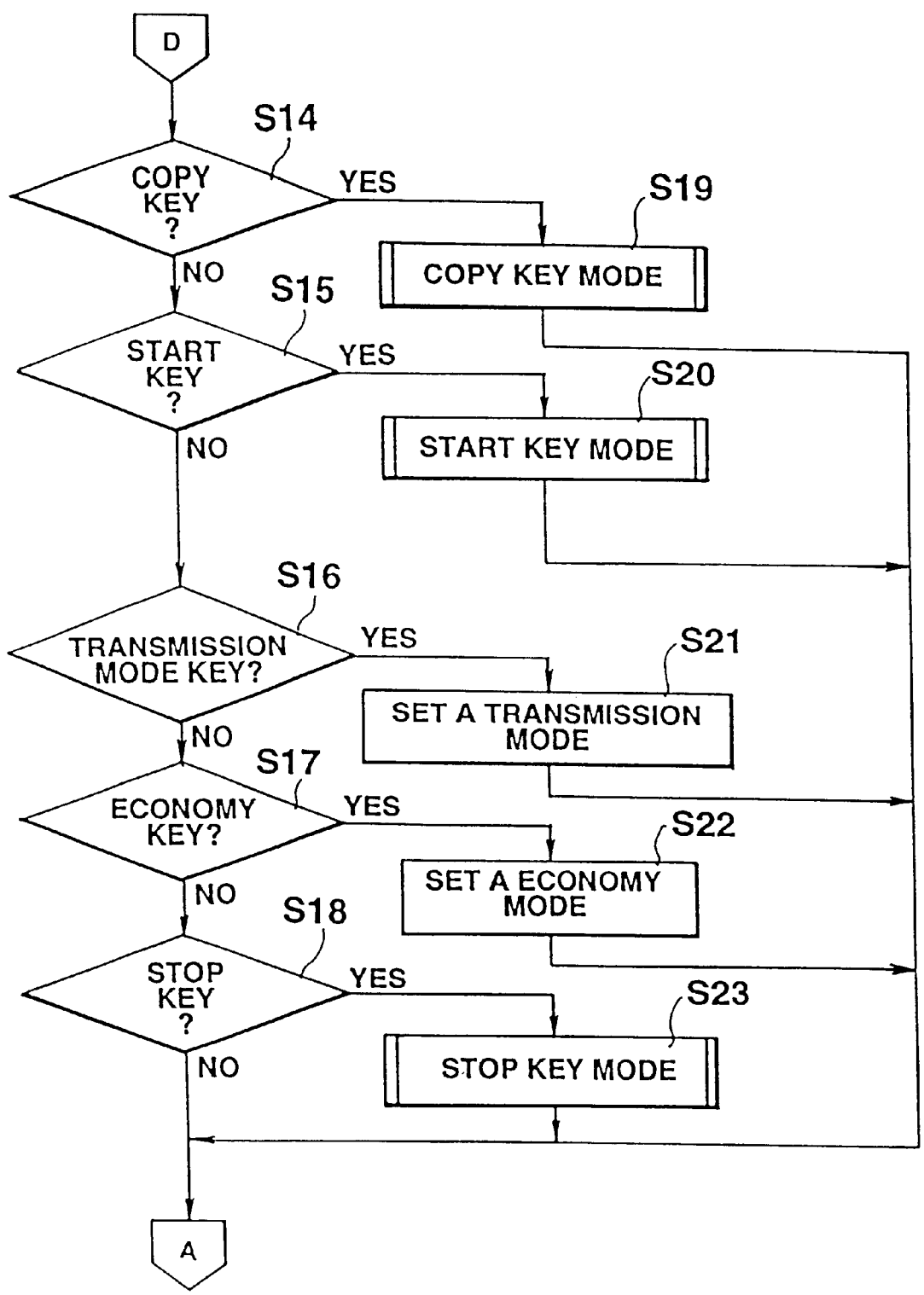

In step S13, the CPU 1-1 discriminates whether any key has been pushed. If any key is pushed, the CPU 1-1 shifts from step S13 to step S14 (FIG. 25). On the other hand, if no key has been pushed, the CPU 1-1 returns to step S5.

The CPU 1-1 discriminates whether the pushed key is the copy key (step S14), a transmission mode key (step S15), an economy key (step S17), or a stop key (step S18). If the pushed key is the copy key, the CPU 1-1 performs an operation of a start key mode (FIG. 26) in step S19. If the pushed key is the start key, the CPU 1-1 performs an operation of a start key mode (FIG. 27) in step S20. If the pushed key is the transmission key, the CPU 1-1 sets a line density of reading document (standard mode: 3.85 lines/mm, or fine mode: 7.7 lines/mm) in step S21. If the pushed key is the economy key, the CPU 1-1 sets an economy mode, which prints image data intermittently so as to save printing energy, in step S22. If the pushed key is the stop key, the CPU 1-1 performs an operation of a stop key mode (FIG. 30) in step S23. The CPU 1-1 then returns to the standby condition of FIG. 24.

Figure 26:
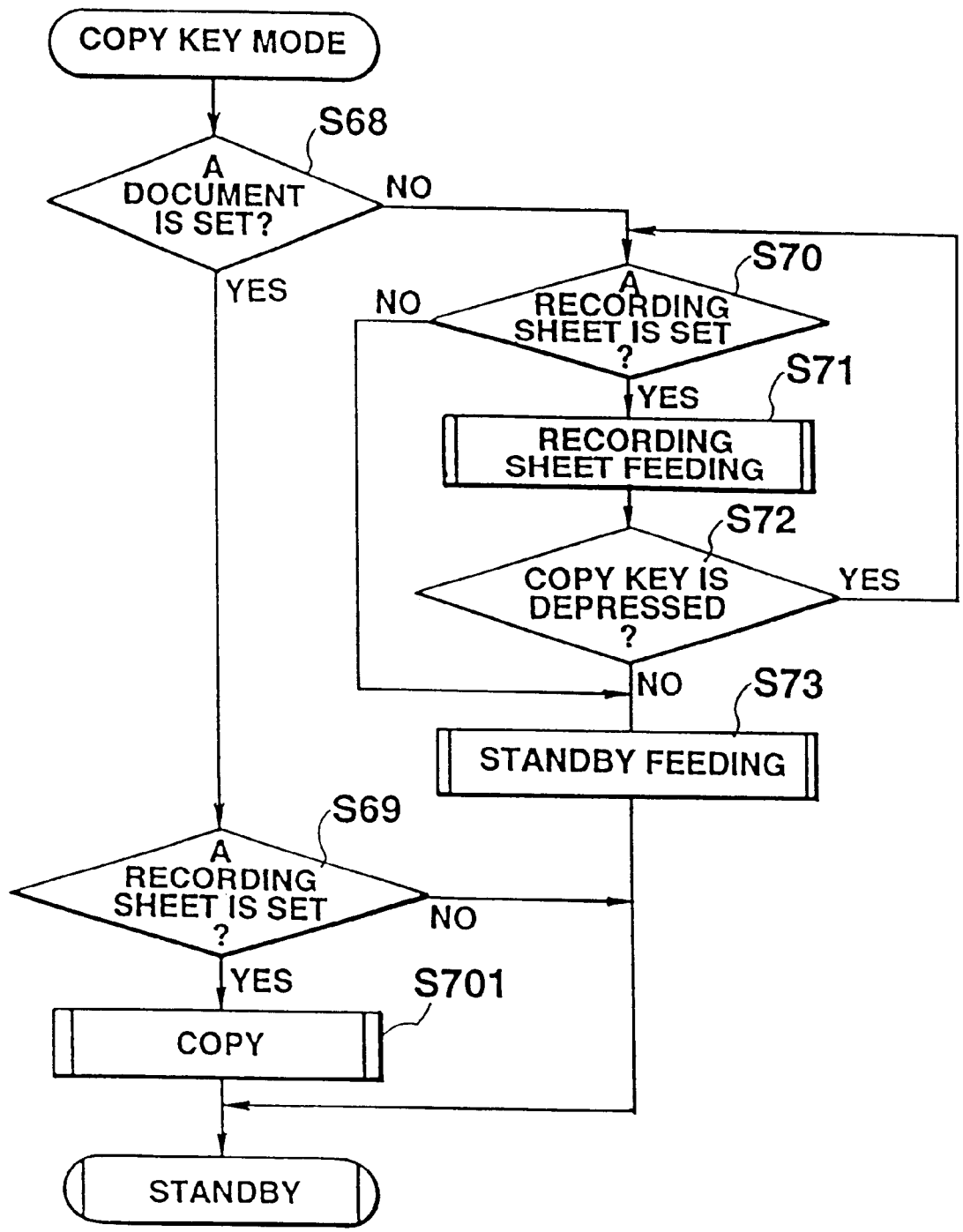
FIG. 26 is a flow chart showing an operation of a copy key mode.

FIG. 26 is a flow chart showing the operation of the copy key mode of step S19 (FIG. 25).

In step S68, the CPU 1-1 discriminates whether an original document has been set. In a case where an original document has been set, the CPU 1-1 discriminates whether a recording sheet is in the recorder 1-6 in step S70. If a recording sheet is present, the CPU 1-1 performs a feed operation of the recording sheet (FIG. 33) so as to feed the recording sheet a fixed amount in step S71, and then discriminates whether the copy key is still activated in step S72. In a case where the copy key is still depressed, the CPU 1-1 returns to step S70 and continues to perform the feed operation on the recording sheet. If a recording sheet is not in the recorder 1-6 in step S70, or if the copy key is not yet depressed in step S72, the CPU 1-1 performs a standby feed operation (FIG. 32) in step S73, and then returns to the standby condition of step S5 (FIG. 24). In the standby feed operation, the CPU 1-1 puts the driver 1-7 back in the initial position. On the other hand, in a case where an original document is in the reader 1-5 in step S68, the CPU 1-1 discriminates whether a recording sheet has been set in step S69. If not, the CPU 1-1 shifts to the standby condition of step S5 (FIG. 24). On the other hand, if a recording sheet has been set in step S69, the CPU 1-1 performs a copying operation (FIG. 25) in step S701, and then shifts to be standby condition of step S5.

Figure 27:
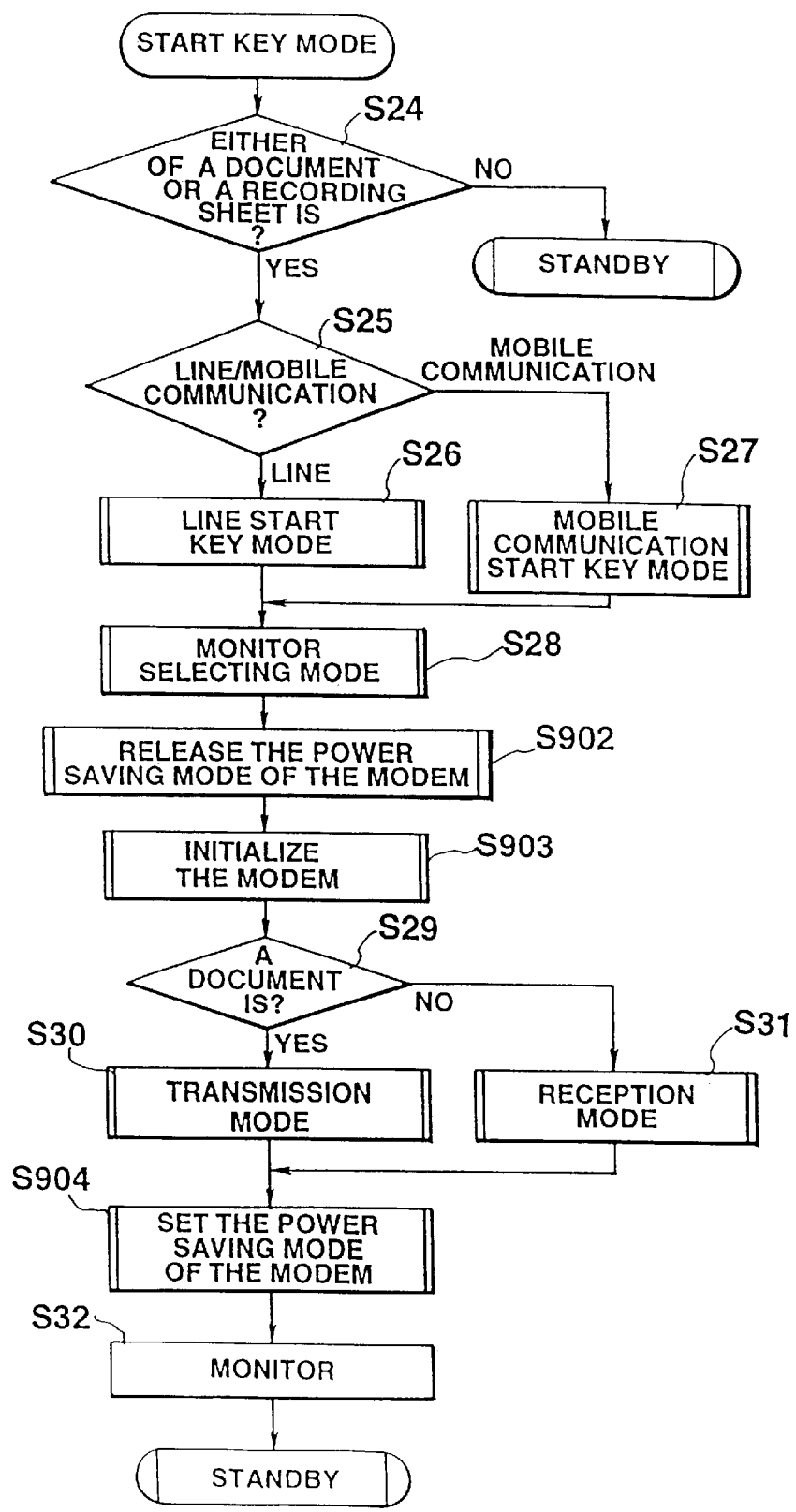
FIG. 27 is a flow chart showing an operation of a start key mode.

FIG. 27 is a flow chart showing an operation of the start key mode of step S20 (FIG. 25).

In step S24 of FIG. 27, the CPU 1-1 checks whether an original document and a recording sheet have been set. If they have not been set, the CPU 1-1 returns to the standby condition of step S55 (FIG. 24). On the other hand, in a case where either has been set, the CPU 1-1 checks whether the telephone line 1-10 or the mobile communication unit 1-11 has been connected to the NCU 1-9 in step S25. If the telephone line 1-10 has been connected, the CPU 1-1 performs an operation of a line start key mode (FIG. 28) in step S26. If the mobile communication unit 1-11 has been connected, the CPU 1-1 performs an operation of a mobile communication start key mode (FIG. 29) in step S27.

Next, the CPU 1-1 performs an operation of a monitor select mode (FIG. 31) in step S28, performs an operation of releasing a power-save mode of the modem 1-8 in step S902, and then performs a mode initializing operation in step S903. The CPU 1-1 then discriminates whether an original document has been set in step S29. If, so, the CPU 1-1 performs operation for the transmission mode (FIGS. 47 to 49) in step S30. If no original document has been set, the CPU 1-1 performs operation for the reception mode (FIGS. 38 to 40) in step S31.

Next, the CPU 1-1 performs the operation of setting the modem 1-8 to the power-save mode in step S904, stops the line-monitoring in step S32, and then returns to the standby condition.

Figure 28:
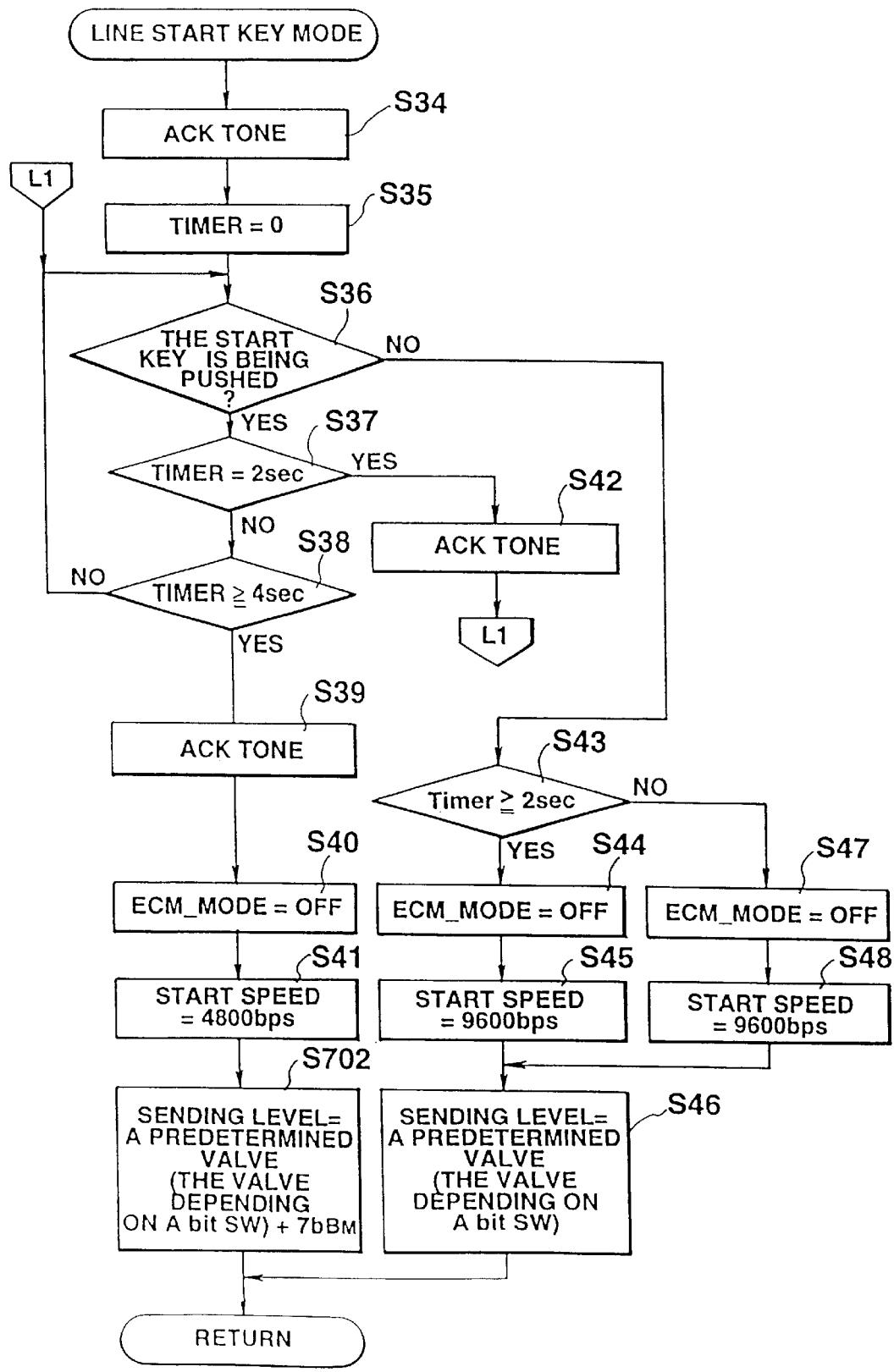
FIG. 28 is a flow chart showing an operation of a line start key mode.

FIG. 28 is a flow chart showing the operation of the line start key mode (step S26 of FIG. 27).

In step S34 of FIG. 28, the CPU 1-1 causes the buzzer 1-14 to generate a confirmation sound (an ACK tone) which indicates that the start key has been depressed, and in step S35, the CPU 1-1 initializes a timer (a software timer) to measure the time the start key remains depressed. While the start key is depressed the CPU 1-1 performs the processes of steps S36, S37 and S38. In step S37, the CPU 1-1 discriminates if the timer has counted two seconds. If so, the CPU 1-1 causes the buzzer 1-14 to generate the ACK tone in step S42, and then returns to step S36. In step S36, the CPU 1-1 discriminates if the start key is still depressed. If not, the CPU 1-1 discriminates whether the value of the timer is less than two seconds in step S43. On the other hand, in step S38, the CPU 1-1 discriminates whether the value counted by the timer is less than four seconds.

In a case where the timer has timed less than two seconds, the CPU 1-1 shifts from step S43 to step S47, sets a flag (ECM-MODE) to allow ECM communication in step S47, sets the communication speed at the start time to be 9600 bps in step S48, and then sets a level of transmitting a signal to be a predetermined value which is decided by bit switches (not shown) in step S46.

In a case where the value of the timer is greater than two seconds and less than four seconds, the CPU 1-1 shifts from step S43 to step S44, clears the flag ECM-MODE to prohibit the ECM communication in step S44, sets the communication speed at the start time to be 9600 bps in step S45, and then shifts to step S46.

In a case where of the timer has counted to four or more seconds, the CPU 1-1 shifts from step S38 to step S39, causes the buzzer 1-14 to generate the ACK tone in step S39, clears the flag ECM-MODE in step S40, sets the communication speed at the start time to be 4800 bps in step S41, sets the level at which the signal will be transmitted to be the predetermined value plus +7 dBm in step S702, and then returns to step S28 of FIG. 27. An operator can thereby manually select the communication mode (G3 or ECM) and the signal transmission level. In a case where an operator is aware that the communication is not good, he or she is able to select an appropriate communication mode and an appropriate level of transmission of the signal so that the time of the image communication will be shortened and the number of line errors will be decreased.

Figure 29:
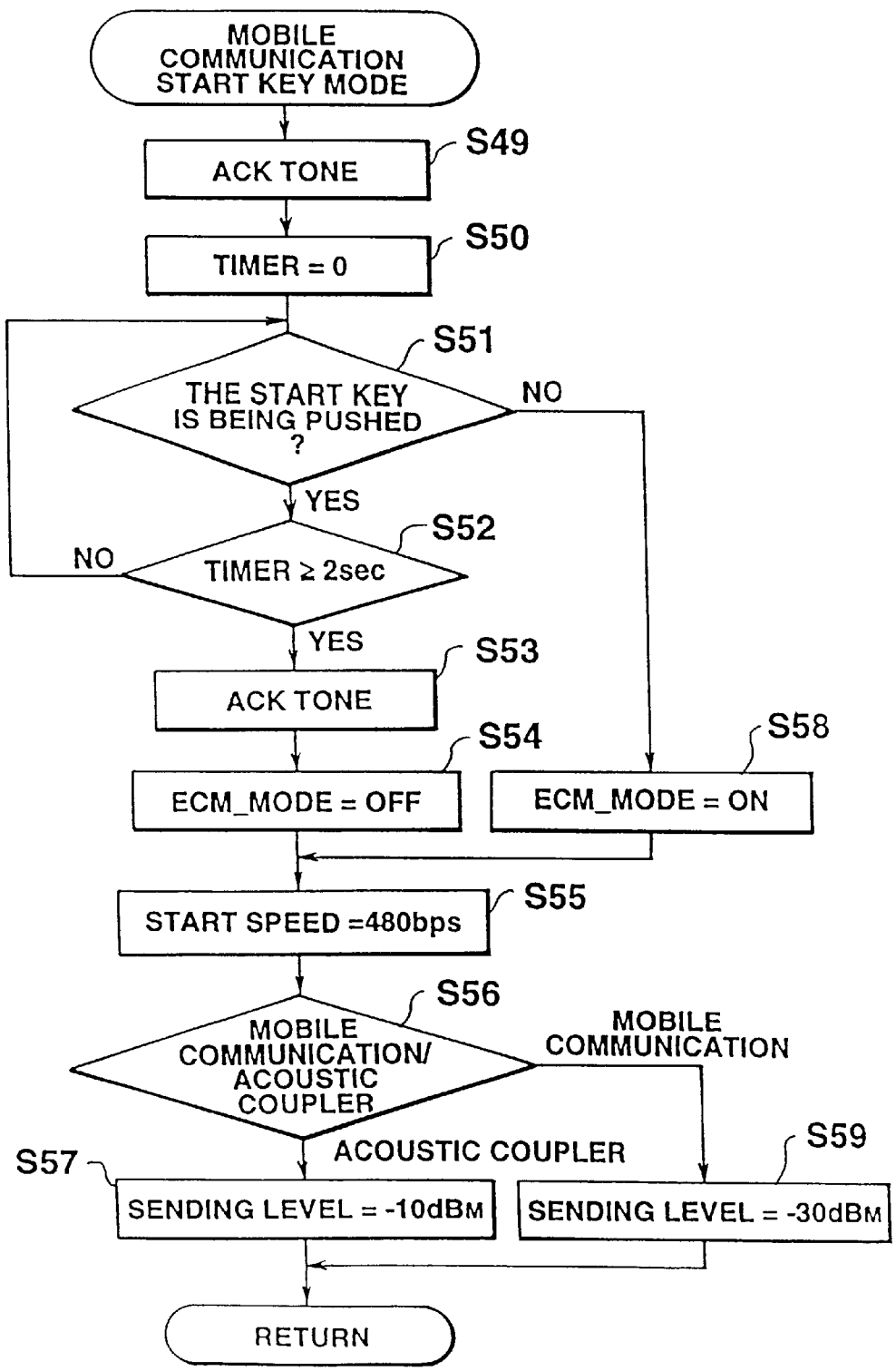
FIG. 29 is a flow chart showing an operation of a mobile communication start key mode.

FIG. 29 is a flow chart showing the operation of the mobile communication start key mode of step S27 in FIG. 27.

In step S49 of FIG. 29, the CPU 1-1 causes the buzzer 1-14 to generate the ACK tone. The CPU 1-1 then initializes the timer so as to measure the time at which the start key is depressed in step S50. While the start key is depressed, the CPU 1-1 performs the processes of step S51 and step S52.

In step S51, the CPU 1-1 discriminates whether the start key is continuously depressed, and in step S52, the CPU 1-1 discriminates whether the period measured by the timer is less than two seconds.

In a case where the time measured by the timer is two or more seconds, the CPU 1-1 causes the buzzer 1-14 to generate the ACK tone in step S53 and then clears the flag ECM-MODE in step S54. On the other hand, in a case where the start key is not depressed, the CPU 1-1 sets the flag ECM-MODE in step S58. Consequently, as in the mobile communication, the operator is able manually to select the communication mode (G3 or ECM).

In step S55, the CPU 1-1 sets the communication speed at the start time to be 4800 bps, and then, in step S56, the CPU 1-1 discriminates whether the mobile communication unit or the acoustic coupler is connected to the NCU 1-9.

In a case where the mobile communication unit is connected to the NCU 1-9, the CPU 1-1 sets the level for transmission to be −30 dBm. On the other hand, in a case where the acoustic coupler is connected to the NCU 1-9, the CPU 1-1 sets a level for transmission to be −10 dBm in step S57, and then returns to step S28 of FIG. 27.

As described above, the facsimile apparatus sets an appropriate communication mode in accordance with the type of communication line connected to the NCU 1-9 and the time of depression of the start key by an operator.

Figure 30:
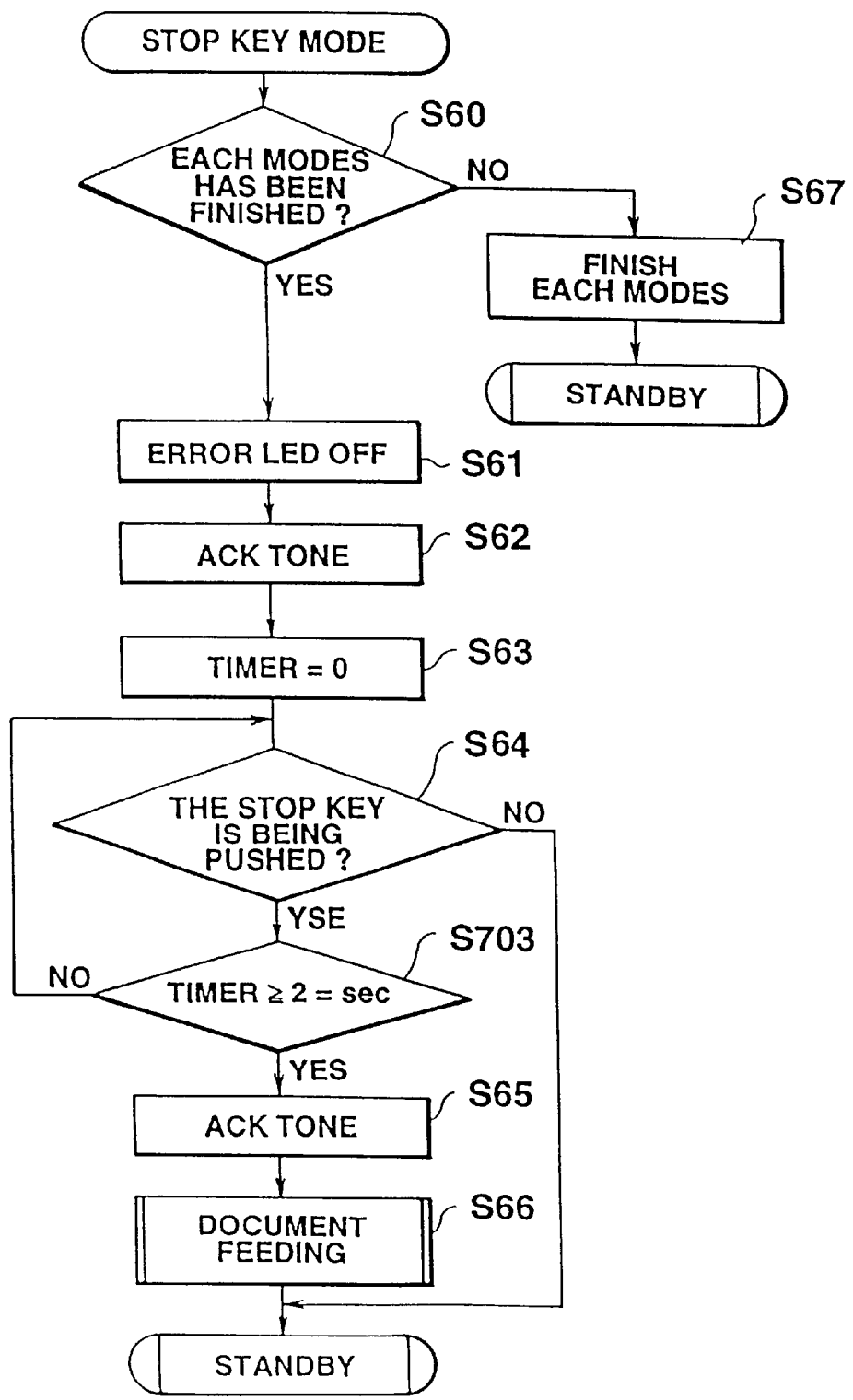
FIG. 30 is a flow chart showing an operation of a stop key mode.

FIG. 30 is a flow chart showing the operation of the stop key mode of step S23 (FIG. 25).

In step S60 of FIG. 30, the CPU 1-1 discriminates whether any local operation (i.e., copy operation) or any facsimile operation (i.e., facsimile transmission) is being performed. If an operation is being performed, the CPU 1-1 stops the operation in step S67, and then returns to the standby condition (step S5 of FIG. 24). On the other hand, if an operation is not being performed, the CPU 1-1 turns off the error LED of the operation unit 1-4 in step S61, causes the buzzer 1-14 to generate the ACK tone in step S62, and initializes a timer to measure the time of depression of the step key in step S63. Then, while the stop key is depressed, the CPU 1-1 repeatedly performs step S64 and step S703. In step S64, the CPU 1-1 discriminates whether the stop key has continuously remained depressed. In step S703, the CPU 1-1 discriminates whether the timer has counted less than two seconds. If so, the CPU 1-1 shifts from step S64 to the standby condition. On the other hand, when the timer has measured two seconds or more, the CPU 1-1 shifts from step S703 to step S65, causes the buzzer 1-14 to generate the ACK tone in step S65, performs the feeding operation of an original document in step S66, and then returns to the standby condition.

Figure 31:
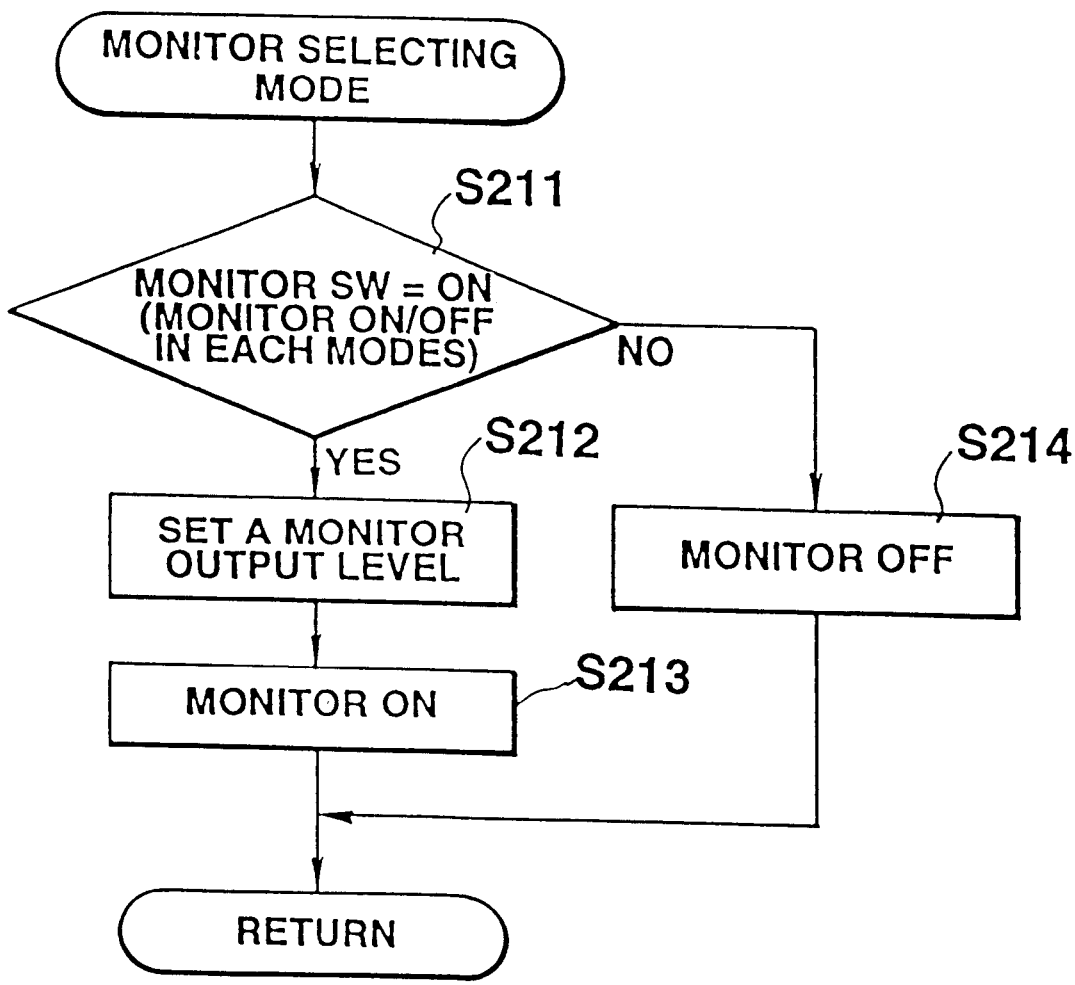
FIG. 31 is a flow chart showing an operation of a monitor selecting mode.
Figure 47:
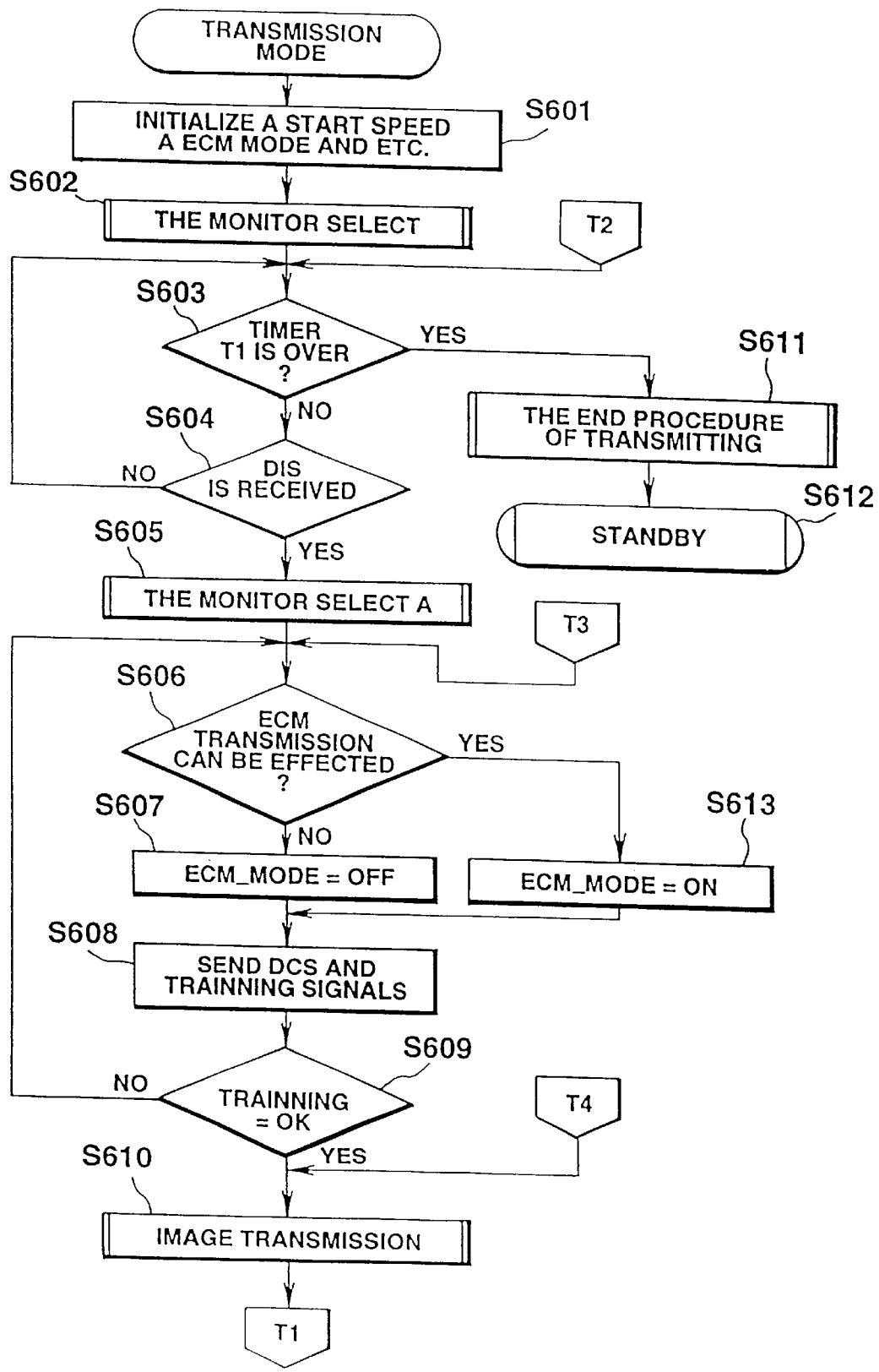
FIG. 47, FIG. 48 and FIG. 49 together form a flow chart showing an operation of a transmission mode.

FIG. 31 is a flow chart showing the operation of the monitor select mode (step S11 of FIG. 24, step S28 of FIG. 27, step S401 of FIG. 28, or step S602 of FIG. 47).

In step S211 of FIG. 31, the CPU 1-1 discriminates whether the monitor SW (switch) is turned on. If the monitor SW is not turned on, the CPU 1-1 sets the monitor to off in step S214. On the other hand, if the monitor SW is turned on, the CPU 1-1 sets an output level for the monitor in step S212, and turns the monitor on in step S213.

Figure 32:
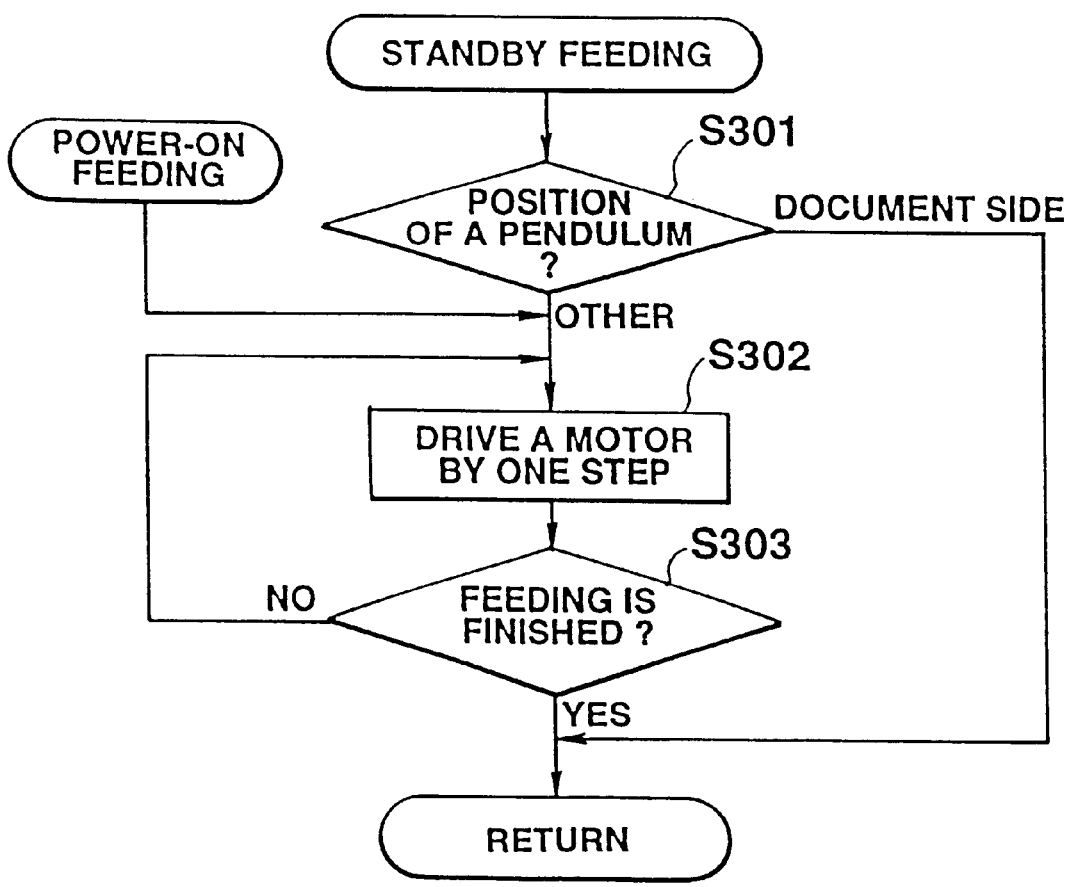
FIG. 32 is a flow chart showing an operation of a standby feeding mode and a power-on feeding mode.
Figure 33:
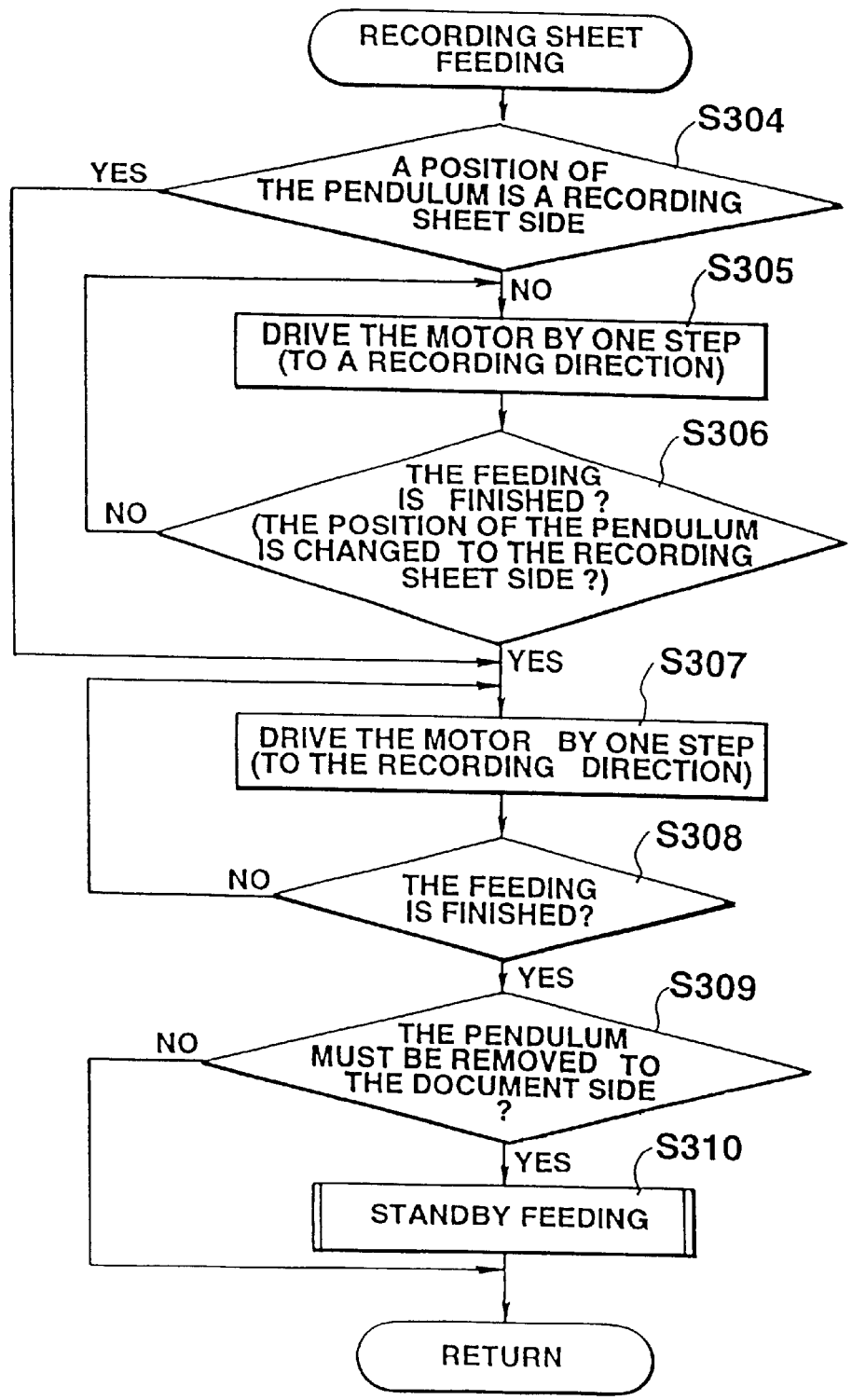
FIG. 33 is a flow chart showing a recording sheet feeding operation.
Figure 34:
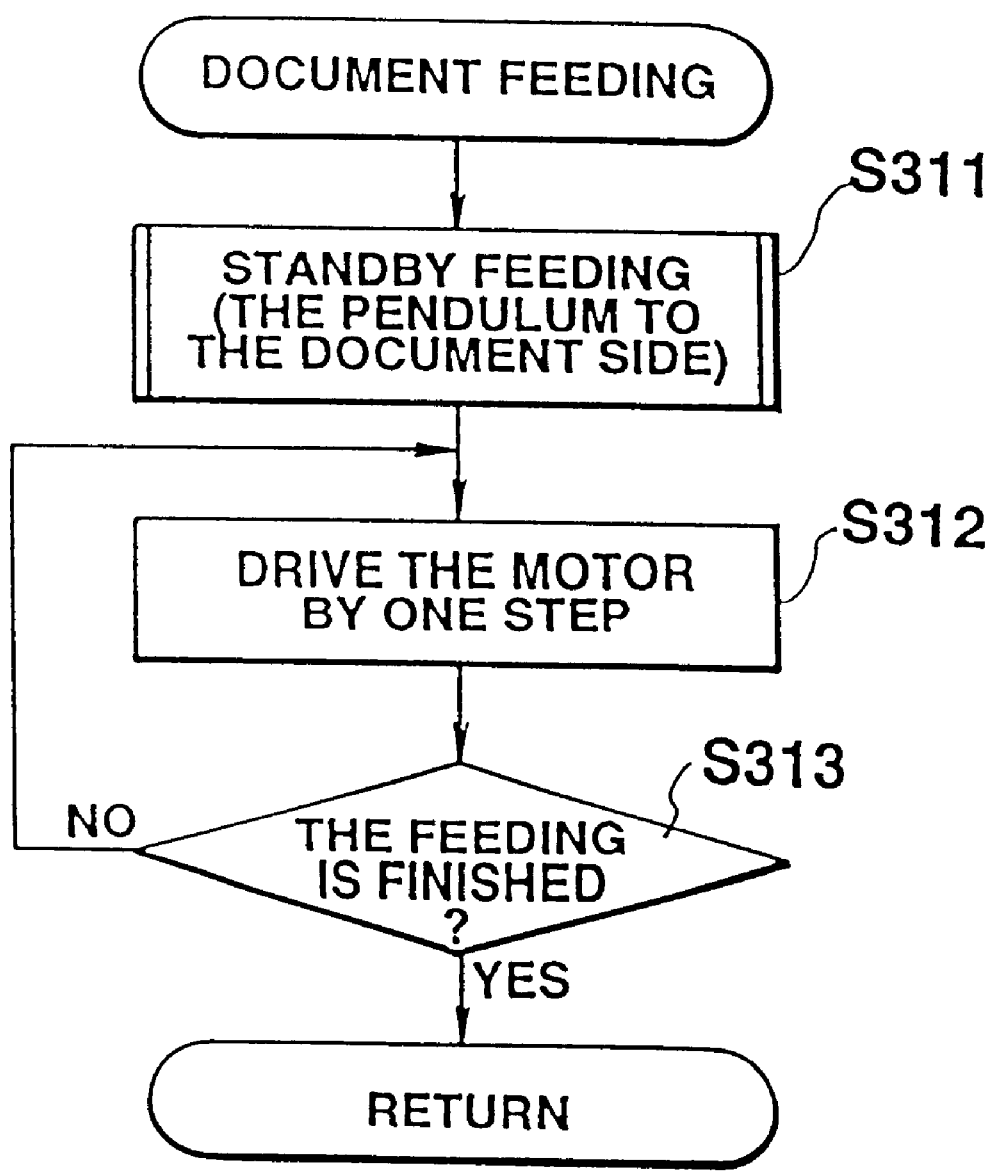
FIG. 34 is a flow chart showing a document feeding operation.

FIG. 32 is a flow chart showing the operation of the power-on feeding (step S2 of FIG. 23) and the standby feeding (step S310 of FIG. 33, step S311 of FIG. 34, etc.).

This facsimile apparatus has a structure in which one motor drives a roller for printing and a roller for reading by means of switching the power of the motor using a pendulum. In this facsimile apparatus, the feeding of an original document is operated on the basis of a positive rotation of the motor, while the feeding of a recording sheet is operated on the basis of negative rotation of the motor. The facsimile apparatus has a pendulum (a gear wheel) which switches a route of transfer of the driving power as between positive rotation and negative rotation. For positive rotation, the pendulum is located on a document side, to drive the roller for reading, while for negative rotation, the pendulum is located on a recording sheet side, to drive the roller for printing. The initial position of the pendulum is the document side, and for negative rotation, the pendulum is shifted to the recording sheet side by a rotation of the motor (a feeding operation). Switching from the recording sheet side to the document side also is performed by the rotation of the motor. In addition, when a document or a recording sheet which has been inserted into the facsimile apparatus is removed by an operator, the pendulum is moved to an intermediate position between the document side and the recording sheet side. The structure of the pendulum prevents feeding of the recording sheet during image transmission.

In step S301 of FIG. 32, the CPU 1-1 discriminates whether the pendulum is positioned at the document side. If the pendulum is at the document side, the CPU 1-1 returns to the previous flow. On the other hand, if the pendulum is not at the document side, the CPU 1-1 operates the motor (e.g. a positive rotation) so as to move the pendulum to the document side in step S302. In step S303, the CPU 1-1 detects the position of the pendulum. The CPU 1-1 then repeatedly performs steps S302 and S303 until the CPU 1-1 detects that the position of the pendulum is at the document side.

In the standby mode, the CPU 1-1 starts from step S301. On the other hand, in the power-on mode, the CPU 1-1 starts from step S302 because the position of the pendulum is uncertain when the power is turned on. Therefore, the CPU 1-1 drives the motor (step motor) by fixed steps so as to fix the position of the pendulum.

FIG. 33 is a flow chart showing the process of feeding of the recording sheet (e.g. step S71 of FIG. 26).

In step S304, the CPU 1-1 checks the position of the pendulum. In a case where the pendulum is not at the recording sheet side, the CPU 1-1 drives the motor by one step in step S305, and again checks the pendulum position in step S306. The CPU 1-1 then repeatedly performs steps S305 and S306 until the CPU 1-1 detects that the pendulum is at the recording sheet side.

In a case where the position of the pendulum is at the recording sheet side, the CPU 1-1 drives the motor by one step in step S307, and checks if a fixed feeding operation is finished in accordance with the detection of a sensor in step S308. The CPU 1-1 then repeatedly performs steps S307 and S308 until the CPU 1-1 detects that the fixed feeding operation is finished. Then in step S307, the CPU 1-1 checks whether the pendulum should be on the document side or the recording sheet side after the feeding operation. In an initial feeding operation of a copy operation or a facsimile reception, the pendulum must be on the recording sheet side because the printing operation is performed after the feeding operation. In the feeding of the recording sheet with the copy key in the standby condition, the pendulum must be returned to the document side. In a case where the pendulum must be returned to the document side, the CPU 1-1 performs the operation of the standby feeding mode (FIG. 32) in step S310, and then returns to the previous flow.

FIG. 34 is a flow chart showing the document feeding operation (e.g. step S66 of FIG. 30).

In step S311 of FIG. 34, the CPU 1-1 performs the standby feeding operation, and thereby switches the pendulum to the document side. In step S312, the CPU 1-1 drives the motor for feeding by one step, thereby feeding the document. In step S313, the CPU 1-1 checks whether the document feeding operation is finished. In a case where the CPU 1-1 detects that the feeding operation is finished, the CPU 1-1 returns from step S313 to the previous flow.

Figure 35:
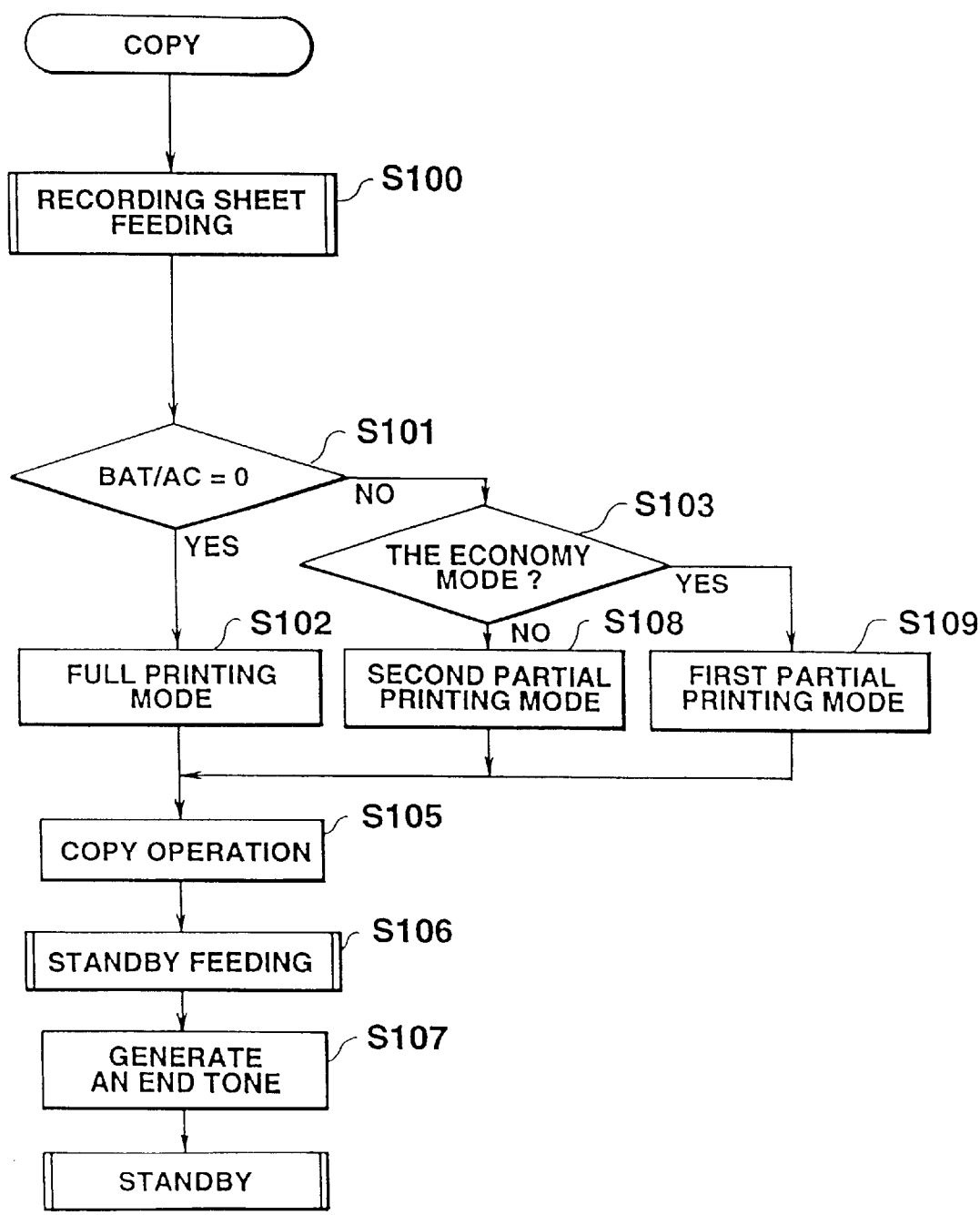
FIG. 35 is a flow chart showing a copy operation.

FIG. 35 is a flow chart showing the copy operation (step S701 of FIG. 26).

In step S100 of FIG. 35, the CPU 1-1 performs the recording sheet feeding operation (FIG. 33), thereby feeding the recording sheet to a predetermined position of the recorder 1-6. In step S101, the CPU 1-1 checks the value of a signal BAT/AC which indicates an AC power or the battery power. When AC power is used, the signal BAT/AC becomes "0" because the signal BAT/AC which is pulled up +5 V is connected to a ground line by the connecting terminal of the AC power unit. On the other hand, in a case where the battery power is used, the signal BAT/AC becomes "1". In a case where a car battery is used, the signal BAT/AC depends on a switch of the car battery power unit. When the capacity of the car battery is large, the switch is turned on so that the signal BAT/AC becomes "0". On the other hand, when the capacity of the car battery is small, the switch is turned off so that the signal BAT/AC becomes "1".

If the value of the signal BAT/AC is "0" in step S101, the CPU 1-1 sets the full printing mode in step S102. If the value of the signal BAT/AC is "1", the CPU 1-1 discriminates whether the economy mode is selected in step S103. When the economy mode is selected, the CPU 1-1 sets a partial printing mode (first partial printing mode) which is to print data partially in step S109. When the economy mode is not selected, the CPU 1-1 sets a different partial printing mode (second partial printing mode) which prints data partially when black ratio data to be printed is over fifty percent in step S108. The CPU 1-1 then performs the copying operation in step S105, performs the standby feeding operation in step S106, causes the buzzer 1-14 to generate an end tone which indicates that the copy operation is terminated in step S107, and then returns to the standby condition. The first partial printing mode and the second partial printing mode save energy when battery or a car battery is used. These two modes are also used when printing received image data.

Figure 36:
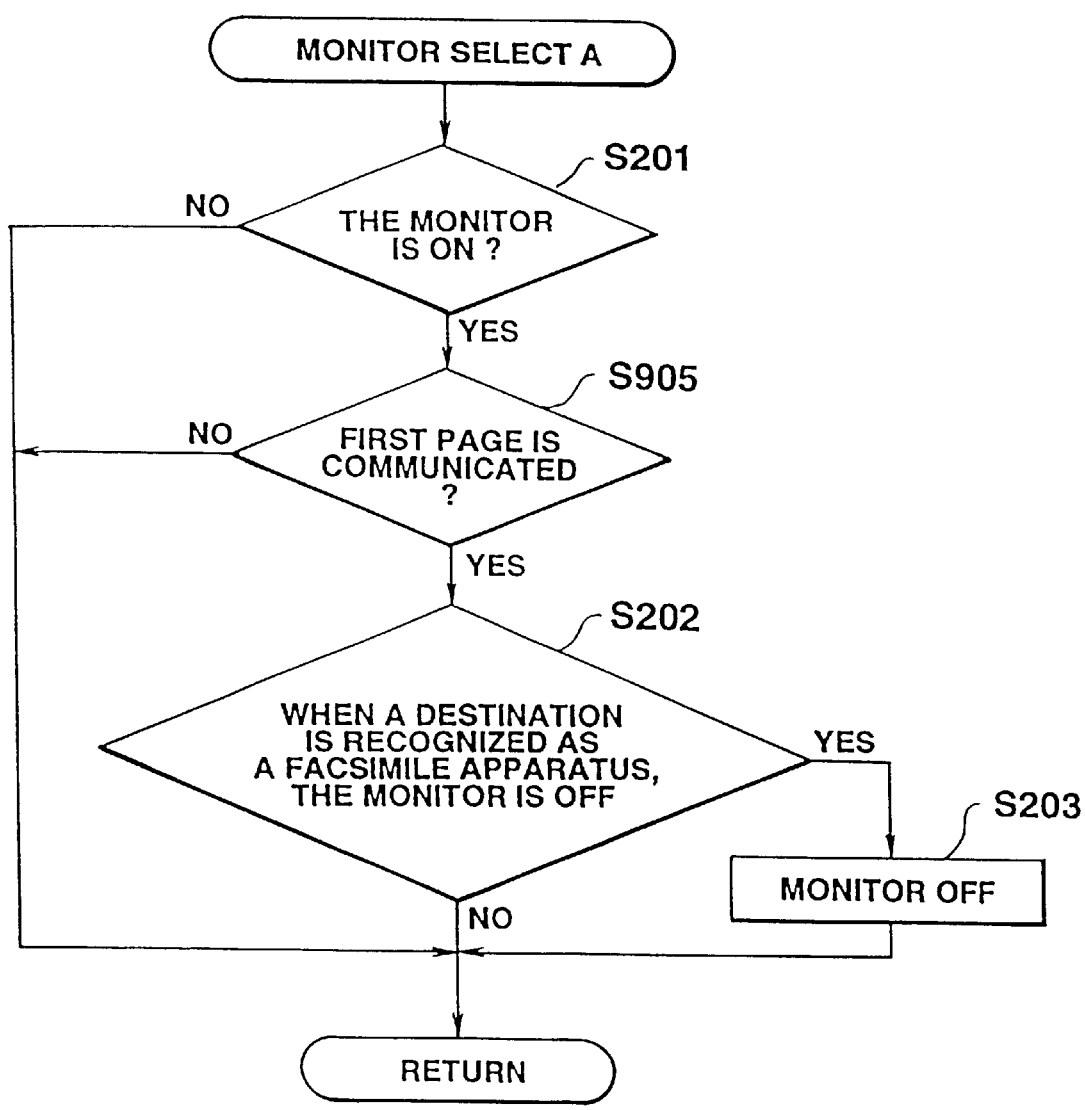
FIG. 36 is a flow chart showing an operation of a monitor selection A.
Figure 38:
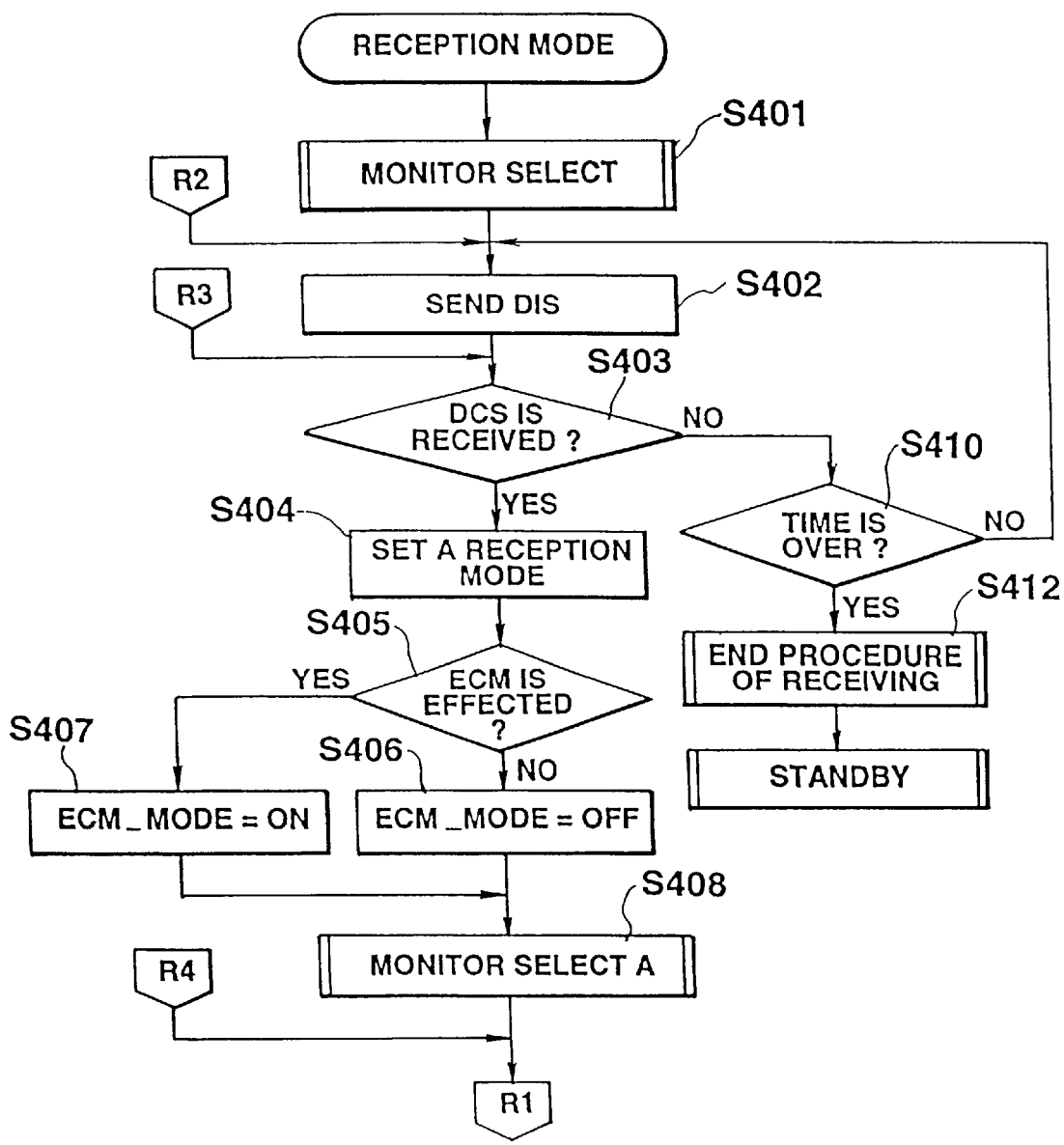
FIG. 38, FIG. 39, FIG. 40, FIG. 42 and FIG. 43 together form a flow chart showing an operation of a receiving mode.

FIG. 36 is a flow chart showing an operation of a monitor selecting mode A (step S408 of FIG. 38, step S605 of FIG. 47).

In step S201 of FIG. 36, the CPU 1-1 discriminates whether the monitor has been turned on.

In a case where the monitor has been turned on, the CPU 1-1 checks whether a first page is being received in step S905. If the first page is being received, the CPU 1-1 discriminates whether the destination is a facsimile machine in step S202. If the destination is a facsimile machine, the CPU 1-1 turns the monitor off in step S203.

Figure 37:
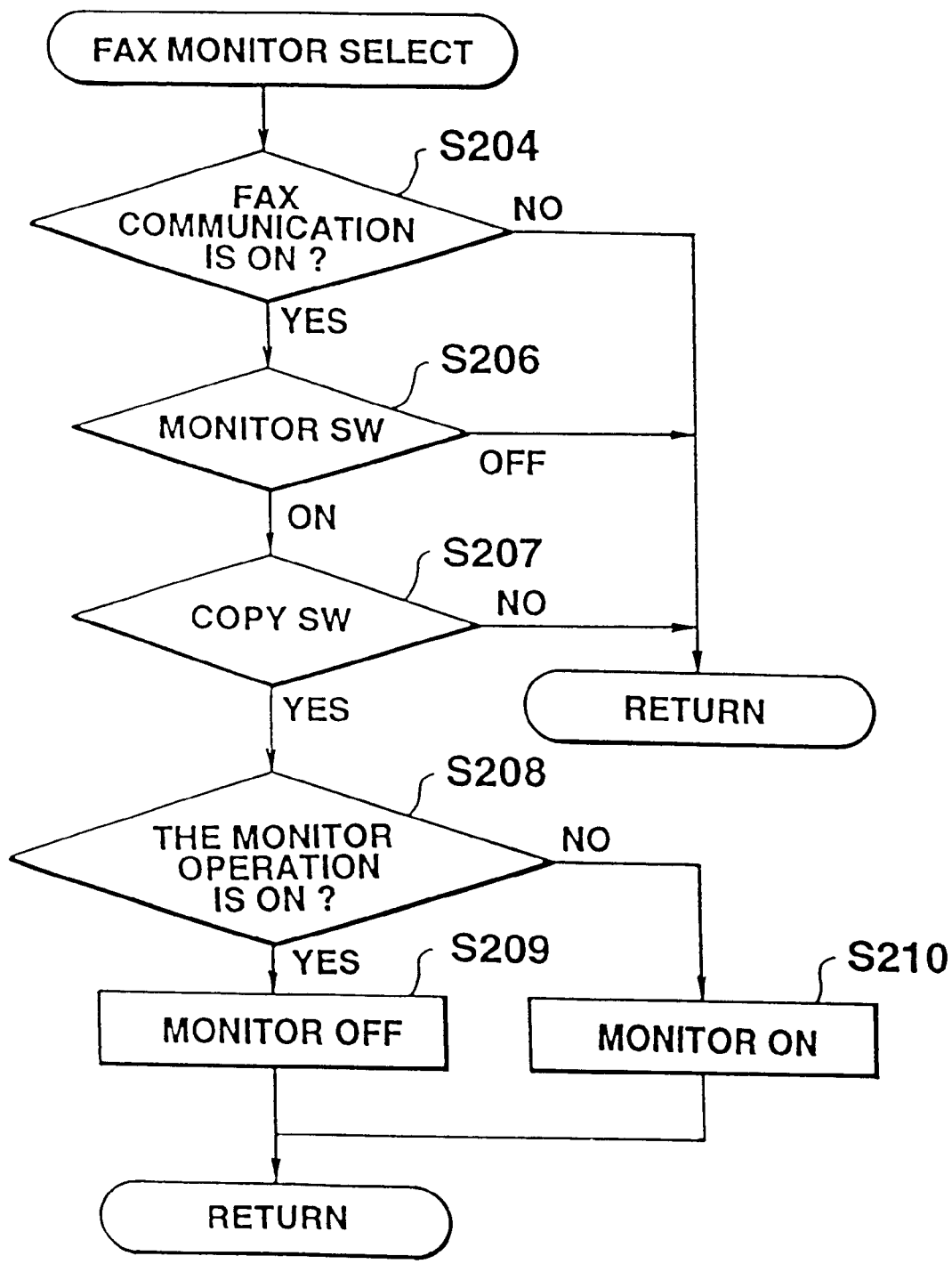
FIG. 37 is a flow chart showing an operation of a FAX monitor selection.

FIG. 37 is a flow chart showing the operation of a FAX monitor selecting mode which turns the monitor on and off by the copy key during facsimile communication.

In step S204 of FIG. 37, the CPU 1-1 checks whether facsimile communication is being performed. In a case where facsimile communication is being performed, the CPU 1-1 checks whether the copy key is being pushed in step S207. If the copy key is depressed, the CPU 1-1 checks whether a monitor operation is being performed in step S208. If so, the CPU 1-1 stops the monitor operation in step S209. On the other hand, in a case where the monitor operation is not being performed, the CPU 1-1 starts monitor operation in step S210.

FIGS. 38 through 47 together form a flow chart showing the operation of the reception mode (step S31 of FIG. 27).

In step S401 of FIG. 38, the CPU 1-1 performs the monitor selecting mode (FIG. 31), sends to the destination a DIS which includes information on the communication speed and the ECM set in the start key mode in step S402, and checks whether a DCS has been received from the destination in step S403. If a DCS has not been received, the CPU 1-1 checks whether an initial identification time-out (e.g. 35 seconds) has occurred in step S410. If so, the CPU 1-1 performs an end procedure of the image reception in step S412, and then returns to the standby condition.

In a case where a DCS has been received from the destination before the initial identification timer has expired, in step S404 the CPU 1-1 sets an image reception mode in accordance with information included in the received DCS. In step S405, the CPU 1-1 discriminates whether ECM communication is being performed. If so, the CPU 1-1 sets the flag ECM-MODE in step S407. On the other hand, in a case where ECM communication is not being performed, the CPU 1-1 clears the flag ECM-MODE in step S406. In step S408, the CPU 1-1 performs the operation of the monitor selecting mode A, and thereby decides if the monitor is operated. Then, in step S413 of FIG. 39, the CPU 1-1 discriminates whether ECM communication is being performed, in accordance with the flag ECM-MODE. If the flag ECM-MODE is on, the CPU 1-1 shifts from step S413 to step S433 of FIG. 42, and performs ECM reception. On the other hand, if the flag ECM-MODE is not on, the CPU 1-1 performs normal facsimile reception in step S414, and checks whether a recording sheet is in the recorder 1-6 in step S415. If a recording sheet is in the recorder 1-6, the CPU 1-1 causes the recorder 1-6 to print one line of received image data in step S418 and checks whether the line of received image data has been printed in step S419. If the line of received image data has not yet been printed, the CPU 1-1 returns to step S414 so as to continue to receive and print image data. On the other hand, if the line has been printed, the CPU 1-1 checks whether an RTC is detected or not in received data in step S420. If no RTC is detected, the CPU 1-1 returns to step S414 so as to continue to monitor signals. In a case where the RTC is detected in step S420, the CPU 1-1 shifts from steps S420 to step S421 of FIG. 40 and then performs the next procedure.

Figure 40:
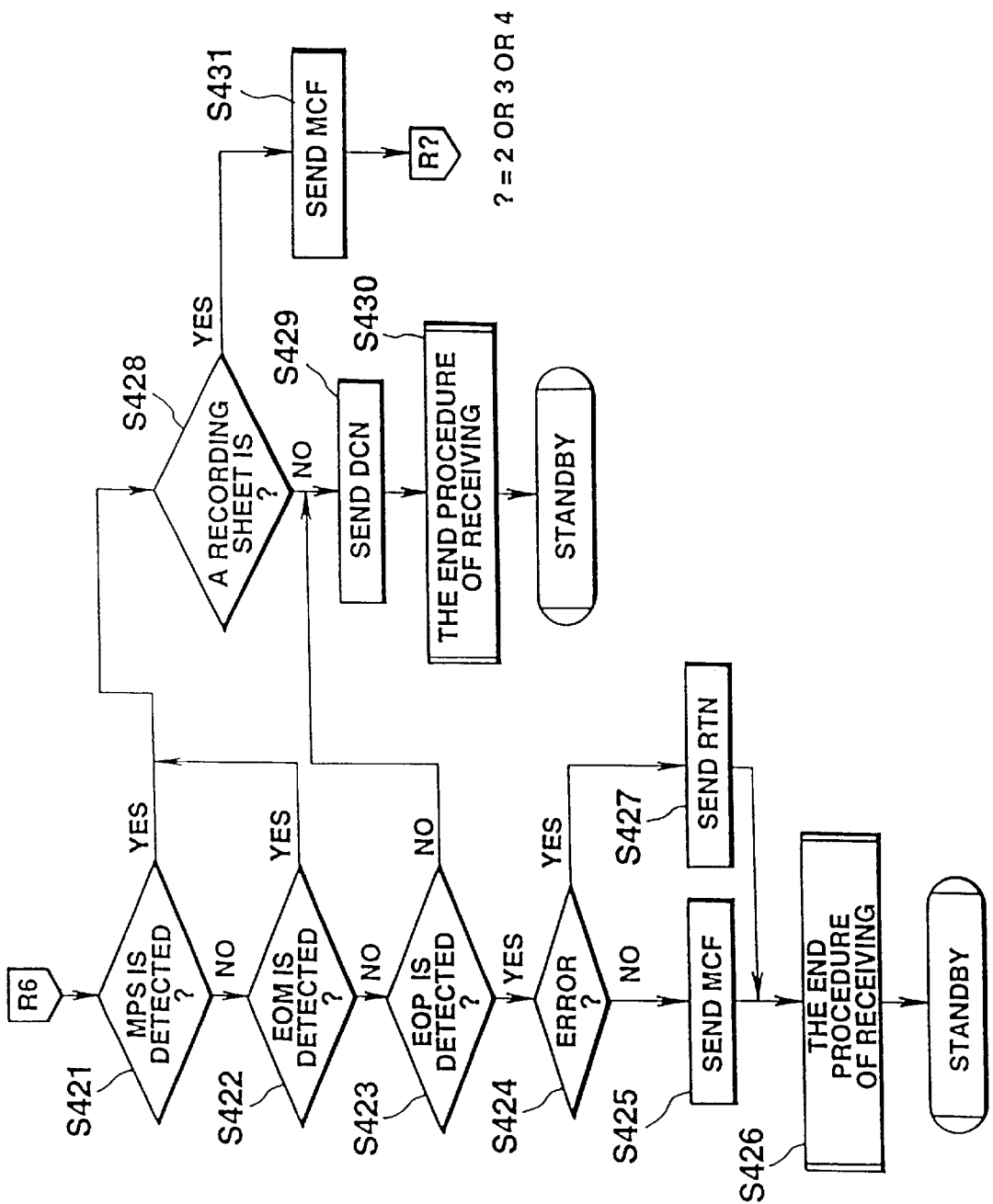

On the other hand, in a case where the recording sheet is not in the recorder 1-6 in step S415, the CPU 1-1 performs an operation of an operator call A (FIG. 41) so as to require an operator to set a recording sheet in step S416. In the operator call A operation, the CPU 1-1 stores received image data in an image memory (RAM 1-3) until a recording sheet is set by the operator. Then, in step S417, the CPU 1-1 checks whether the recording sheet is in the recorder 1-6, and if so, the CPU 1-1 shifts to step S418 so as to continue to print the received image data. If no recording sheet is in the recorder 1-6, the CPU 1-1 shifts from step S417 to step S421 (FIG. 40).

In steps S421, S422 and S423, the CPU 1-1 checks whether an MPS, an EOM or an EOP, respectively, is detected. When these signals are not detected, the CPU 1-1 sends a DCN to the line through the modem 1-8 and the NCU 1-9 in step S429, performs the end procedure of receiving (FIG. 46) in step S430, and then returns to the standby condition.

If the EOP is detected in step S423, the CPU 1-1 checks whether the quality of the received image data is satisfactory in step S424. When the quality of the received image data is adequate, the CPU 1-1 sends an MCF to the line through the modem 1-8 and the NCU 1-9 in step S425. When the quality of the received image is unsatisfactory (i.e. the received image data has more errors than permitted by a predetermined standard), the CPU 1-1 sends an RTN to the line in step S427. The CPU 1-1 then performs the end procedure of receiving in step S426, and returns to the standby condition.

In a case where the MPS or the EOM is detected in step S421 or step S422, the CPU 1-1 checks whether a recording sheet is in the recorder 1-6 in step S428. If so, the CPU 1-1 sends the MCF to the line in step S431, and then shifts to step S402, step S403 or step S413. When the EOM is detected in step S422, the CPU 1-1 shifts from step S431 to step S402 or step S403. When the MPS is detected in step S421, the CPU 1-1 shifts from step S431 to step S413.

On the other hand, in a case where no recording sheet is in the recorder 1-6 in step S428, the CPU 1-1 sends the DCN to the line in step S429, performs the end procedure of receiving in step S430, and then returns to the standby condition.

Figure 39:
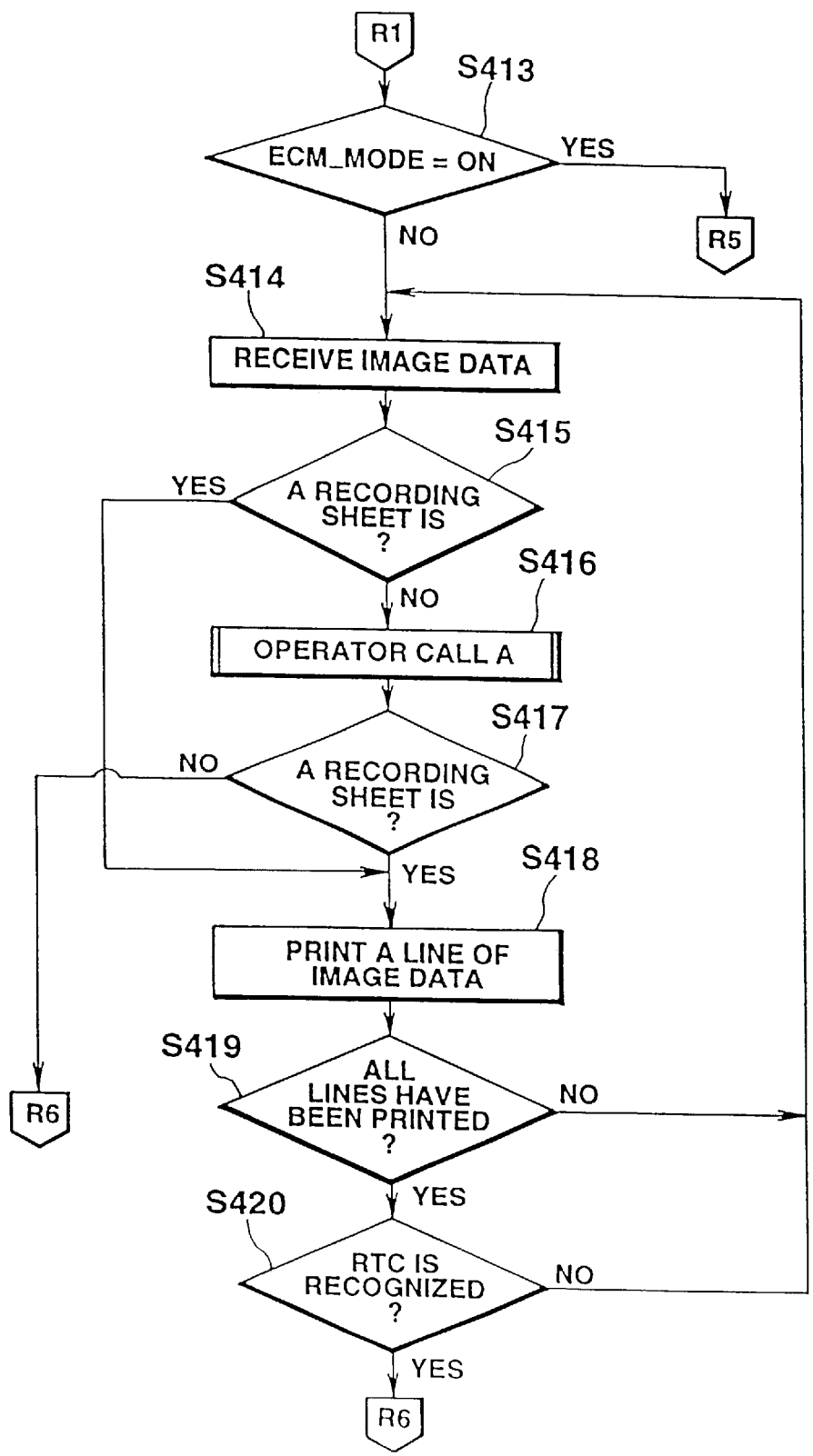
Figure 41:
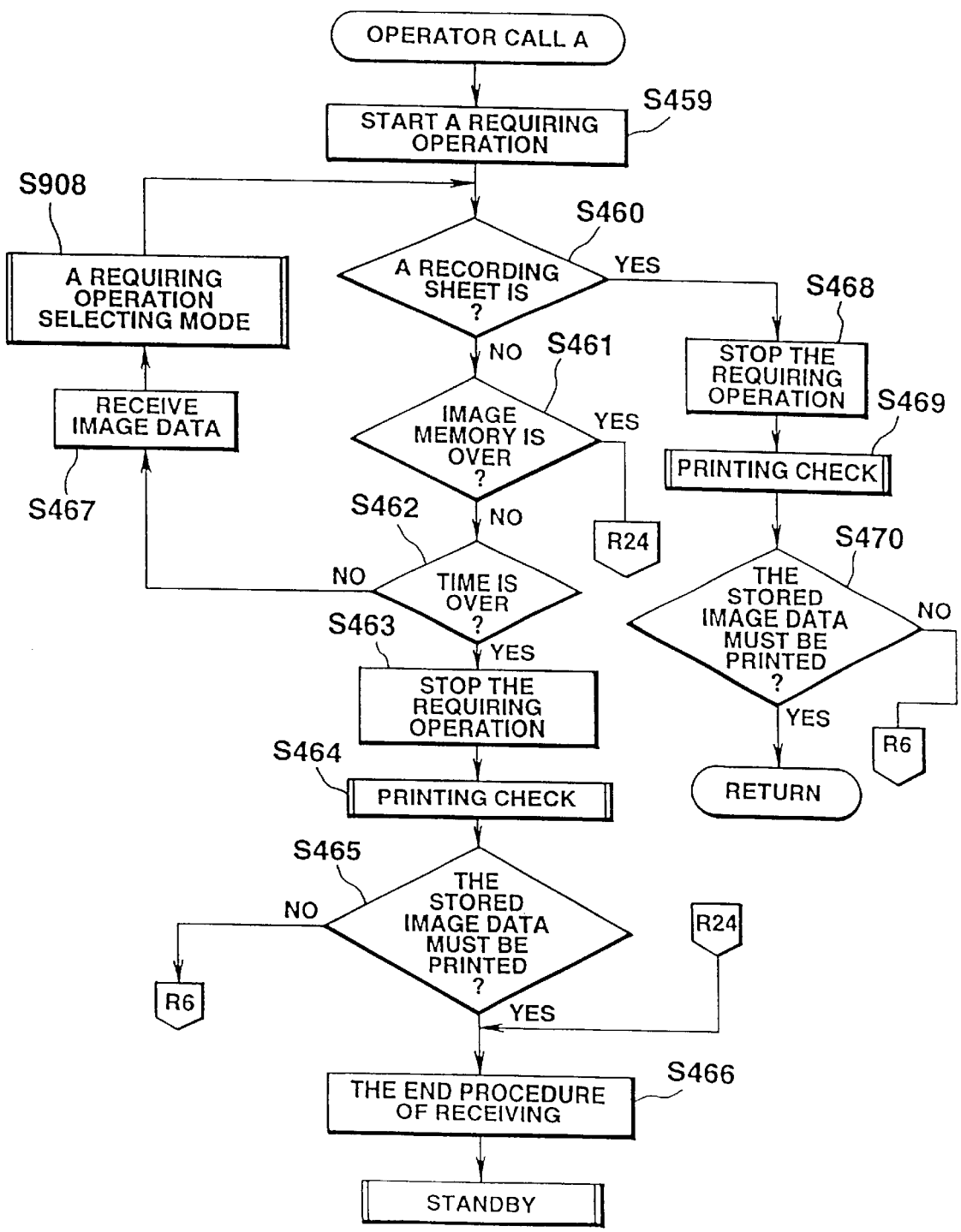
FIG. 41 is a flow chart showing an operation of an operator call A.

FIG. 41 is a flow chart showing the operation of the operator call A (step S416 of FIG. 39).

In step S459 of FIG. 41, the CPU 1-1 starts a requiring operation which requires an operator to set a recording sheet in the recorder 1-6, and which generates an alarm tone and/or displays an alarm.

In step S460 the CPU 1-1 checks whether a recording sheet is set in the recorder 1-6. In a case where a recording sheet is not set, in step S461 the CPU 1-1 checks the capacity of the image memory which is available to store received image data. If the capacity of the image memory is above a predetermined quantity, the CPU 1-1 checks the time elapsed from the start of the requiring operation in step S462.

In a case where a recording sheet is not set in step S460, where there is image memory available in step S461, and where the time is not more than a predetermined time (e.g. 5 seconds) in step S462, the CPU 1-1 receives image signals and stores received image data in the image memory in step S467, performs a requiring operation switching mode (FIG. 55) in step S908, and then returns to step S460.

If a recording sheet is set in the recorder 1-6 in step S460, the CPU 1-1 stops the requiring operation in step S468, checks stored image data to be printed in step S469, and discriminates whether the stored image data must be printed in step S470. If the printing operation must be performed, the CPU 1-1 returns from step S470 to step S417 of FIG. 39. If printing does not need to be performed, the CPU 1-1 shifts from step S470 to step S421 of FIG. 40. For example, when one page of image data has been received (the RTC has been received), or when the quantity of the stored image data is less than a predetermined amount, the CPU 1-1 determines not to print the stored image data.

In a case where image memory is not available in step S461, the CPU 1-1 performs the end procedure of receiving in step S466, and then returns to the standby condition.

In a case where the time elapsed from the start of the requiring operation is more than the predetermined time in step S462, the CPU 1-1 stops the requiring operation in step S463, checks the stored image data to be printed in step S464, and discriminates whether the stored image data must be printed in step S465. If the stored data must be printed, the CPU 1-1 performs the end procedure of receiving in step S466, and then returns to the standby condition. On the other hand, if the stored image data need not be printed, the CPU 1-1 shifts from step S465 to step S421 of FIG. 40.

Figure 42:
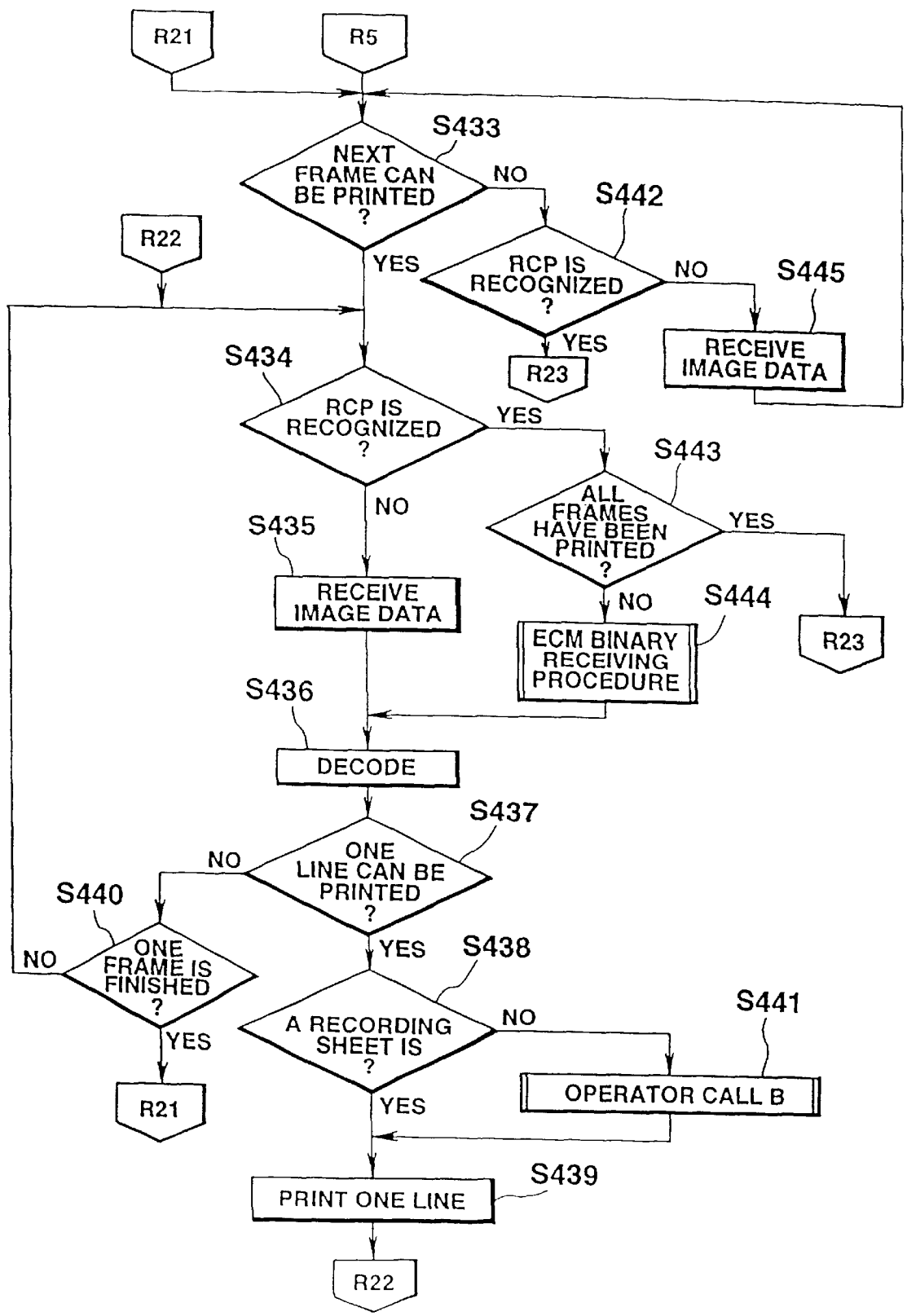

When the ECM reception is performed in step S413 of FIG. 39, the CPU 1-1 discriminates whether received frame data is capable of being printed in step S433 of FIG. 42. If the received frame data cannot be printed, the CPU 1-1 checks whether an RCP has been received in step S442. If no RCP is received, the CPU 1-1 receives image signals in step S445, and then returns to step S433. If the RCP is received in step S442, the CPU 1-1 shifts to step S446 of FIG. 43, and then performs a procedure of phase D.

On the other hand, if the received frame data can be printed in step S433, the CPU 1-1 checks whether the RCP has been received in step S434. If no RCP is received, the CPU 1-1 receives image signals in step S435. If an RCP is received, the CPU 1-1 checks whether all frame data has been printed in step S443. If less than all frame data has been printed, the CPU 1-1 shifts from step S443 to step S446 of FIG. 43. If all frame data has been printed, in step S444 the CPU 1-1 performs an ECM binary receiving procedure (FIG. 44) which is to perform flow control.

Then, in step S436, the CPU 1-1 decodes the received image data, and checks whether one line of image data is decoded and whether the line of image data is able to be printed in step S437. If one line of image data has not been decoded in step S437, the CPU 1-1 checks whether the decoding of one frame data is finished in step S440. If one frame of data is finished, the CPU 1-1 shifts from step S440 to step S433. If the decoding of one frame of data is not finished, the CPU 1-1 returns to step S434.

In a case where one line of image data is decoded, and where the line of image data is able to be printed, the CPU 1-1 checks whether a recording sheet is in the recorder 1-6 in step S438. If so, the CPU 1-1 causes the recorder 1-6 to print the line of image data in step S439, and then returns to step S434. On the other hand, if no recording sheet is in the recorder 1-6, the CPU 1-1 performs an operation of an operator call B (FIG. 45) in step S441. In a case where a recording sheet is set in the procedure operator call B, the CPU 1-1 shifts to step S430.

Figure 43:
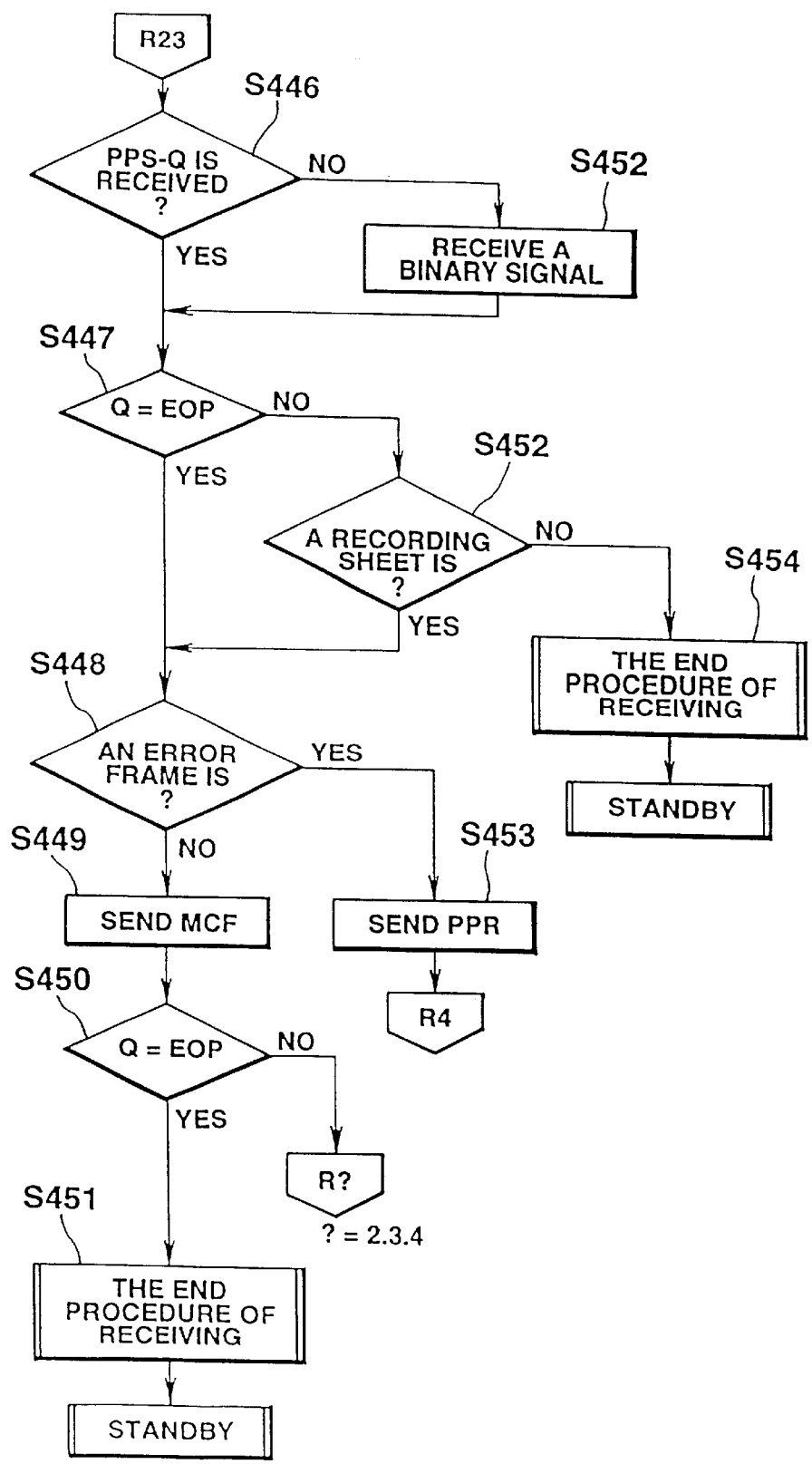

In step S446 of FIG. 43 the CPU 1-1 checks whether a PPS-Q (Q is EOP, EOM, MPS or NULL) is received, and if the PPS-Q is not received, the CPU 1-1 receives a binary signal in step S452.

In step S447, the CPU 1-1 checks whether the received binary signal is the PPS-EOP.

In a case where the received binary signal is not the PPS-EOP, and were the received binary signal is the PPS-NULL, the PPS-MPS, or the PPS-EOM, the CPU 1-1 checks whether a recording sheet is in the recorder 1-6 in step S452. If no recording sheet is in the recorder 1-6, the CPU 1-1 performs the end procedure of receiving in step S454 and then returns to the standby condition.

On the other hand, in a case where the received binary signal is the PPS-EOP in step S447, or where a recording sheet is in the recorder 1-6 in step S452, the CPU 1-1 checks whether any error frame is in the received data in step S448. If an error frame is in the received data, the CPU 1-1 sends a PPR to the line through the modem 1-8 and the NCU 1-9 in step S453, and returns to step S413 (FIG. 39) to receive a frame retransmitted from the destination. If no error frame is in the received data, the CPU 1-1 sends the MCF to the line in step S449, and checks whether the received binary signal is the PPS-EOP in step S450. If the received binary signal is the PPS-EOP, the CPU 1-1 performs the end procedure of receiving in step S451, and then returns to the standby condition. If the received binary signal is not the PPS-EOP, the CPU 1-1 shifts to step S402, step S403 or step S413 in accordance with the type of received binary signal.

Figure 44:
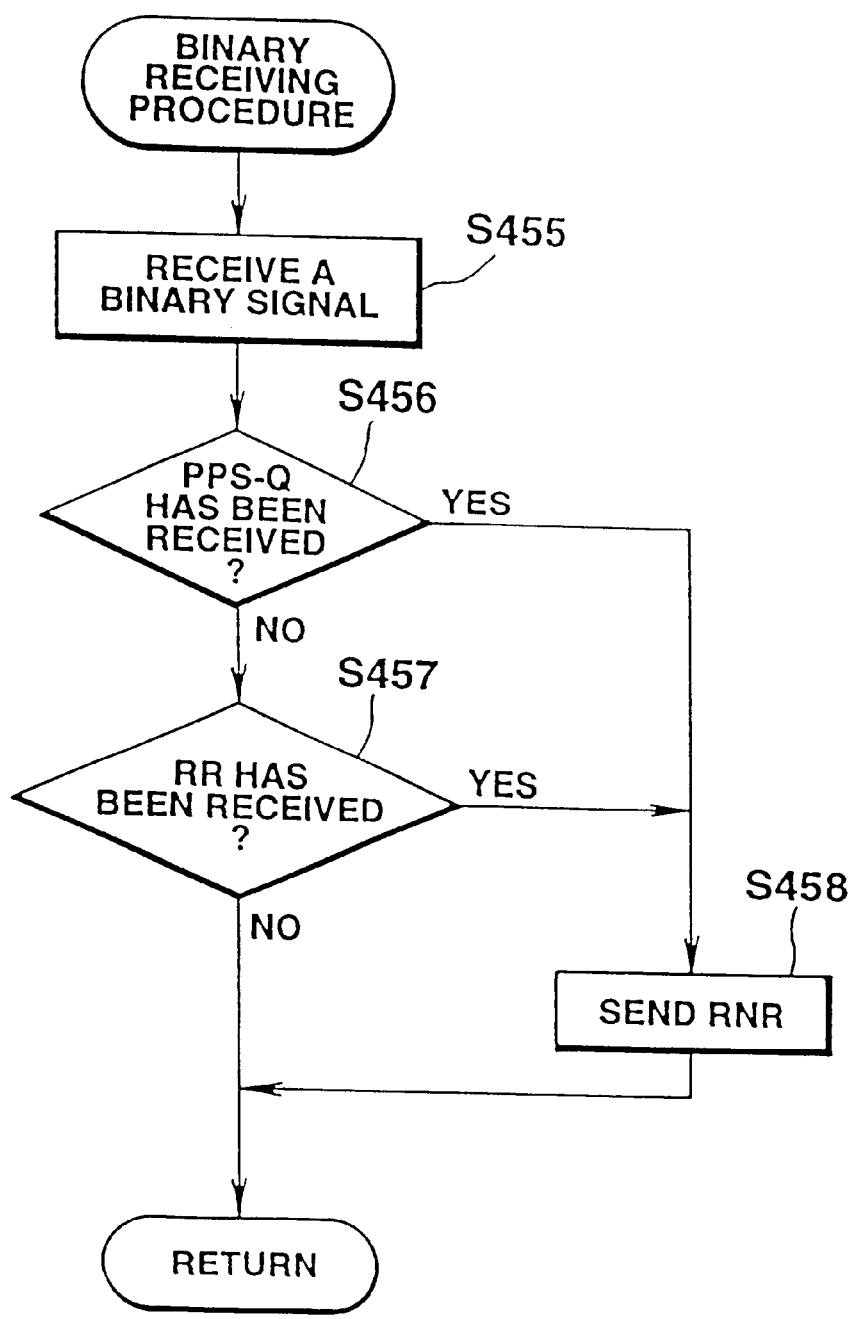
FIG. 44 is a flow chart showing an ECM binary receiving procedure.

FIG. 44 is a flow chart showing the operation of the ECM binary receiving procedure (e.g. step S444 of FIG. 42).

This ECM binary receiving procedure is performed while the stored image data is being printed or the requiring operation for setting a recording sheet is being performed.

In step S455, the CPU 1-1 receives a binary signal. In step S456, the CPU 1-1 checks whether the PPS-Q has been received. If the PPS-Q is not received, the CPU 1-1 checks whether an RR is received in step S457.

In a case where the PPS-Q is received in step S456, or where the RR is received in step S457, the CPU 1-1 sends an RNR to the line in step S458, and then returns to the previous flow.

Figure 45:
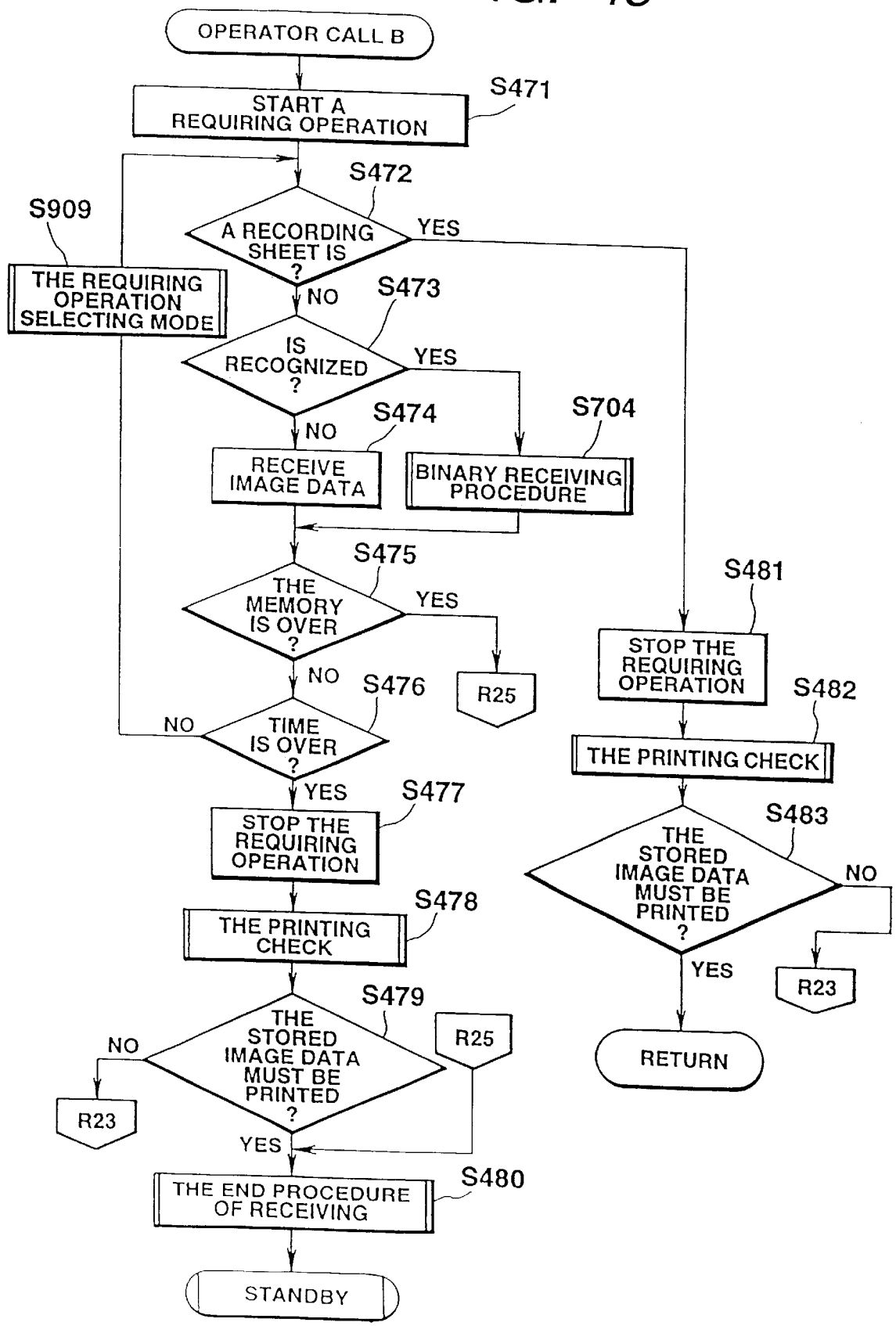
FIG. 45 is a flow chart showing an operation of an operator call B.

FIG. 45 is a flow chart showing the operation of the operator call B (step S441 of FIG. 42).

In step S471 of FIG. 45, the CPU 1-1 starts the requiring operation for setting a recording sheet, and checks whether a recording sheet is in the recorder 1-6 in step S472. If so, the CPU 1-1 stops the requiring operation in step S481, checks the stored image data to be printed in step S482, and discriminates whether the stored image data must be printed in step S483. If the stored image data must be printed, the CPU 1-1 returns to the previous flow. On the other hand, if the stored image data need not be printed, the CPU 1-1 shifts from step S483 to step S446 (FIG. 43).

In a case where a recording sheet is not in the recorder 1-6 in step S472, the CPU 1-1 discriminates whether the RCP has been received in step S473. If the RCP is not received, the CPU 1-1 performs the image reception in step S472. If the RCP is received, the CPU 1-1 performs the ECM binary receiving procedure in step S704.

In step S475, the CPU 1-1 checks whether the capacity of the image memory, which is available to store image data, is above a predetermined amount. If not, the CPU 1-1 performs the end procedure of receiving in step S480, and then returns to the standby condition. If the capacity of the image memory is above the predetermined amount, the CPU 1-1 checks the time elapsed from starting the requiring operation in step S476. In a case where the time is less than the predetermined time, the CPU 1-1 performs the operation of the requiring operation switching mode (FIG. 55) in step S909, and then returns to step S472. On the other hand, in a case where the time is greater than the predetermined time, the CPU 1-1 stops the requiring operation in step S477, checks the stored image data to be printed in step S478, and discriminates whether the stored image data must be printed in step S479. If the stored image data must be printed, the CPU 1-1 performs the end procedure of receiving in step S480, and then returns to the standby condition. If the stored image data need not be printed, the CPU 1-1 shifts from step S479 to step S446 (FIG. 43).

Figure 46:
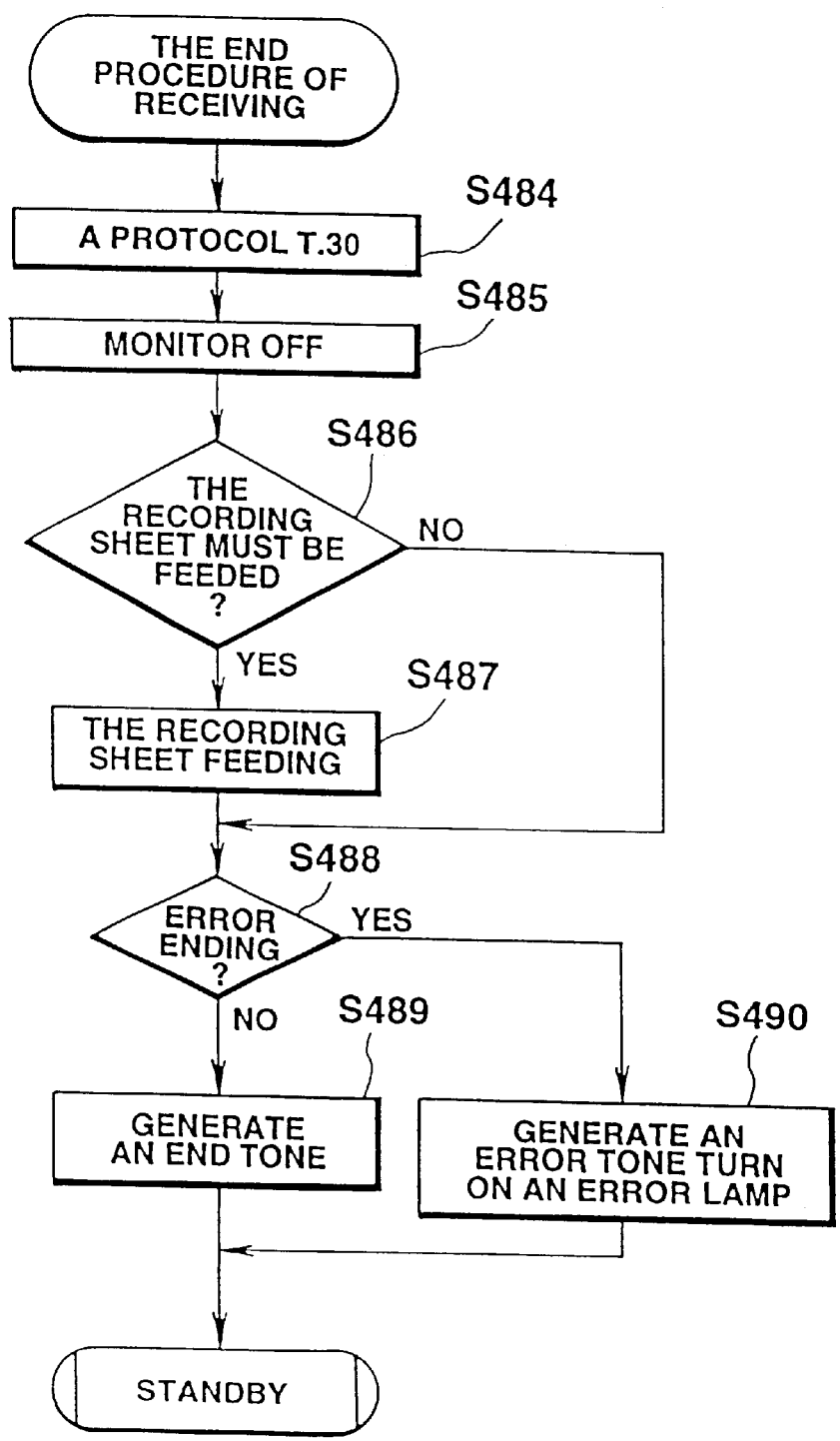
FIG. 46 is a flow chart showing the end procedure of receiving.

FIG. 46 is a flow chart showing the end procedure of receiving (e.g. step S412 of FIG. 38, step S426 of FIG. 40).

In step S484 of FIG. 46, the CPU 1-1 terminates the image reception in accordance with the procedure T.30 which is the CCITT recommendation. The CPU 1-1 then stops the monitor operation of the line in step S485, and discriminates whether the recording sheet feeding operation is performed in step S486. In a case where no recording sheet is in the recorder 1-6, or where no information has been printed on the recording sheet set in the recorder 1-6, etc., the feeding operation is not performed. In a case where some information has been printed on the recording sheet set in the recorder 1-6, the CPU 1-1 performs the feeding operation in step S487.

In step S488, the CPU 1-1 discriminates whether the image reception was an error. If so, the CPU 1-1 causes the buzzer 1-14 to generate an error tone and turns on an error lamp of the console unit 1-4 in step S490. If the image reception was not an error, the CPU 1-1 causes the buzzer 1-14 to generate an end tone in step S489, and then returns to the standby condition.

FIGS. 47 through 51, 52A, 52B, 53A, 53B and 54 together form a flow chart showing the transmission mode operation (step S30 of FIG. 27).

In step S601 of FIG. 47 the CPU 1-1 initializes the transmission speed at the start time and the flag ECM-MODE, etc. In step S602, the CPU 1-1 decides whether to operate the monitor operation of the line. The CPU 1-1 then checks whether a timer T1 (to time e.g. 35 seconds), which has started in step S601, has timed out in step S603, and checks whether the DIS has been received in step S604. In a case where the DIS is received before the timer T1 has expired, the CPU 1-1 performs the monitor selecting A (FIG. 36) in step S605. On the other hand, in a case where the timer T1 has expired without the DIS being received, the CPU 1-1 performs an end procedure of transmitting (FIG. 54) in step S611, and then returns to the standby condition.

In step S606, the CPU 1-1 discriminates whether ECM transmission is possible, in accordance with information as to reception of the DIS and information as to ECM communication set in the start key mode (i.e. ON/OFF). If ECM transmission is possible, the CPU 1-1 sets the flag ECM-MODE in step S613. If ECM transmission is not possible, the CPU 1-1 clears the flag ECM-MODE in step S607. Then, in step S608, the CPU 1-1 sends the DCS and a TCF to the line, and checks whether a result of the training is acceptable in step S609. If the result of the training is not adequate, the CPU 1-1 returns to step S606 and sends the DCS and the TCF to the line again. In a case where the result of the training is satisfactory in step S609, the CPU 1-1 performs image transmission (FIG. 42) in step S610, and checks whether the flag ECM-MODE is on in step S614 of FIG. 48. If the flag ECM-MODE is on, the CPU 1-1 shifts from step S614 to step S625 of FIG. 49, and performs a phase D of the ECM transmission. If the flag ECM-MODE is not on, the CPU 1-1 performs a phase D of the normal G3 transmission.

In step S615, the CPU 1-1 checks whether the next document has been set. If the next document has not been set, the CPU 1-1 sends the EOP to the line in step S620, performs the end procedure of transmitting (FIG. 54), and then returns to the standby condition. On the other hand, if the next document has been set, the CPU 1-1 checks whether the transmission mode is changed in step S616. If the transmission mode is changed, the CPU 1-1 sends the EOM to the line in step S623. If the transmission mode is not changed, the CPU 1-1 sends the MPS to the line in step S617. Then, the CPU 1-1 performs the end procedure of transmitting (FIG. 54) in step S618, and checks whether the image transmission is able to be continued in step S619. If the image transmission can not be continued, the CPU 1-1 performs the end procedure of transmitting in step S624, and then returns to the standby condition. Otherwise, the CPU 1-1 shifts from step S619 to step S603, step S606 or step S610 (FIG. 47). When the MPS is sent in step S617, the CPU 1-1 shifts to step S610. When the EOM is sent in step S623, the CPU 1-1 shifts to step S603 or step S606.

Figure 49:
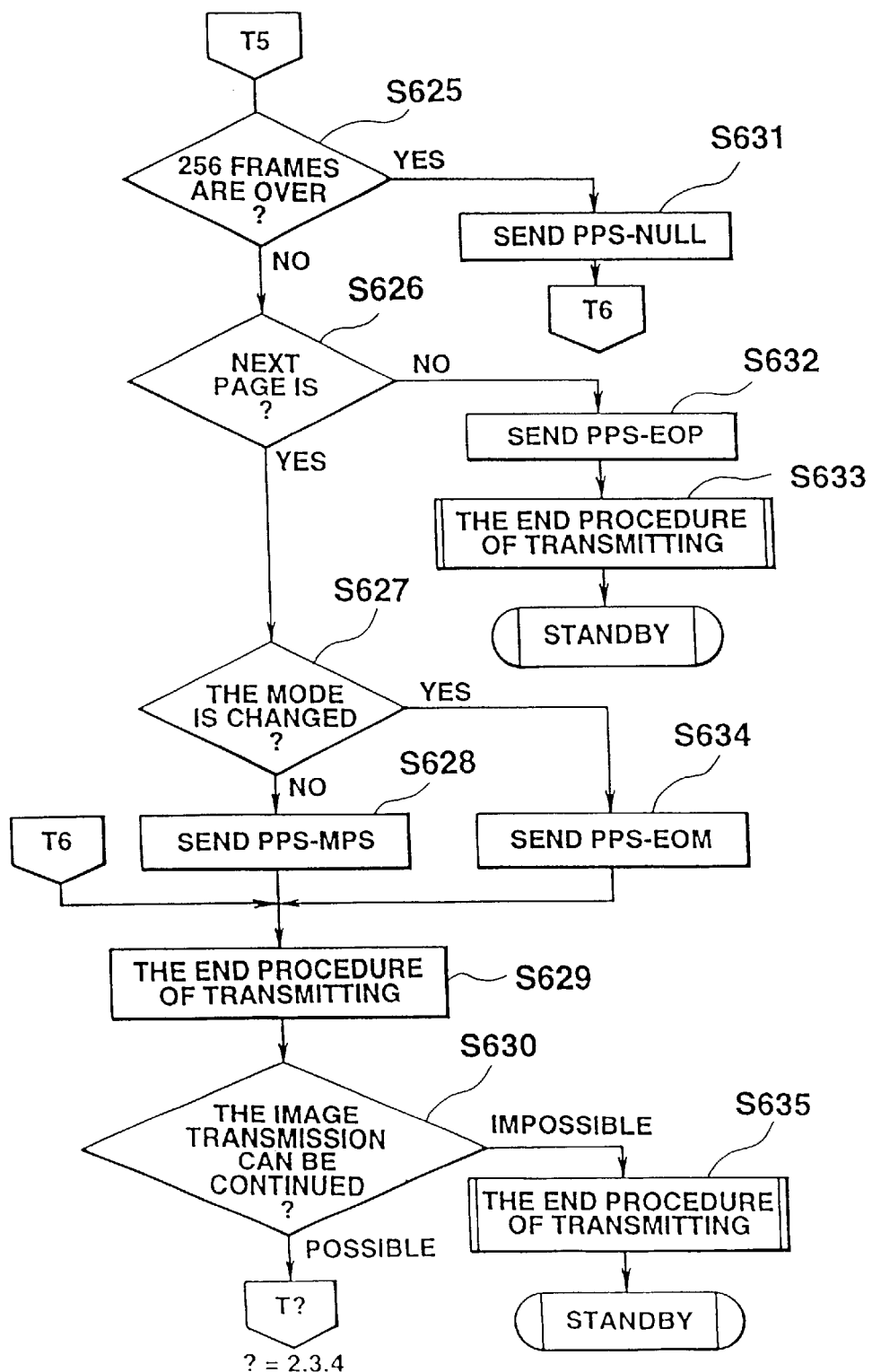

In a case where the flag ECM-MODE is on in step S614, the CPU 1-1 checks whether a page of image data to be transmitted is less than one block (256 flames) in step S625 (FIG. 49). If a page is not less than one block, the CPU 1-1 sends the PPS-NULL to the line in step S631, and then shifts to step S629. If a page of image data is less than one block, the CPU 1-1 checks whether another page of documents is set in the reader 1-5 in responsive to a requiring operation for setting a document after the reading of the previous document has been finished in step S626. If no next page has been set, the CPU 1-1 sends the PPS-EOP to the line in step S632, performs the end procedure of transmitting in step S633, and then returns to the standby condition. If a next page is set in step S626, the CPU 1-1 checks whether the transmission mode is changed in step S627. If the transmission mode is changed, the CPU 1-1 sends the PPS-EOM to the line in step S634. On the other hand, if the transmission mode is not changed, the CPU 1-1 sends the PPS-MPS to the line in step S628.

In step S629, the CPU 1-1 performs a procedure for continuing the image transmission in step S629, and checks whether the image transmission is able to be continued in step S630. If the image transmission is not able to be continued, the CPU 1-1 performs the end procedure of transmitting in step S635, and then returns to the standby condition. If the image transmission is able to be continued, the CPU 1-1 shifts from step S630 to either step S603, step S606, or step S610 (FIG. 47).

Figure 50:
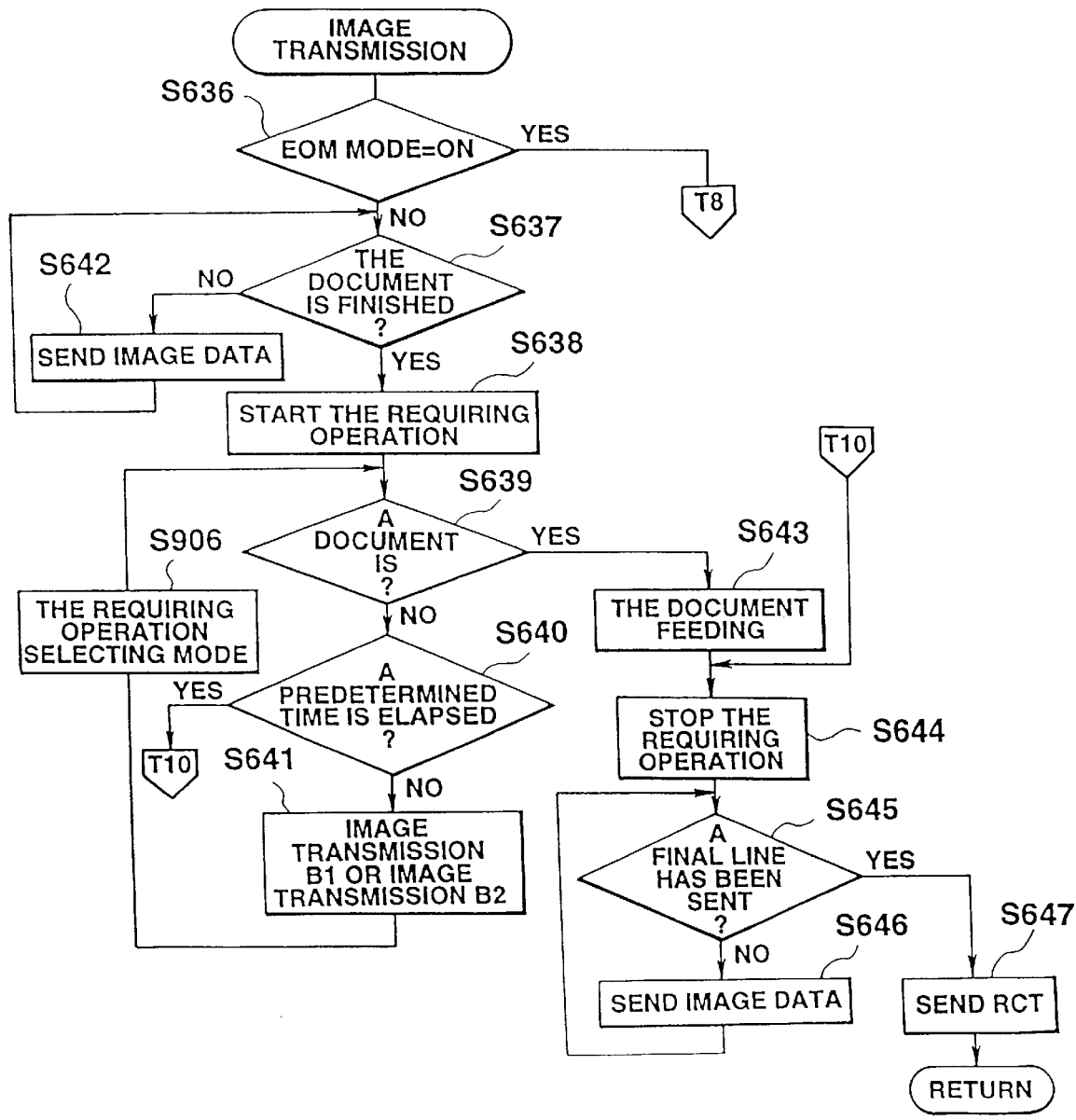
FIG. 50 and FIG. 51 together form a flow chart showing an operation of an image transmission.
Figure 51:
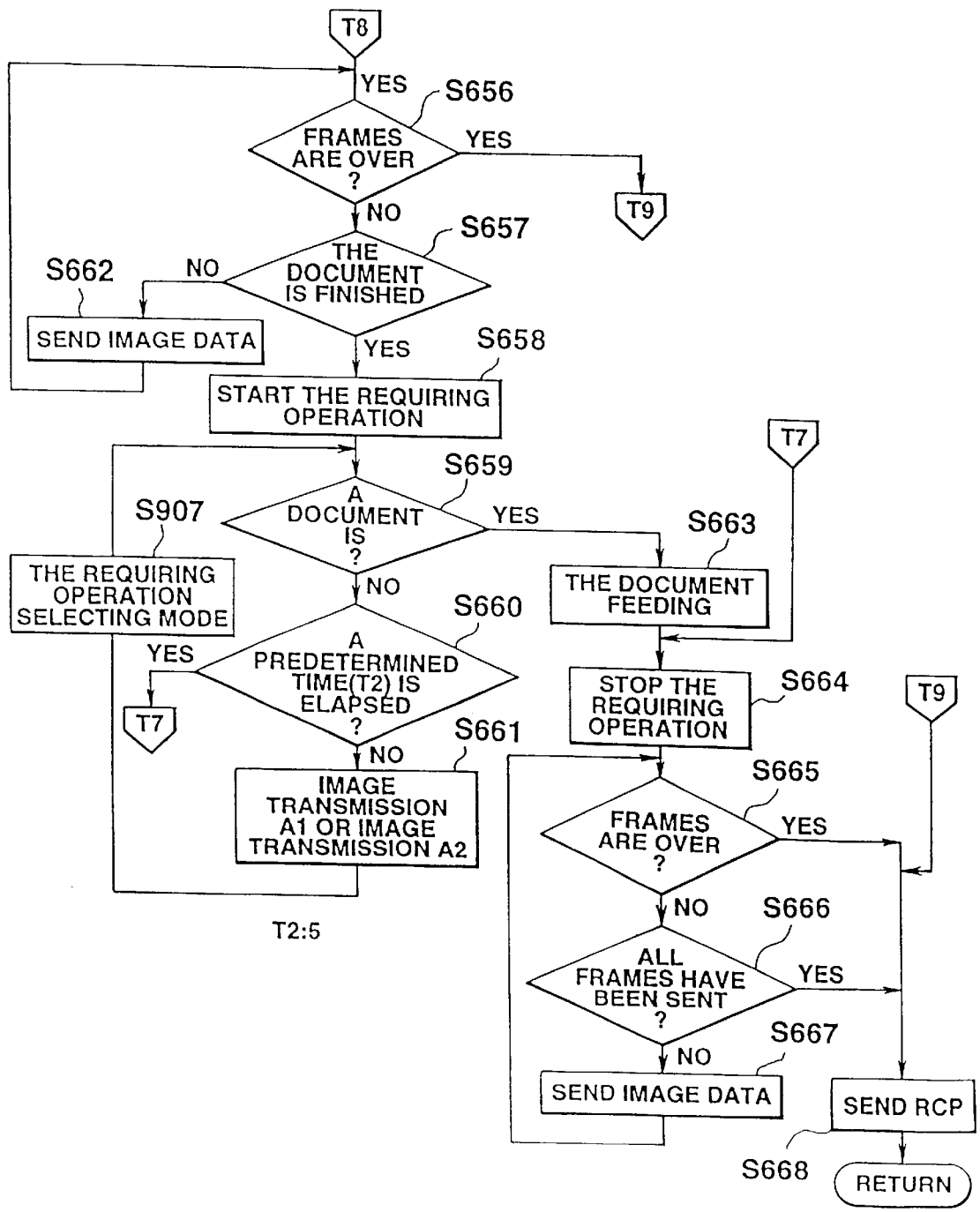
Figure 52A:
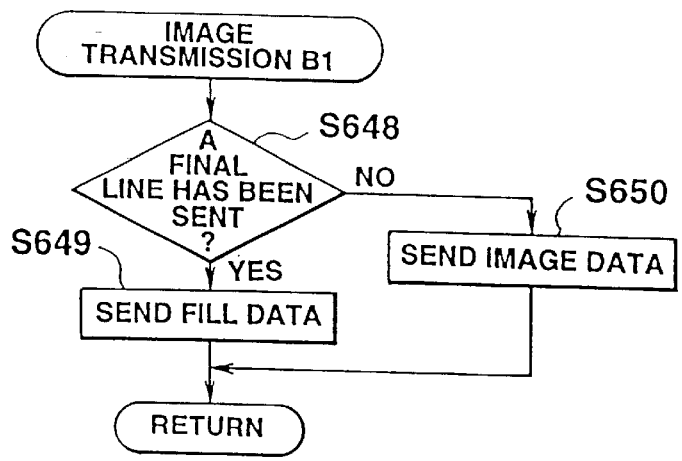
FIG. 52A is a flow chart showing an image transmission B1.
Figure 52B:
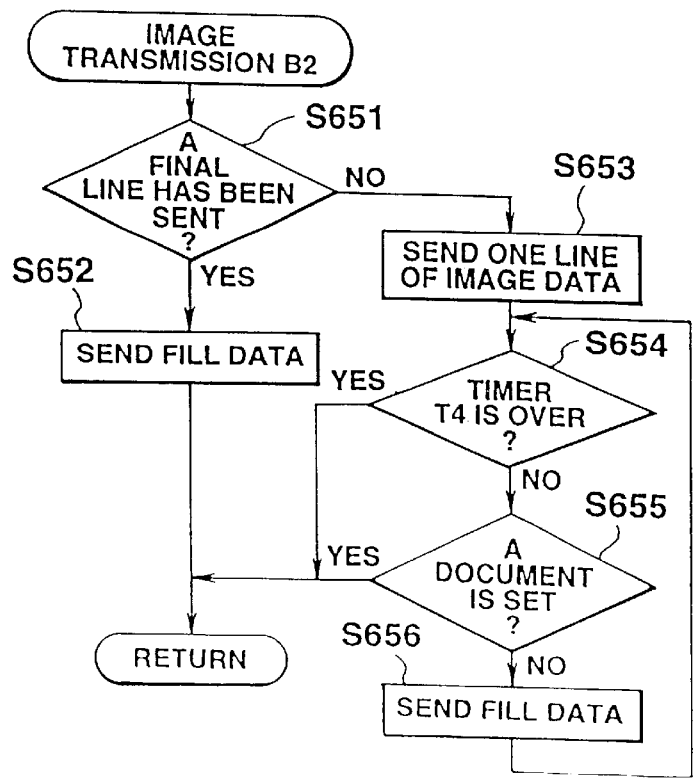
FIG. 52B is a flow chart showing an image transmission B2.
Figure 53A:
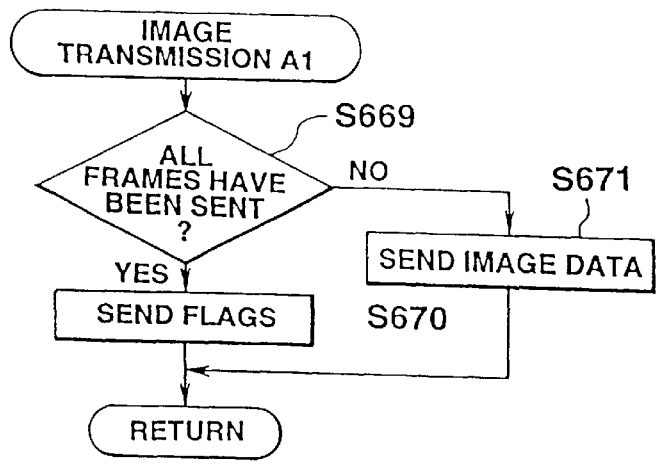
FIG. 53A is a flow chart showing an image transmission A1.
Figure 53B:
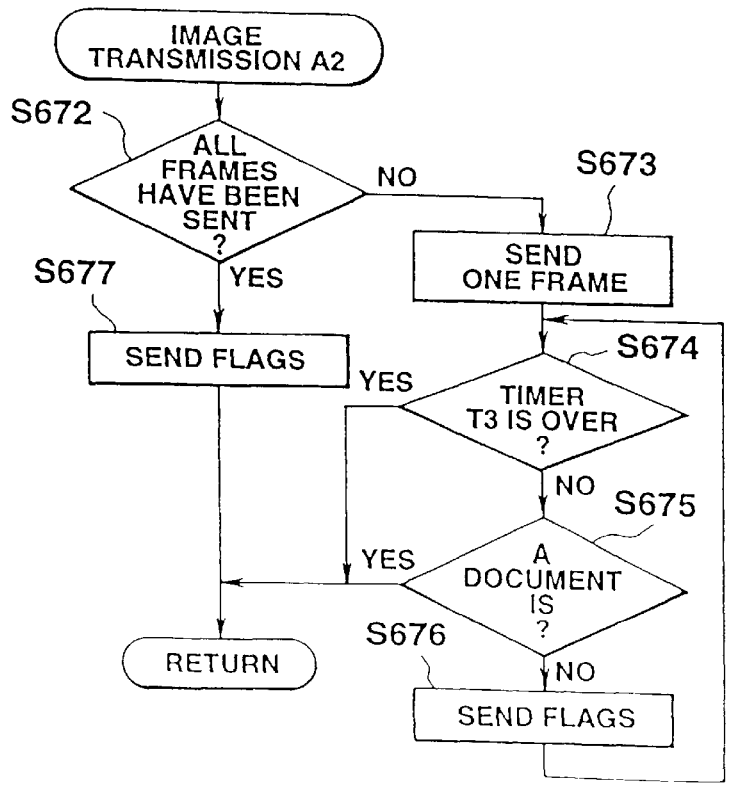
FIG. 53B is a flow chart showing an image transmission A2.

FIG. 50 and FIG. 51 together form a flow chart showing image transmission (step S610 of FIG. 47).

In step S636 of FIG. 50, the CPU 1-1 checks whether the flag ECM-MODE is on. If the flag ECM-MODE is on, the CPU 1-1 shifts from step S636 to step S656 of FIG. 51. If the flag ECM-MODE is not on, the CPU 1-1 checks whether the document is finished in step S637. If the document is not finished, the CPU 1-1 sends image signals to the line in step S642, and then returns to step S637. In a case where the document is finished in step S637, the CPU 1-1 starts a requiring operation (e.g. generating an alarm tone, or displaying an alarm) for setting an additional document in step S638, and checks whether the additional document is set in the reader 1-5 in step S639. If no additional document is set the CPU 1-1 checks the time elapsed from the start the requiring operation for setting a document in step S640. In a case where the time elapsed is less than 5 seconds, the CPU 1-1 performs an image transmission B1 (FIG. 52A) or an image transmission B2 (FIG. 52B) in step S641, performs the requiring operation switching mode (FIG. 55) in step S906, and then returns to step S639. On the other hand, in a case where the time elapsed is over 5 seconds, the CPU 1-1 shifts from step S640 to step S644. In a case where an additional document is set before the time exceeds 5 seconds, the CPU 1-1 performs the feeding operation of the original document (FIG. 34) in step S643, stops the requiring operation of setting the document in step S644, and checks whether a final line of image data has been sent to the line in step S645. If the final line of image data has not been sent, the CPU 1-1 sends image signals to the line in step S646. If the final line of image data is sent, the CPU 1-1 sends the RTC to the line in step S647, and then returns to the previous flow.

The image transmission B1 and B2 are processes to insert fill data between one line and the next line, or between a final line and the RTC, so as to hold the communication line.

In the image transmission B2 (FIG. 52A), the CPU 1-1 checks whether the final line of image data has been sent in step S648, and if so, the CPU 1-1 sends fill data to the communication line in step S649. On the other hand, if the final line of image data has not been sent, the CPU 1-1 sends image signals to the communication line in step S650.

In the image transmission B2 (FIG. 52B), the CPU 1-1 checks whether the final line of image data has been sent or not in step S651, and if not, the CPU 1-1 sends one line of image data to the communication line and clears a timer T4 in step S653. The CPU 1-1 then checks whether the timer T4 is expired in step S654, and checks whether an additional document is set in the reader 1-5 in step S655. In a case where the timer T4 has expired, or where an additional document is set before the timer T4 has expired, the CPU 1-1 returns to step S906 (FIG. 50). In a case where no additional document is set, the CPU 1-1 sends fill data to the communication line in step S656 until timer T4 has expired. If the final line of image data has been sent in step S651, the CPU 1-1 sends fill data to the communication line in step S652 and then returns to step S906 (FIG. 50).

In a case where the flag ECM-MODE is on in step S638, in step S656 the CPU 1-1 checks whether the sending of one block of data (256 frames) is finished (FIG. 51).

If one block of data is not finished being sent, the CPU 1-1 checks whether the document is finished in step S657. If not, the CPU 1-1 sends image signals to the communication line in step S662. If the document is finished, in step S658, the CPU 1-1 starts the requiring operation of setting a document in step S658, and checks whether a document is set in the reader 1-5 in step S659. If not, the CPU 1-1 checks whether the time elapsed since starting the requiring operation is over a predetermined time (e.g. 5 seconds) in step S660, and if the elapsed time is less than the predetermined time, the CPU 1-1 performs an image transmission A1 (FIG. 53A) or an image transmission A2 (FIG. 53B) in step S661. The CPU 1-1 then performs the requiring operation switching mode (FIG. 55) in step S907, and returns to step S659. On the other hand, if the elapsed time is greater than the predetermined time in step S660, the CPU 1-1 shifts to step S664.

If a document is set in the reader 1-5 in step S659, the CPU 1-1 performs the document feeding operation (FIG. 34) in step S663, stops the requiring operation for setting a document in step S664, and checks whether sending one block data (256 frames) is finished in step S665. In a case where sending one block data is finished in step S656 or step S665, the CPU 1-1 sends the RCP to the communication line in step S668, and then returns to the previous flow.

If sending one block of data (256 frames) is not finished in step S665, the CPU 1-1 checks whether all frames have been sent in step S666, and if not, the CPU 1-1 sends image signals to the communication line in step S667. If all frames have been sent in step S666, the CPU 1-1 shifts to step S668.

The image transmission A1 and A2 are processes to insert flags between one frame and the next so as to hold the communication line.

In the image transmission A1 (FIG. 53A), the CPU 1-1 checks whether all frames have been sent in step S669, and if not, the CPU 1-1 sends image signals to the communication line in step S671. On the other hand, if all frames have been sent, the CPU 1-1 sends flags to the communication line in step S670.

In the image transmission A2 (FIG. 53B), the CPU 1-1 checks whether all frames have been sent in step S672, and if so, the CPU 1-1 sends flags to the communication line in step S677. If all frames have not been sent, the CPU 1-1 sends one frame of data to the communication line and clears a timer T3 in step S673.

In step S674 the CPU 1-1 checks whether the timer T3 has expired. If so, the CPU 1-1 checks whether a document is set in the reader 1-5 in step S675. In a case where the timer T3 has expired, or where a document is set in the reader 1-5 before the timer T3 has expired, the CPU 1-1 returns to step S907 (FIG. 51). In a case where no document is set, and where the timer T3 has not expired, the CPU 1-1 sends flags to the communication line in step S695.

Figure 48:
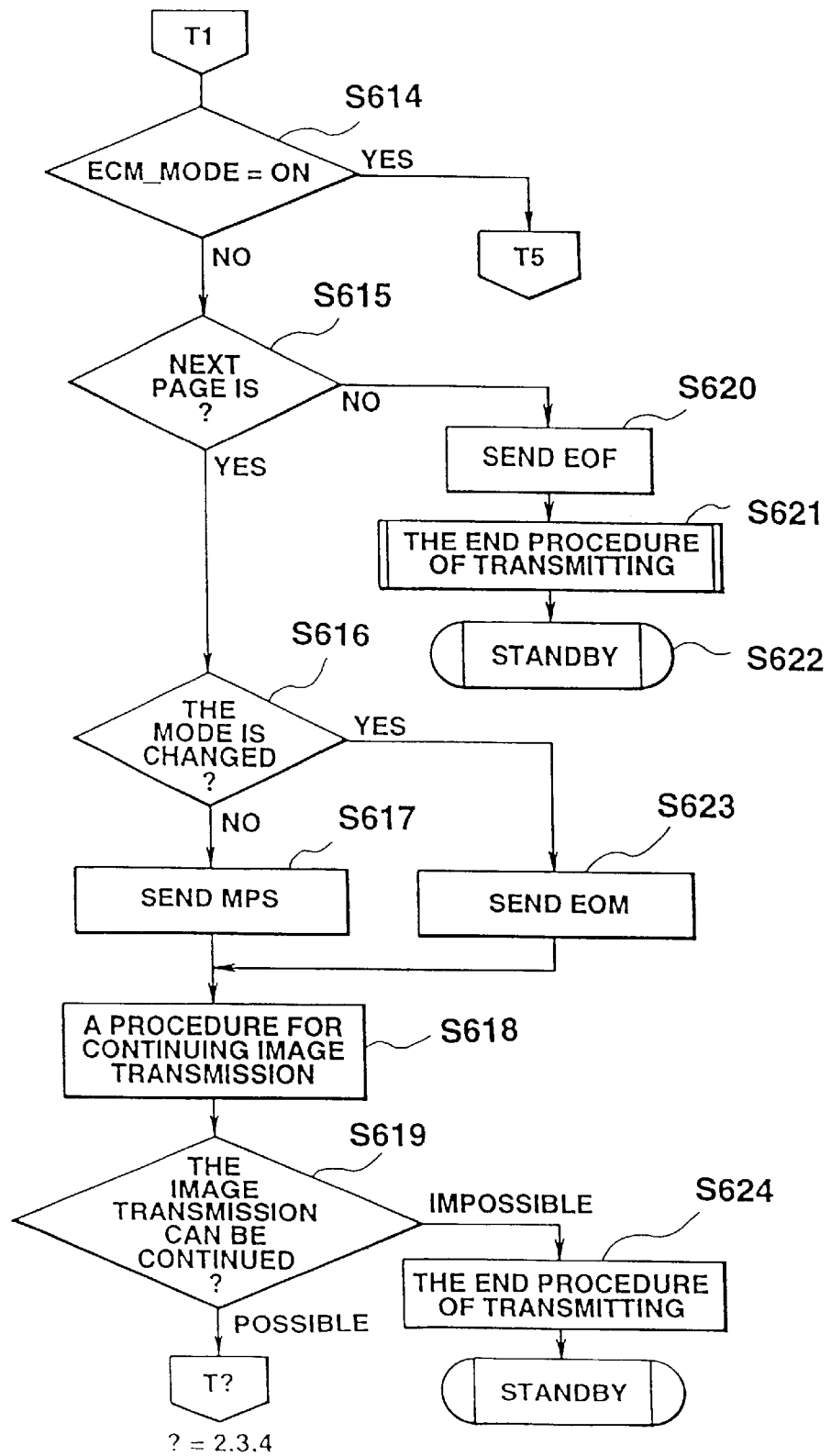
Figure 54:
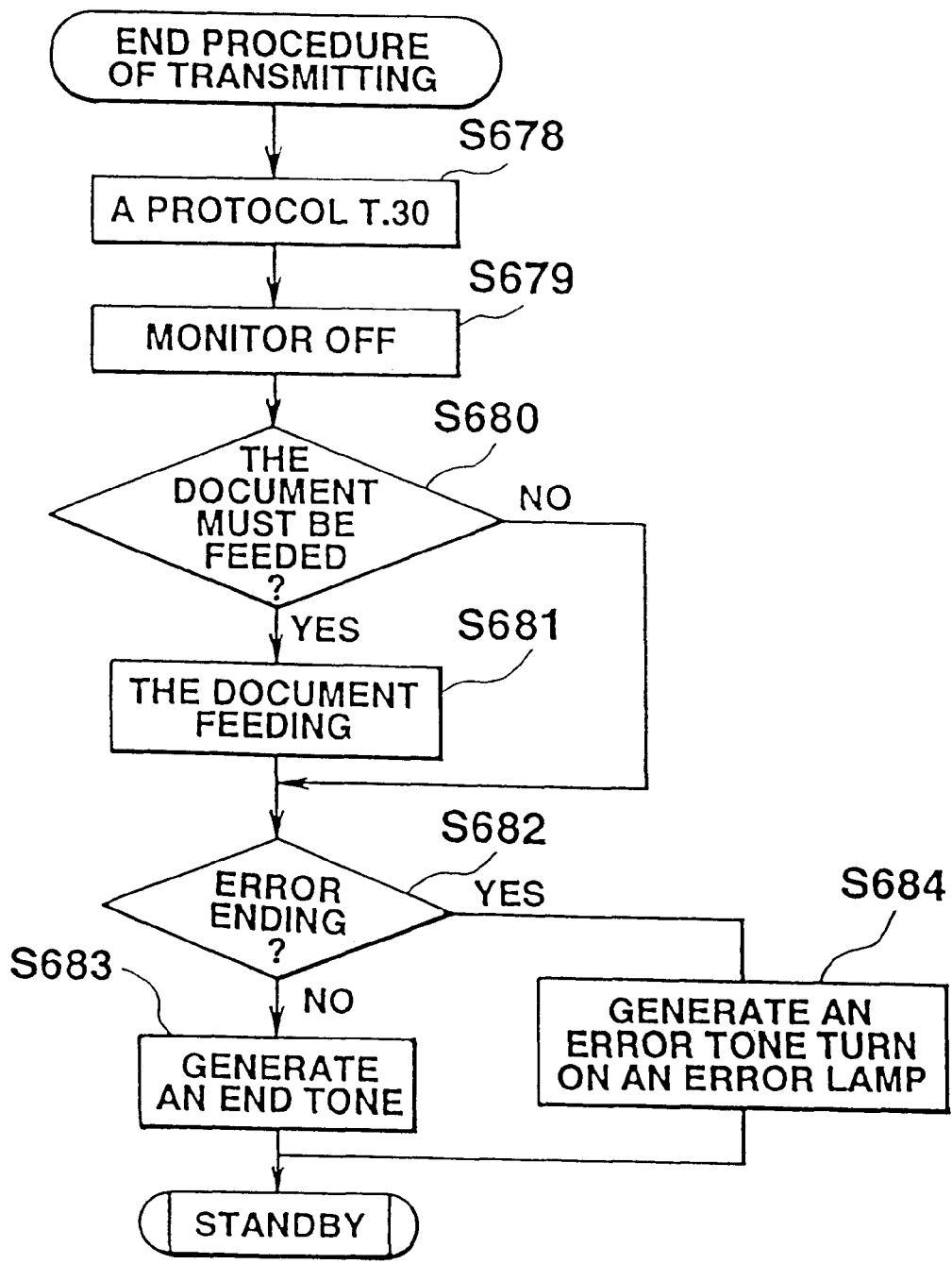
FIG. 54 is a flow chart showing an end procedure of transmitting.

FIG. 54 is a flow chart showing the end procedure of transmitting (step S624 of FIG. 48 and steps S633 and S635 of FIG. 49).

In step S678 of FIG. 54, the CPU 1-1 performs a protocol which is to finish the image transmission and which accords with the recommendation T30 by the CCITT. CPU 1-1 then stops the monitor operation in step S679, and checks if the document must be fed in step S680. If the document must be fed, the CPU 1-1 performs the document feeding operation in step S681.

In step S682, the CPU 1-1 checks whether the image transmission was an error, and if not, the CPU 1-1 causes the buzzer 1-14 to generate an end tone in step S683, and then returns to the standby condition. If the image transmission was an error, the CPU 1-1 causes the buzzer 1-14 to generate an error tone and turns on an error lamp in step S684, and then returns to the standby condition.

Figure 55:
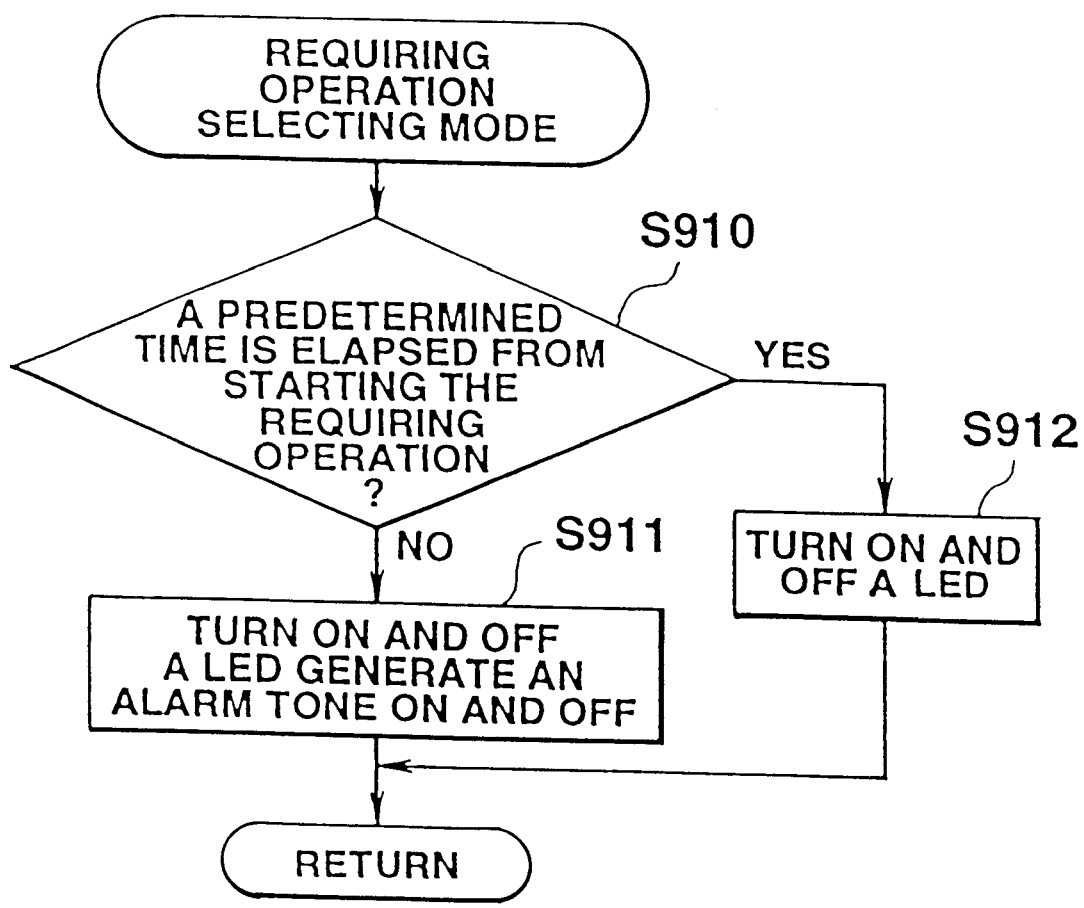
FIG. 55 is a flow chart showing an operation of a requiring operation switching mode.

FIG. 55 is a flow chart showing the requiring operation switching mode (step S906 of FIG. 50, step S907 of FIG. 51, step S908 of FIG. 41, and step S909 of FIG. 45).

In step S910 of FIG. 55, the CPU 1-1 checks the image elapsed from starting the requiring operation of setting a document (or a recording sheet). In a case where the elapsed time is not greater than predetermined time, in step S911 the CPU 1-1 causes the buzzer 1-14 to generate an alarm tone intermittently and turns an LED on and off. If the elapsed time is greater than the predetermined time, the CPU 1-1 turns the LED on and off in step S912 (the CPU 1-1 stops generating the alarm tone), and then returns to the previous flow.

As described above, this facsimile apparatus requires an operator to set a recording sheet or a document in the ECM and G3 communication, and performs a procedure for holding the communication line during the requiring operation of setting a recording sheet or a document. In this fashion, the operator can set a recording sheet or a document without causing an error in the image communication.

Further, this facsimile apparatus changes the requiring operation of setting a recording sheet or a document in accordance with the time elapsed from starting the requiring operation. Consequently, the operator can recognize a condition of the facsimile apparatus appropriately, and this facsimile apparatus can provide a compact and an appropriate operation.

Although a particular embodiment of the present invention is disclosed herein for purposes of explanation, various modifications thereof, after study of this specification, will be apparent to those skilled in the art to which the invention pertains.

What is claimed is:

1. A facsimile apparatus, comprising:
   an interface for connection to at least one external communication unit, said interface comprising a jack and a plug to be connected to the jack, and said interface being adapted to output signals corresponding to an external communication unit connected thereto; and
   a controller for discriminating three types of external communication units connectable to said interface, based on the signals outputted from said interface,
   wherein said controller discriminates the three types of external communication units based on (1) a case where the plug is not connected to the jack, in which case said interface outputs a first output signal that is LOW; (2) a case where the plug is connected to the jack, in which case the first output signal is HIGH, and a second output signal outputted from said interface is HIGH; and (3) a case where the plug is connected to the jack, in which case the first output signal is HIGH, and the second output signal is LOW, respectively.

2. An apparatus according to claim 1, further comprising a communicator for communicating with another communication apparatus, wherein said controller controls a level of a signal transmitted from said communicator in accordance with a discriminated type of external communication unit.

3. An apparatus according to claim 1, further comprising a communicator for communicating with another communication apparatus, wherein said controller controls a communication speed of signals transmitted from and/or received through said communicator in accordance with a discriminated type of external communication unit.

4. An apparatus according to claim 1, wherein said controller discriminates the type of external communication unit as being connected according to whether or not an external communication unit is connected to said interface.

5. An apparatus according to claim 4, wherein
   said controller discriminates the type of external communication unit as being connected according to whether or not an external communication unit is connected to said interface based on a state of switch, which is actuated by an inserted/pulled-out state of the plug.

6. An apparatus according to claim 1, further comprising a monitor for monitoring a signal communicated with another communication apparatus, wherein said controller controls an ON/OFF state of said monitor according to a discriminated type of external communication unit being connected to said interface.

7. A facsimile apparatus, comprising:
   an interface for connecting to at least one external communication unit, said interface comprising a jack and a plug to be connected to the jack, and said interface being adapted to output signals corresponding to an external communication unit connected thereto; and
   a controller for discriminating three types of external communication units connectable to said interface, based on the signals outputted from said interface,
   wherein said controller discriminates the three types of external communication units based on a mechanical switch member and a state of an electrical connection to the external communication unit, such that (1) in a case where the plug is not connected to the jack, said interface outputs a first output signal that is LOW; (2) in a case where the plug is connected to the jack, the first output signal is HIGH, and a second output signal outputted from said interface is HIGH; and (3) in a case where the plug is connected to the jack, the first output signal is HIGH, and the second output signal is LOW, respectively.

8. An apparatus according to claim 7, further comprising a communicator for communicating with another communication apparatus, wherein said controller controls a level of a signal transmitted from said communicator in accordance with a discriminated type of external communication unit connected to said interface.

9. An apparatus according to claim 7, further comprising a communicator for communicating with another communication apparatus, wherein said controller controls a communication speed of signals transmitted from and/or received through said communicator in accordance with a discriminated type of external communication unit connected to said interface.

10. An apparatus according to claim 7, wherein said controller discriminates the type of external communication unit as being connected according to whether or not an external communication unit is connected to said interface.

11. An apparatus according to claim 10, wherein
    said controller discriminates the type of external communication unit as being connected according to whether or not an external communication unit is connected to said interface based on a state of the switch, which is actuated by an inserted/pulled-out state of the plug.

12. An apparatus according to claim 7, further comprising a monitor for monitoring a signal communicated with another communication apparatus, wherein said controller controls an ON/OFF state of said monitor according to a discriminated type of external communication unit being connected to said interface.

13. A method of operating a facsimile apparatus, comprising the steps of:
    connecting an interface to at least one external communication unit, the interface comprising a jack and a plug to be connected to the jack, and the interface being adapted to output signals corresponding to an external communication unit connected thereto; and
    discriminating, using a control device, three types of external communication units connectable to the interface, based on the signals outputted from the interface, wherein the control device discriminates the three types of external communication units based on (1) a case where the plug is not connected to the jack, in which case the interface outputs a first signal that is LOW; (2) a case where the plug is connected to the jack, in which case the first output signal is HIGH, and a second output signal outputted from the interface is HIGH; and (3) a case where the plug is connected to the jack, in which case the first output signal is HIGH, and the second output signal is LOW, respectively.

14. The method according to claim 13, further comprising the step of using a communicator to communicate between the communication apparatus and another communication apparatus, wherein the control device controls a level of a signal transmitted from the communicator in accordance with a discriminated type of external communication unit.

15. The method according to claim 13, further comprising the step of using a communicator to communicate between the communication apparatus and another communication apparatus, wherein the control device controls a communication speed of signals transmitted from and/or received through the communication apparatus in accordance with a discriminated type of external communication unit.

16. The method according to claim 13, wherein the control device discriminates the type of external communication unit as being connected according to whether or not an external communication unit is connected to the interface.

17. The method according to claim 16, wherein
the control device discriminates the type of external communication unit as being connected according to whether or not an external communication unit is connected to the interface based on a state of a switch, which is actuated by an inserted/pulled-out state of the plug.

18. The method according to claim 13, further comprising the step of monitoring on a monitor device a signal communicated with another communication apparatus, wherein the control device controls an ON/OFF state of the monitor device according to a discriminated type of external communication unit being connected to the interface.

19. A method of operating a facsimile apparatus, comprising the steps of:
connecting an interface to at least one external communication unit, the interface comprising a jack and a plug to be connected to the jack, and the interface being adapted to output signals corresponding to an external communication unit connected thereto; and
discriminating, using a control device, three types of external communication units connectable to the interface, based on signals from of the interface,
wherein the control device discriminates the three types of external communication units based on a mechanical switch member and a state of an electrical connection to the external communication unit, such that (1) in a case where the plug is not connected to the jack, the interface outputs a first output signal that is LOW; (2) in a case where the plug is connected to the jack, the first output signal is HIGH, and a second output signal outputted from the interface is HIGH; and (3) in a case where the plug is connected to the jack, the first output signal is HIGH, and the second output signal is LOW, respectively.

20. A method according to claim 19, further comprising the step of using a communicator to communicate between the communication apparatus and another communication apparatus, wherein the control device controls a level of a signal transmitted from the communicator in accordance with a discriminated type of external communication unit connected to the interface.

21. The method according to claim 19, further comprising the step of using a communicator to communicate between the communication apparatus and another communication apparatus, wherein the control device controls a communication speed of signals transmitted from and/or received through the communicator in accordance with a discriminated type of external communication unit connected to the interface.

22. A method according to claim 19, wherein the control device discriminates the type of external communication unit as being connected according to whether or not an external communication unit is connected to the interface.

23. The method according to claim 22, wherein
the control device discriminates the type of external communication unit as being connected according to whether or not an external communication unit is connected to the interface based on a state of the switch, which is actuated by an inserted/pulled-out state of the plug.

24. The method according to claim 19, further comprising the step of monitoring, using a monitor device, a signal communicated with another communication apparatus, wherein the control device controls an ON/OFF state of the monitor device according to a discriminated type of external communication unit being connected to the interface.

* * * * *

UNITED STATES PATENT AND TRADEMARK OFFICE
CERTIFICATE OF CORRECTION

PATENT NO.   : 6,674,550 B1
DATED        : January 6, 2004
INVENTOR(S)  : Yosuke Ezumi It is certified that error appears in the above-identified patent and that said Letters Patent is hereby corrected as shown below:

Drawings,
Sheet 24, Fig. 25, "A ECONOMY" should read -- AN ECONOMY --.
Sheet 29, Fig. 30, "MODES (both occurences) should read -- MODE --.
Sheet 30, Fig. 31, "MODES" should read -- MODE --.
Sheet 46, Fig. 47, "A ECM" should read -- AN ECM --.

Column 3,
Line 43, "Those" should read -- These --; and
Line 66, "a clock" should read -- clock --.

Column 5,
Line 7, "powers" should read -- power --; and
Line 27, "the portable" should read -- to the portable --.

Column 8,
Line 5, "views" should read -- view --.

Column 10,
Line 10, "convertor," should read -- converter, --; and
Line 52, "20 mobile" should read -- mobile --.

Column 13,
Line 35, "stanby" should read -- in the standby --.

Column 21,
Line 32, "T.30" should read -- T30 --.

UNITED STATES PATENT AND TRADEMARK OFFICE
CERTIFICATE OF CORRECTION

PATENT NO. : 6,674,550 B1
DATED : January 6, 2004
INVENTOR(S) : Yosuke Ezumi

It is certified that error appears in the above-identified patent and that said Letters Patent is hereby corrected as shown below:

Column 22,
Line 45, "responsive" should read -- response --.

Column 28,
Line 3, "from of" should read -- from --.

Signed and Sealed this

Seventh Day of September, 2004

JON W. DUDAS
*Director of the United States Patent and Trademark Office*